(12) United States Patent
Zhang et al.

(10) Patent No.: US 10,432,537 B2
(45) Date of Patent: Oct. 1, 2019

(54) SERVICE FUNCTION CHAINING BASED ON RESOURCE AVAILABILITY IN THE TIME DIMENSION

(71) Applicant: Fujitsu Limited, Kawasaki-shi, Kanagawa (JP)

(72) Inventors: Qiong Zhang, Plano, TX (US); Qingya She, Allen, TX (US); Weisheng Xie, Plano, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/977,922

(22) Filed: May 11, 2018

(65) Prior Publication Data

US 2018/0262431 A1      Sep. 13, 2018

Related U.S. Application Data

(63) Continuation-in-part of application No. 15/175,940, filed on Jun. 7, 2016, now Pat. No. 9,998,563.
(Continued)

(51) Int. Cl.
*H04L 29/08* (2006.01)
*H04L 12/813* (2013.01)
(Continued)

(52) U.S. Cl.
CPC .......... *H04L 47/20* (2013.01); *G06F 9/45558* (2013.01); *H04L 41/0806* (2013.01);
(Continued)

(58) Field of Classification Search
CPC . H04L 41/0806; H04L 43/08; H04L 41/0896; H04L 47/20; H04L 47/125;
(Continued)

(56) References Cited

U.S. PATENT DOCUMENTS 8,032,409 B1 *  10/2011  Mikurak ................ G06Q 10/00
                                                     705/14.39
2005/0262232 A1   11/2005  Cuervo et al.
(Continued)

OTHER PUBLICATIONS

"Network functions virtualization (NFV); User Cases," www.etsi.org/deliver/etsi_gs/nfv/001_009/001/01.01.01_60/gs_nfv001v010101p.pdf; 50 pages, 2013.
(Continued)

*Primary Examiner* — Kim T Nguyen
(74) *Attorney, Agent, or Firm* — Baker Botts L.L.P.

(57) ABSTRACT

A resource orchestration framework may include vertices representing physical network nodes and a resource orchestrator. The resource orchestrator may receive a service function chain request specifying service functions to perform on respective physical nodes and a first starting time for launching a first one of the service functions. The resource orchestrator may determine an ending time for performing the first service function that, with the first starting time, defines a time duration for the first service function, identify vertices at which the first service function is available during the time duration, map a first vertex to the first service function in a candidate service function chain, determine a second starting time for launching a second one of the service functions dependent on the first starting time, and provide the candidate service function chain, the first starting time, and the second starting time to a neighbor vertex of the first vertex.

20 Claims, 24 Drawing Sheets

Related U.S. Application Data

(60) Provisional application No. 62/240,199, filed on Oct. 12, 2015.

(51) Int. Cl.
 *G06F 9/455* (2018.01)
 *H04L 12/803* (2013.01)
 *H04L 12/24* (2006.01)
 *H04L 12/26* (2006.01)

(52) U.S. Cl.
 CPC .......... *H04L 41/0896* (2013.01); *H04L 43/08* (2013.01); *H04L 47/125* (2013.01); *H04L 67/10* (2013.01); *H04L 67/327* (2013.01); *G06F 2009/45595* (2013.01)

(58) Field of Classification Search
 CPC .................. H04L 67/10; H04L 67/327; G06F 2009/45595; G06F 9/45558
 See application file for complete search history.

(56) References Cited

U.S. PATENT DOCUMENTS

| | | |
|---|---|---|
| 2015/0200838 A1 | 7/2015 | Nadeau et al. |
| 2016/0254998 A1 | 9/2016 | Jokela et al. |
| 2016/0261523 A1* | 9/2016 | Razack ................... H04L 47/78 |
| 2016/0344626 A1* | 11/2016 | Chen ........................ H04L 45/50 |

OTHER PUBLICATIONS

Andreev, Konstantin, et al. "Balanced graph partitioning." Proceedings of the sixteenth annual ACM symposium on Parallelism in algorithms and architectures, Feb. 2004; 12 pages.
Chowdhury, Mosharaf, et al. "Polyvine: policy-based virtual network embedding across multiple domains." In Proceedings of the second ACM SIGCOMM workshop on Virtualized infrastructure systems and architectures, pp. 49-56, 2010; 8 pages.
Dietrich, David, et al. "Multi-domain virtual network embedding with limited information disclosure." Proceedings of IFIP Networking Conference, May 2013; 9 pages.
Farrel, A., et al., "A Path Computation Element (PCE)—Based Architecture," Network Working Group, 40 pages, 2006.
Heller, B., et al., "The Controller Placement Problem," Proc. ACM HotSDN, New York, NY; 6 pages, 2012.
Hong, S., et al., "Effective VON Embedding Based on Topology Aggregation in Multi-Domain Optical Networks," OFC 2014, M3H.3; 3 pages.
Houidi, Ines, et al. "Virtual network provisioning across multiple substrate networks." Computer Networks, vol. 55, No. 4, Mar. 2011, pp. 1011-1023; 14 pages.
Malewicz, G., "Pregel: A System for Large-Scale Graph Processing," in Proc ACM SIGMOD, New York, NY; 11 pages, 2010.
Mehragham, S., et al. "Specifying and Placing Chains of Virtual Network Functions," *Proc. IEEE CloudNet*, Luxembourg; 7 pages, 2014.
Vaishnavi, Ishan, et al. "Recursive, hierarchical embedding of virtual infrastructure in multi-domain substrates." Proceedings of the 1st IEEE Conference on Network Softwarization (NetSoft), London, UK, Apr. 2015; 9 pages.
Vasseur, JP., et al., "A Backward-Recursive PCE-Based Computation (BRPC) Procedure to Compute Shortest Constrained Inter-Domain Traffic Engineering Label Switched Paths," IETF RFC 5441, 19 pages, 2009.
W. Liu, et al., "Service function chaining general use cases," IETF internet draft, draft-liu-sfc-use-cases-08, Sep. 2014; 20 pages.
Xin, Yufeng, et al. "Embedding virtual topologies in networked clouds." Proceedings of the 6th ACM International Conference on Future Internet Technologies, New York, NY, 2011, pp. 26-29; 4 pages.
Y. Low, et al., "Distributed GraphLab: a framework for machine learning and data mining in the cloud," in *Proc. VLDB*, vol. 5, No. 8, 2012; 12 pages.
Zhang, Qiong, et al. "Resource Orchestration for Optically Interconnected Distributed Data Centers (Invited)." APC 2015; 20 pages.
Zhang, Qiong, et al. "Service function chaining in multi-domain networks." Optical Fiber Communications Conference and Exhibition (OFC), IEEE, 2016; 3 pages.
Zhang, Qiong, et al. "Vertex-centric computation of service function chains in multi-domain networks." NetSoft Conference and Workshops (NetSoft), IEEE, 2016; 8 pages.
Farris, Ivan, et al. "MIFaaS: A mobile-IoT-federation-as-a-service model for dynamic cooperation of IoT cloud providers." *Future Generation Computer Systems* 70 (Jun. 24, 2016): 126-137; 29 pages.
Kubernetes, "Pod Priority and Preemption." Retrieved on May 11, 2018 from url: https://kubernetes.io/docs/concepts/configuration/pod-priority-preemption/; 8 pages.
Github.com, https://github.com/docker/docker.github.io/blob/master/swarm/scheduler/strategy.md, Created Sep. 28, 2016, Retrieved May 11, 2018; 3 pages.
Docker Inc., "How services work", https://docs.docker.com/engine/swarm/how-swarm-mode-works/services/ May 11, 2018; 5 pages.
Šuňal, Martin. "Container Service Chaining." FRINX, Mar. 30, 2017, 45 pages.
Schneider, Joerg, and Barry Linnert. "List-based data structures for efficient management of advance reservations." *International Journal of Parallel Programming* 42.1 (Jan. 12, 2011): 77-93; 19 pages.
Wiki.openstack.org, "Blazer", https://wiki.openstack.org/wiki/Blazar, Retreieved May 11, 2018; 3 pages.
IBM, "What is advance reservation preemption?" http://www-01.ibm.com/support/docview.wss?uid=isg3T1022753, Sep. 13, 2016; 4 pages.

\* cited by examiner

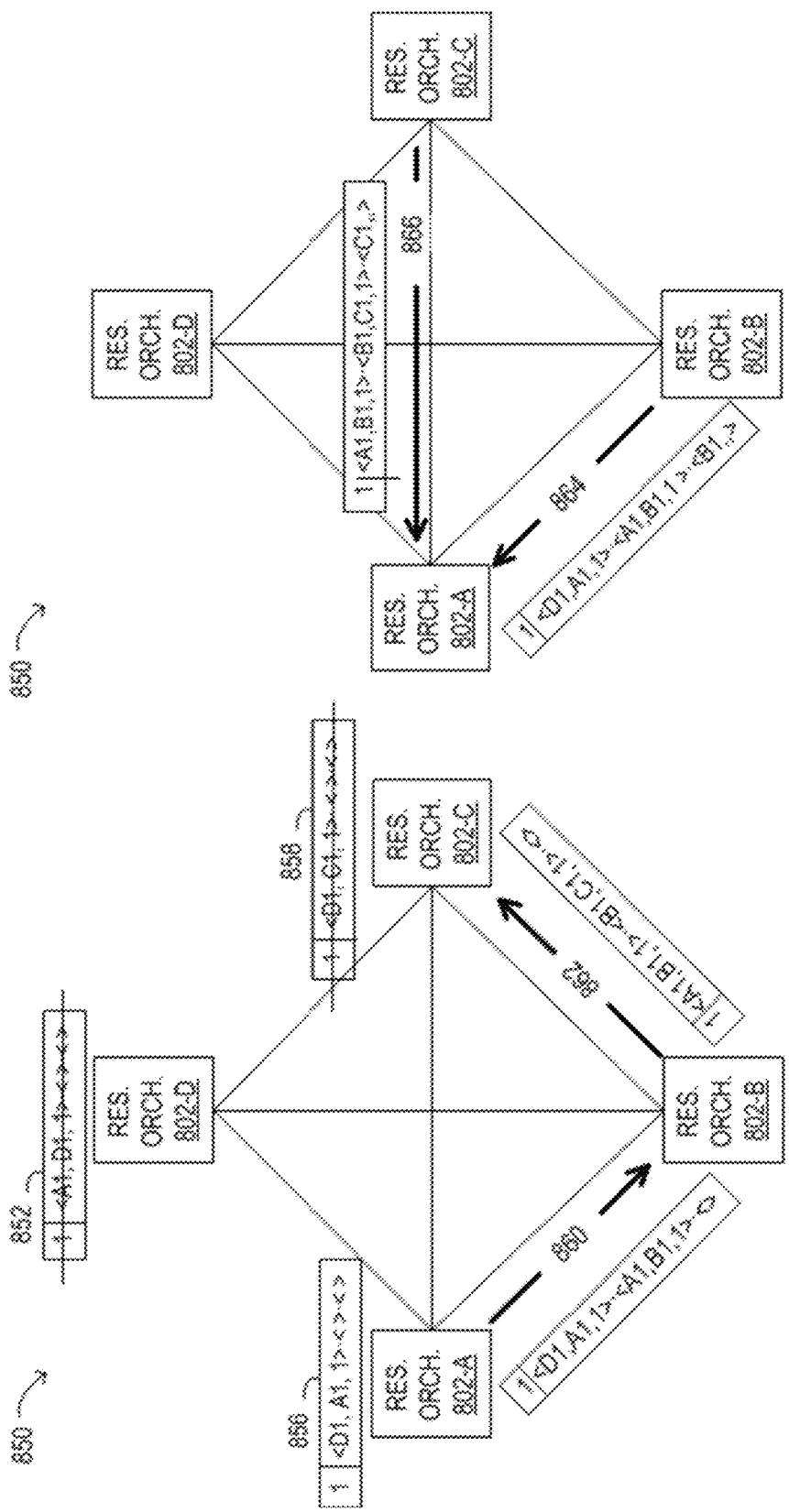

SERVICE FUNCTION CHAINING BASED ON RESOURCE AVAILABILITY IN THE TIME DIMENSION

CROSS-REFERENCE TO RELATED APPLICATIONS

This application is a continuation-in-part of U.S. patent application Ser. No. 15/175,940, filed Jun. 7, 2016, and entitled "VERTEX-CENTRIC SERVICE FUNCTION CHAINING IN MULTI-DOMAIN NETWORKS", which claims the benefit of priority under 35 U.S.C. § 119 from U.S. Provisional Patent Application Ser. No. 62/240,199, filed on Oct. 12, 2015, and entitled "SERVICE FUNCTION CHAINING IN MULTI-DOMAIN NETWORKS", both of which are incorporated herein by reference in their entirety for all purposes.

BACKGROUND

Field of the Disclosure

The present disclosure relates generally to network function virtualization and, more particularly, to systems and methods for performing vertex-centric service function chaining in multi-domain networks based on resource availability in the time dimension.

Description of the Related Art

Emerging network applications, such as cloud and big data applications, may involve joint consideration of IT resources residing within multiple domains within one or more data centers (DCs). Network function virtualization (NFV) can be used to virtualize network functions and migrate them from devices that are built for a single, specific purpose to multi-purpose virtual machines, which may reduce service deployment costs and improve service flexibility. As more service functions move to virtual machines in geographically distributed data centers and as more individually-managed Networks-on-Demand are enabled by software defined networking (SDN) technology, end-to-end network services may implement various mechanisms to coordinate resources across multi-domain networks. For example, a network service may traverse one or more consumer broadband networks, mobile backhaul networks, mobile packet core networks, and/or virtual private networks.

Traditional distributed routing protocols typically compute network paths without considering the availability of service functions and virtual machines at the individual network nodes. A hybrid architecture (e.g., one with geographically distributed orchestrators that replicate a global view of service functions, virtual machines, and networks) can lead to additional challenges, such as managing the global network state, maintaining the confidentiality of various network domains, and managing high computation complexity on a large-scale global view. An approach using path-computation element (PCE)-based multi-domain heuristics to for map virtual optical network requests would typically require a parent PCE to compute all possible inter-domain paths. Furthermore, mapping a single virtual link would typically require signaling along all possible inter-domain paths, which can result in significant signaling overhead for a very large number of paths in a large-scale network. Previously proposed virtual network mapping algorithms for multi-domain networks can be suitable for mapping service function chain (SFC) requests, but they typically require a centralized orchestrator to maintain a hierarchical topology for all domains in a multi-domain network.

Service function chaining may chain services at the edge of a cloud computing environment, where resources such as network bandwidth, and CPU and/or memory for launching virtual machines or containers are typically limited. Tasks executing within virtual machines or containers can incur queuing delays that are highly variable and difficult to predict, leading to unpredictable delays in setup times when launching tasks.

SUMMARY

In one aspect, a method for identifying a qualified service function chaining solution in a network is disclosed. The method may include receiving, at a resource orchestrator, a service function chain request specifying two or more service functions to be performed on respective physical nodes in the network and a first starting time at which to launch a first one of the two or more service functions specified in the service function chain request. Each physical node in the network may be represented as a vertex in a resource orchestration framework. The method may also include determining a first ending time for performance of the first service function that together with the first starting time defines a first time duration for performance of the first service function, identifying one or more vertices in the resource orchestration framework at which the first service function is available during the first time duration, mapping a first one of the identified vertices to the first service function in a candidate service function chain, determining a second starting time at which to launch a second one of the two or more service functions dependent on the first starting time, and providing the candidate service function chain, the first starting time, and the second starting time to a first neighbor vertex of the first one of the identified vertices.

In any of the disclosed embodiments, the method may further include determining a second ending time for performance of the second service function that together with the second starting time defines a second time duration for performance of the second service function, determining whether or not the second service function is available at the first neighbor vertex during the second time duration, and in response to determining that the second service function is available at the first neighbor vertex during the second time duration, mapping the first neighbor vertex to the second service function in the candidate service function chain to extend the candidate service function chain.

In any of the disclosed embodiments, the method may further include determining a third starting time at which to launch a third one of the two or more service functions dependent on the second time duration, and providing the extended candidate service function chain, the second starting time, and the third starting time to a second neighbor vertex of the first neighbor vertex.

In any of the disclosed embodiments, the method may further include determining that the mapping of the first neighbor vertex to the second service function in the candidate service function chain completes the candidate service function chain and providing the completed candidate service function chain, the first starting time, and the second starting time to the resource orchestrator.

In any of the disclosed embodiments, determining the first ending time for performance of the first service function may include calculating the first ending time dependent on the first starting time, a setup time for provisioning resources to perform the first service function, a processing time for performing the first service function, and a time duration for a packet flow that includes a plurality of packets on whose behalf the first service function is to be performed.

In any of the disclosed embodiments, determining the second starting time at which to launch the second service function may be further dependent on a processing time for performing the first service function and a propagation delay between the first one of the identified vertices and the first neighbor vertex.

In any of the disclosed embodiments, identifying the one or more vertices in the resource orchestration framework at which the first service function is available during the first time duration may include, at each of a plurality of vertices including the one or more vertices, applying a void filling resource allocation policy or a non-void filling resource allocation to determine whether or not resources for performing the first service function are available at the vertex during the first time duration.

In any of the disclosed embodiments, the method may further include determining whether or not a physical link between the first one of the identified vertices and the first neighbor vertex meets qualifications specified for the service function chain request and providing the candidate service function chain, the first starting time, and the second starting time to the first neighbor vertex of the first one of the identified vertices in response to determining that the physical link between the first one of the identified vertices and the first neighbor vertex meets the qualifications specified for the service function chain request.

In another aspect, a resource orchestration framework in a network including a plurality of physical nodes is disclosed. Each physical node may include circuitry or logic to perform a subset of a plurality of service functions supported in the network. The resource orchestration framework may include a plurality of vertices, each representing a respective one of the physical nodes in the network, and a resource orchestrator. Each of the plurality of vertices may include a vertex processor and a vertex memory that stores program instructions that when executed by the vertex processor cause the vertex processor to perform a compute function that is common among the vertices in the resource orchestration framework. The resource orchestrator may include an orchestrator processor and an orchestrator memory that stores program instructions. When executed by the orchestrator processor, the program instructions may cause the orchestrator processor to perform receiving a service function chain request specifying two or more service functions to be performed on respective ones of the physical nodes in the network and specifying a first starting time at which to launch a first one of the two or more service functions specified in the service function chain request, coordinating execution of two more supersteps of the common compute function on multiple ones of the plurality of vertices. During a first superstep of the common compute function, execution of the common compute function on a first one of the identified vertices may include determining a first ending time for performance of the first service function that together with the first starting time defines a first time duration for performance of the first service function, identifying one or more vertices in the resource orchestration framework at which the first service function is available during the first time duration, mapping a first one of the identified vertices to the first service function in a candidate service function chain, determining a second starting time at which to launch a second one of the two or more service functions dependent on the first starting time, and providing the candidate service function chain, the first starting time, and the second starting time to a first neighbor vertex of the first one of the identified vertices.

In any of the disclosed embodiments, during a second superstep of the common compute function, execution of the common compute function on the first neighbor vertex may include, in response to obtaining the candidate service function chain, the first starting time, and the second starting time, determining a second ending time for performance of the second service function that together with the second starting time defines a second time duration for performance of the second service function, determining whether or not the second service function is available at the first neighbor vertex during the second time duration, and in response to determining that the second service function is available at the first neighbor vertex during the second time duration, mapping the first neighbor vertex to the second service function in the candidate service function chain to extend the candidate service function chain.

In any of the disclosed embodiments, during the second superstep of the common compute function, the execution of the common compute function on the first neighbor vertex may further include determining a third starting time at which to launch a third one of the two or more service functions dependent on the second time duration and providing the extended candidate service function chain, the second starting time, and the third starting time to a second neighbor vertex of the first neighbor vertex.

In any of the disclosed embodiments, during the second superstep of the common compute function, the execution of the common compute function on the first neighbor vertex may further include determining that the mapping of the first neighbor vertex to the second service function in the candidate service function chain completes the candidate service function chain and providing the completed candidate service function chain, the first starting time, and the second starting time to the resource orchestrator.

In any of the disclosed embodiments, when executed by the orchestrator processor, the program instructions stored on the orchestrator memory may further cause the orchestrator processor to perform provisioning resources on the physical nodes represented by the vertices in the extended candidate service function chain. The provisioning may include, at each physical node represented by a vertex in the extended candidate service function chain, instantiating, at the respective starting time for launching the service function mapped to the vertex, a virtual machine or container in which the service function mapped to the vertex is to be executed. The program instructions stored on the orchestrator memory may further cause the orchestrator processor to perform relinquishing the provisioned resources on the physical nodes represented by the vertices in the extended candidate service function chain. The relinquishing may include, at each physical node represented by a vertex in the extended candidate service function chain, pausing or deleting the virtual machine or container in which the service function mapped to the vertex was executed at the respective ending time for performance of the service function.

In any of the disclosed embodiments, determining the first ending time for performance of the first service function may include calculating the first ending time dependent on the first starting time, a setup time for provisioning resources to perform the first service function, a processing time for performing the first service function, and a time duration for a packet flow that includes a plurality of packets on whose behalf the first service function is to be performed.

In any of the disclosed embodiments, determining the second starting time at which to launch the second service function may be further dependent on a processing time for performing the first service function and a propagation delay between the first one of the identified vertices and the first neighbor vertex.

In any of the disclosed embodiments, each of the plurality of vertices may maintain data representing, for each service function supported on the physical node represented by the vertex, a time duration for which resources for performing the service function are currently allocated or a time duration during which resources for performing the service function are available for provisioning on behalf of a service function chain request.

In any of the disclosed embodiments, the network may be a multi-domain network including a plurality of network domains, each including one or more of the plurality of physical nodes. The resource orchestration framework may include a plurality of resource orchestrators, including the resource orchestrator, each of which is associated with a respective domain in the multi-domain network, and each of which coordinates the execution of the two more supersteps of the common compute function on vertices in its respective domain. The first neighbor vertex may reside in a different domain of the multi-domain network than the domain in which the first identified vertex resides.

In any of the disclosed embodiments, identifying the one or more vertices in the resource orchestration framework at which the first service function is available during the first time duration may include, at each of a plurality of vertices including the one or more vertices, applying a void filling resource allocation policy or a non-void filling resource allocation to determine whether or not resources for performing the first service function are available at the vertex during the first time duration.

In any of the disclosed embodiments, when executed by the orchestrator processor, the program instructions stored on the orchestrator memory may further cause the orchestrator processor to perform determining whether or not a physical link between the first one of the identified vertices and the first neighbor vertex meets qualifications specified for the service function chain request, and providing the candidate service function chain, the first starting time, and the second starting time to the first neighbor vertex of the first one of the identified vertices in response to determining that the physical link between the first one of the identified vertices and the first neighbor vertex meets the qualifications specified for the service function chain request.

In any of the disclosed embodiments, when executed by the orchestrator processor, the program instructions stored on the orchestrator memory may further cause the orchestrator processor to perform selecting, from among the completed candidate service function chain and one or more other completed candidate service function chains, one or more service function chain solutions for execution. The selection may be dependent on a service provider policy, a service provider constraint, or a requestor on whose behalf the service function chain request was received.

BRIEF DESCRIPTION OF THE DRAWINGS

For a more complete understanding of the present invention and its features and advantages, reference is now made to the following description, taken in conjunction with the accompanying drawings, in which:

FIGS. 8A-8D illustrate an example of vertex-centric distributed computing for generating one or more candidate solutions to a service function chain request, according to one embodiment;

DESCRIPTION OF THE EMBODIMENT(S)

Figure 1:
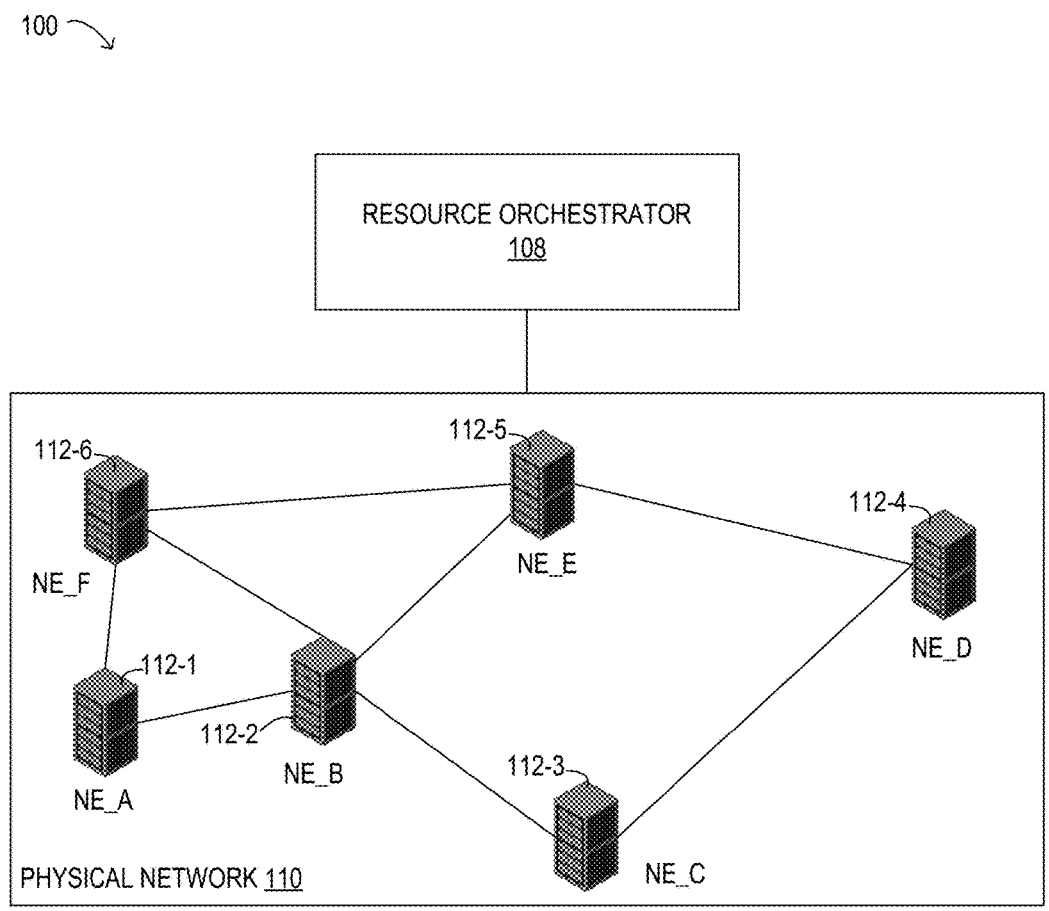
FIG. 1 illustrates selected elements of a distributed resource orchestration framework, according to at least some embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

As will be described herein, a distributed resource orchestration framework is disclosed that provides a scalable vertex-centric distributed approach for identifying all qualified service function chain (SFC) solutions in a multi-domain network. In some embodiments, the distributed resource orchestration framework disclosed herein may apply vertex-centric distributed processing approach that enables different vertices to exchange information about possible SFC solutions iteratively using controller messages until all possible solutions have been identified. In some embodiments of the distributed resource orchestration framework disclosed herein, each domain resource orchestrator managing the resources of a network domain may send messages to each vertex in its network domain, and the domain resource orchestrators may communicate with each other using controller messages. Simulation results have demonstrated superior efficiency and scalability for computing a large SFC request when compared to a centralized algorithm.

Turning now to the drawings, FIG. 1 illustrates selected elements of a distributed resource orchestration framework, according to at least some embodiments. More specifically, FIG. 1 illustrates an example embodiment of a network domain 100, which is based on vertices that are individual network elements (NE). In FIG. 1, network domain 100 is shown including domain-specific resource orchestrator 108, and physical network 110. In some embodiments, physical network 110 may be an underlying optical network, such as an optical transport network (OTN) or a flexible optical data plane (e.g., flexible transceivers) configured to adjust the bandwidth of connections.

In FIG. 1, resource orchestrator 108 may manage or coordinate the use of resources within network domain 100, shown comprising multiple network elements 112. Network elements 112 may represent various types of network functionality, such as switches, routers, etc., and may include hardware to interconnect various types of physical interfaces. Network domain 100 comprises network element NE_A 112-1, network element NE_B 112-2, network element NE_C 112-3, network element NE_D 112-4, network element NE_E 112-5, and network element NE_F 112-6, along with connections between the network elements that may have different distances. Thus, network domain 100 may represent a network topology for a single network domain, the use of whose resources are coordinated by resource orchestrator 108. Note that, in some embodiments, various network management functions for network domain 100 other than those provided by resource orchestrator 108 may be provided by a dedicated (e.g., domain-specific) SDN controller (not shown). When larger networks include multiple network domains, each individual network domain may be managed by a respective SDN controller.

As disclosed in further detail herein, network domain 100 may be included in a multi-domain network that uses a distributed processing approach and in which controller messages are exchanged between a plurality of resource orchestrators and/or network controllers, such as resource orchestrator 108 and/or an SDN controller, each of which is associated with a respective one of a plurality of network domains, such as physical network 110. As described herein, the resource orchestrators may work collaboratively to execute an SFC in the multi-domain network, which may include identifying all possible SFC solutions, selecting one or more of the possible SFC solutions for execution (e.g., dependent on user preferences or various policies), and configuring the physical resources of various network nodes to implement the selection solution(s).

As previously noted, network function virtualization (NFV) may be used to virtualize network functions and migrate them from devices that are built for a single, specific purpose to multi-purpose virtual machines on commercial off-the-shelf servers, which may reduce service deployment costs and improve service flexibility. In systems that implement NFV, in order to provide an end-to-end network service, virtual network functions (VNFs) may need to be invoked in a sequential order, referred to as a service function chain (SFC). Service function chaining may involve configuring and/or allocating various virtual machines (VMs) to run these virtualized network functions, and may also involve steering traffic across one or more networks. For example, a traffic flow may be steered through a number of virtual network functions (VNFs) or service functions (SFs) in a specific order based on the service provider's policies and/or on user preferences. In some embodiments of the distributed resource orchestration frameworks described herein, service function chaining may be supported by the application of resource orchestration. For example, in some embodiments, a plurality of resource orchestration elements, referred to herein as resource orchestrators, may collectively and individually manage and coordinate the use of various resources (including service functions, virtual machines, and networks) at each data center, as well as the associated network resources to interconnect the VNFs. With the migration of VNFs to VMs in geographically distributed datacenters and the rollout of SDN controlled on-demand connectivity in IP/OTN networks, distributed resource orchestration across multi-domain networks, as described herein, may be highly beneficial for providing end-to-end network services. For example, a network service may span across multiple networks such as consumer broadband, mobile backhaul, mobile packet core, and/or virtual private networks (including, e.g., networks implemented on the 1Finity™ platform from Fujitsu Network Communications Inc.).

In various embodiments of the present disclosure, a large-scale multi-domain network may include many different domains, and these domains may have different network technologies, different vendors, different administration, different types of resources, and/or different virtualized networks. These domains may include domains in which reside Internet of Things (IoT) devices, computing resources, storage resources, and/or different types of service functions (including access service functions, metro service functions, and/or core service functions). In at least some embodiments, these multi-domain networks may preserve confidentiality among domains and improve scalability for service providers. In at least some of the multi-domain orchestration architectures described herein, each domain may be controlled by a local orchestrator, and vertex-centric distributed computing among the orchestrators may provide for end-to-end resource allocation.

Figure 2:
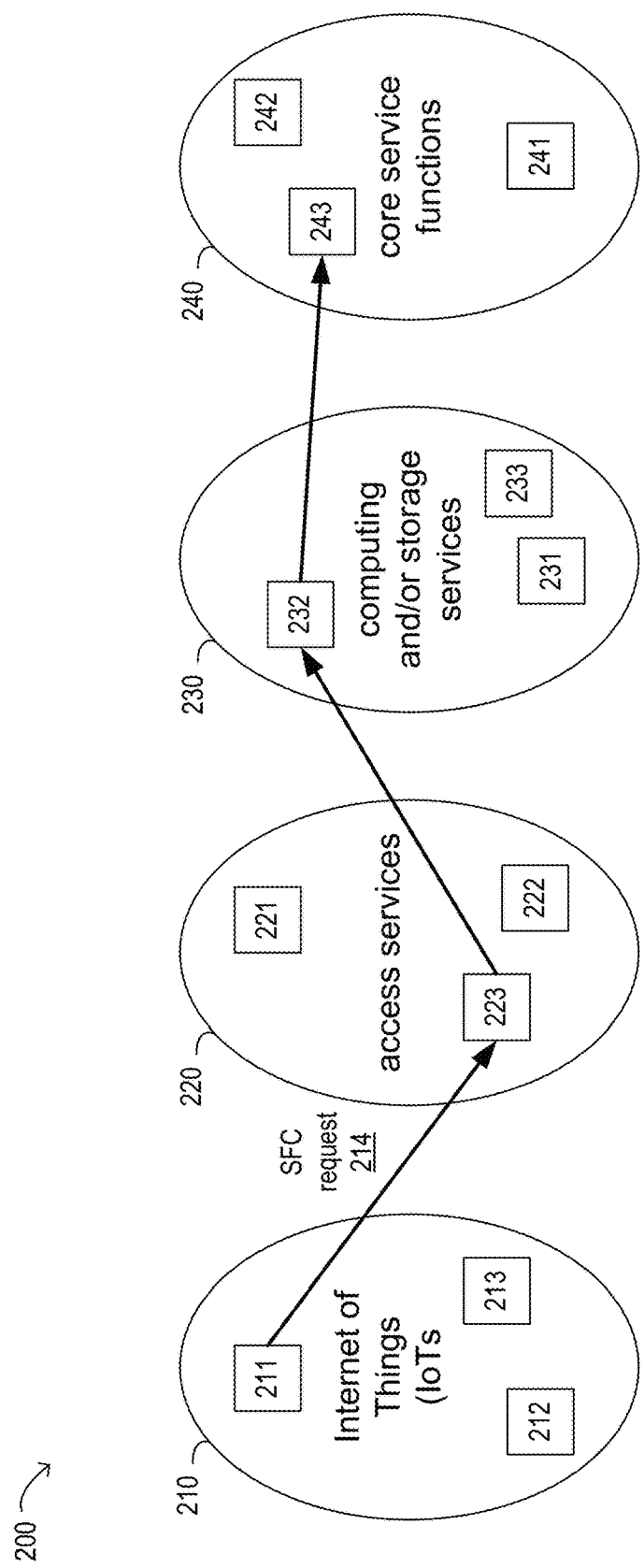
FIG. 2 is a block diagram illustrating selected elements of a multi-domain network for providing end-to-end services, according to one embodiment.

FIG. 2 is a block diagram illustrating selected elements of a multi-domain network for providing end-to-end services, according to one embodiment. In this example embodiment, multi-domain network 200 includes four domains, shown as domains 210, 220, 230, and 240. Each of these domains may include one or more nodes (vertices), at least some of which may implement one or more service functions using the resources within that domain. The first domain, domain 210, represents the Internet of Things (IoTs), various devices of which may issue service function chain requests. Three such devices are illustrated in FIG. 2 as devices 211, 212, and 213, although any number of devices may be included in domain 210, in different embodiments. In this example embodiment, the second domain, domain 220, represents one or more data centers or other entities that provide access services that may be included in a service function chain. Three such services are illustrated in FIG. 2 as services 221, 222, and 223, although any number of devices may be included in domain 220, in different embodiments.

In this example embodiment, the third domain, domain 230, represents one or more data centers or other entities that provide computing and/or storage services that may be included in a service function chain. Three such services are illustrated in FIG. 2 as services 231, 232, and 233, although any number of devices may be included in domain 230, in different embodiments. In this example embodiment, the fourth domain, domain 240, represents one or more data centers or other entities that provide core service functions that may be included in a service function chain. Three such services are illustrated in FIG. 2 as core service functions 241, 242, and 243, although any number of devices may be included in domain 240, in different embodiments.

In the example illustrated in FIG. 2, device 211 within domain 210 has issued a service function chain request 214, which includes at least one access service, one computing or storage service, and one core service function. More specifically, service function chain request 214 specifies a service function chain that includes an access service function 223 (which is available on one of the nodes/vertices within domain 220), a computing or storage service function 232 (which is available on one of the nodes/vertices within domain 230), and a core service function 243 (which is available on one of the nodes/vertices within domain 240).

As described in detail herein, in various embodiments, the systems and method described herein for performing vertex-centric distributed computing to identify all qualified service function chain (SFC) solutions for an SFC request may be applied in systems that include network function virtualization, mobile edge computing, and/or IoTs with data analytics, and in which traffic traverses a sequence of service function instances across multiple domains.

In at least some embodiments of the present disclosure, each domain in a multi-domain network may include physical nodes and IP/OTN links. In at least some embodiments, a respective resource orchestrator may be associated with each network domain to manage all the physical nodes and links within its domain. In some embodiments, each physical node may include network elements (e.g., OTN switch, router) and/or compute servers and storage elements (e.g., datacenters) capable of invoking a subset of service functions selected from a catalog of service functions. Some examples of the service functions provided in these multi-domain networks include firewalls, deep packet inspection (DPI), network address translation (NAT), load balancers, and parental control functions. In one example, a service function chain may include a firewall, a deep packet inspection (DPI) service function, a parental control service function, and an anti-virus service function, each of which may be provided by nodes in a different network domain. In another example, a service function chain may include a network address translation (NAT) service function between two other types of service functions and/or between other service functions and an internet access service function, each of which is provided by nodes in a different network domain.

Figure 3:
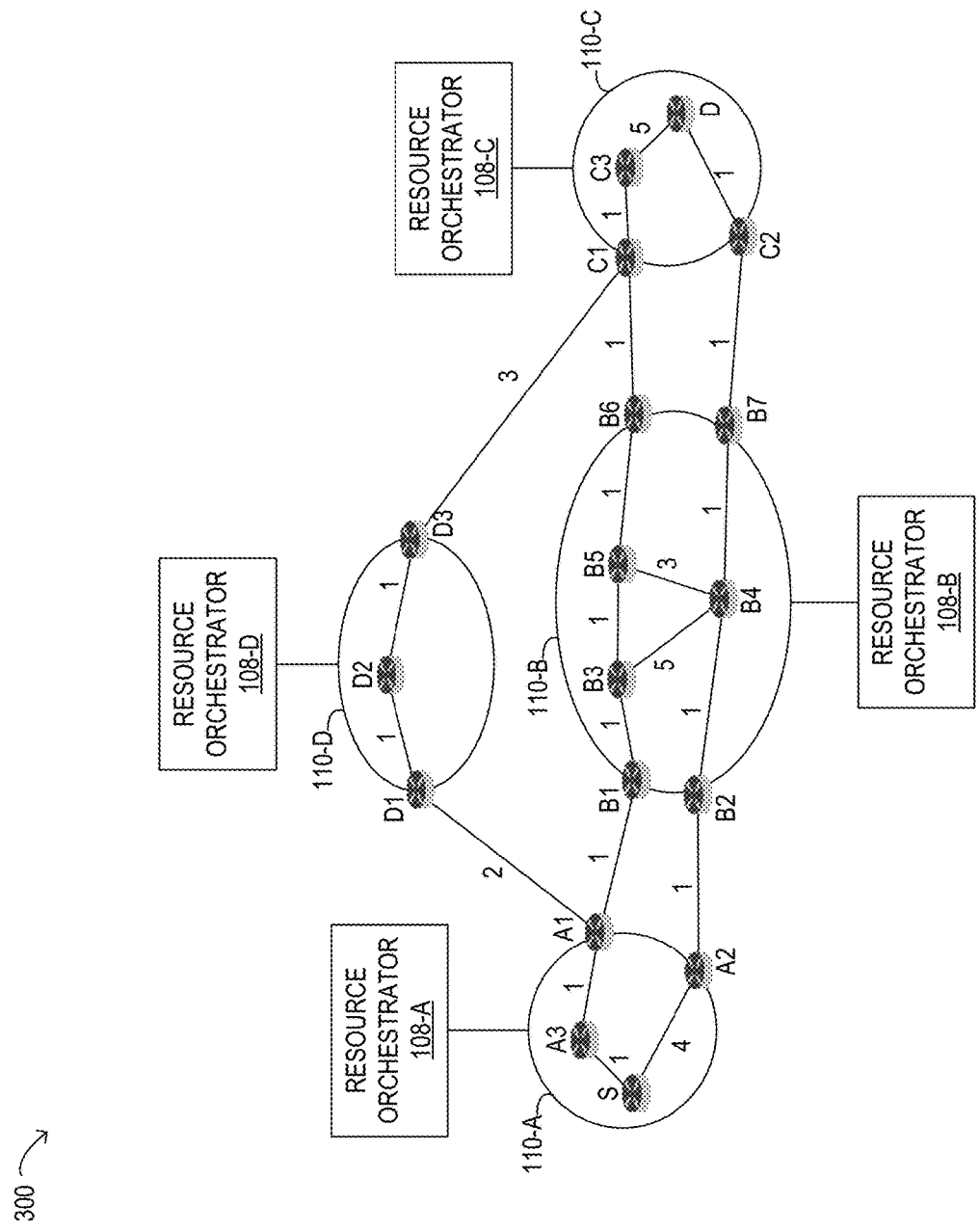
FIG. 3 is a network diagram illustrating selected elements of multiple distributed network domains, according to one embodiment.

Referring now to FIG. 3, selected elements of multiple distributed network domains are shown as a network diagram. In this example embodiment, the distributed network domains represent an exemplary embodiment of a multi-domain network 300 in which the use of resources for satisfying an SFC request is coordinated by a respective plurality of resource orchestrators 108, such as those illustrated in FIG. 1 and described herein. Although the distributed network domains within multi-domain network 300 are shown as a specific network topology, it will be understood that various different types and sizes of networks and different numbers of network domains may be used with the network service computation system disclosed herein. Note that the distributed network domains within multi-domain network 300 are shown as a schematic illustration and are not drawn to scale.

In FIG. 3, multi-domain network 300 includes a plurality of domains 110, each comprised of individual vertices. A vertex may represent any of a variety of network nodes, such as a switch, a router, a network element, a data center, a sub-network, a sub-domain, among others. Thus, each vertex may be enabled to provide network connectivity to other vertices, as well as computational resources, such as for providing network services and supporting network applications. As shown, a connection link is provided between vertices and is labeled in FIG. 3 with an integer value representing a relative path distance for the connection link. This relative path distance may represent a delay between the vertices or other edge information (e.g., bandwidth), in other embodiments. It is noted that the connection links may be intra-domain and inter-domain.

The vertices in multi-domain network 300 represent a reachable network of vertices that may provide potential paths between a source vertex S and a destination vertex D. In this example, each domain has a local orchestrator 108. For example, resource orchestrator 108-A may coordinate the use of resources within domain 110-A, which includes source vertex S, and vertices A1, A2, and A3; resource orchestrator 108-B may coordinate the use of resources within domain 110-B, which includes vertices B1, B2, B3, B4, B5, B6, and B7; resource orchestrator 108-C may coordinate the use of resources within domain 110-C, which includes vertices C1, C2, C3, and destination vertex D; and resource orchestrator 108-D may coordinate the use of resources within domain 110-D, which includes vertices D1, D2, and D3. In some embodiments of the distributed network domains shown within multi-domain network 300, each resource orchestrator 108 (and/or an SDN controller for the domain) may communicate with vertices in its own respective domain 110, while the vertices may refrain from communicating with each other.

In some embodiments, when computing service function chaining requests, each vertex (node) may send and receive messages inside a compute function to and from its vertex neighbors. For example, vertex (node) A1 has three edges, as it has three vertex neighbors that it can communicate with, and a common compute function. Vertex A1 may also have node information indicating, for example, the number of compute resources available on the node, the number of storage resources available on the node, the vertex ID for the node, and the service functions that are implemented and available on the node. In at least some embodiments, the resource orchestrators associated with different domains may be interconnected via control channels for communication to compute requests (e.g., service function chaining requests), based on the vertex-centric distributed processing described herein.

In at least some embodiments, the resource orchestrators (such as various ones of the resource orchestrators 108 illustrated in FIGS. 1 and 3) may communicate with each other and may be networked together using any suitable topology, such as a mesh, a ring, a star, or a bus, among others. Similarly, SDN controllers for the domains may communicate with each other and may be networked together using any suitable topology, such as a mesh, a ring, a star, or a bus, among others. In some embodiments, the communication among resource orchestrators 108 and/or among SDN controllers may employ a sideband network channel, or other network connection for management purposes, that does not otherwise interfere with the network connections between vertices, which may represent a payload network offered as a commercial service to customers by a service provider.

In at least some embodiments, the resource orchestrators (such as various ones of the resource orchestrators 108 illustrated in FIGS. 1 and 3) may send messages to each other to compute a final result for a distributed computation to solve a service function chain request. In such embodiments, each resource orchestrator may maintain a logical representation of the physical infrastructure of its own domain, where the vertices in the resource orchestration architecture represent the physical nodes in that domain. In at least some embodiments, in addition to maintaining vertex information (such as the node information described above), each vertex may also maintain information about its incoming and outgoing edges, and a common compute function, which is user-defined function. In at least some embodiments, for distributed computing among orchestrators, a computation may be broken down into iterations, called supersteps. In each superstep, each orchestrator may coordinate the execution of the compute functions of each vertex within its domain.

Figure 4:
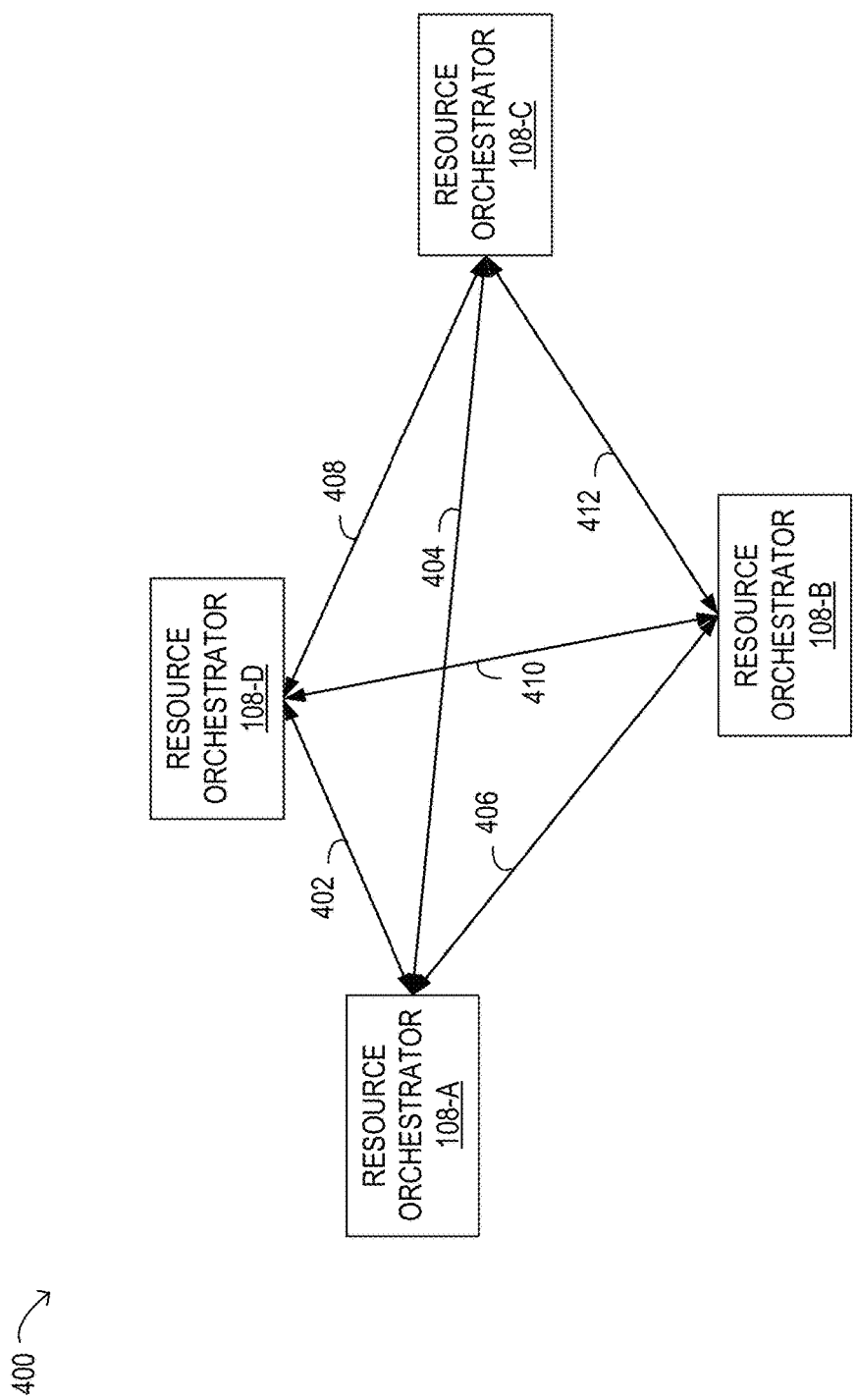
FIG. 4 illustrates a distributed resource orchestration architecture, including communication channels (or links) between respective resource orchestrators of different domains, according to one embodiment.

FIG. 4 illustrates a distributed resource orchestration architecture 400, including the communication channels (or links) between the respective resource orchestrators of the different domains illustrated in FIG. 3. In this example, the link between resource orchestrator 108-A (which coordinates the use of resources within domain 110-A) and resource orchestrator 108-B (which coordinates the use of resources within domain 110-B) is shown as link 406. Similarly, the link between resource orchestrator 108-A and resource orchestrator 108-C (which coordinates the use of resources within domain 110-C) is shown as link 404; the link between resource orchestrator 108-A and resource orchestrator 108-D (which coordinates the use of resources within domain 110-D) is shown as link 402; the link between resource orchestrator 108-B and resource orchestrator 108-D is shown as link 410; the link between resource orchestrator 108-C and resource orchestrator 108-D is shown as link 408; and the link between resource orchestrator 108-B and resource orchestrator 108-C is shown as link 412.

In the example illustrated in FIG. 3 and FIG. 4, there are four network domains, and each network domain may include multiple physical nodes and optical transport network (OTN) overlay links. Each physical node may be a switch, router, or data center that includes one or more virtual machines and that is capable of invoking a set of service functions. For example each physical node may be capable of providing a firewall, deep packet inspection (DPI), a WAN optimization controller (WOC), customer premises equipment (CPE), a provider edge (PE) or, in general, any type of service function.

In various embodiments of the present disclosure, a distributed resource orchestration framework and a vertex-centric distributed algorithm may be employed for finding all qualified SFCs in multi-domain networks. In some embodiments, after identifying all qualified chains, one or more SFCs may be selected for execution based on any suitable criteria. For example, an SFC may be selected for execution that best reflects user preferences for resource usage or other policy decisions. In another example, the lowest-cost disjoint SFC may be selected (e.g., to address protection concerns). In yet another example, multiple parallel SFCs may be selected for execution, according to a user preference or an applicable SFC selection policy.

In at least some embodiments, an SFC request may include information specifying the following request elements: the service functions to be performed, the resources required to perform those service functions (e.g., the required number of virtual machines and/or storage resources), and delay or bandwidth requirements for the links between the nodes on which the different service functions in the chain are to be performed.

Figure 5:
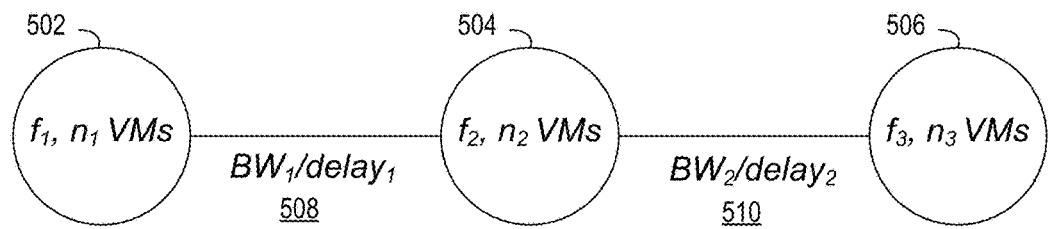
FIG. 5 depicts an abstraction of an example SFC request, according to one embodiment.

FIG. 5 depicts an abstraction of an example SFC request 500, according to one embodiment. In this example, to satisfy SFC request 500, the distributed resource orchestration mechanism may need to identify a first node 502 that includes $n_1$ virtual machines (VMs) and can perform a first service function, $f_1$; a second node 504 that includes $n_2$ virtual machines (VMs) and can perform a second service function, $f_2$; and a third node 506 that includes $n_3$ virtual machines (VMs) and can perform a third service function, $f_3$. In addition, the distributed resource orchestration mechanism may need to verify that the link between node 502 and node 504 meets a first set of bandwidth and/or delay requirements 508 (e.g., $BW_1$ and/or $delay_1$), and that the link between node 504 and node 506 meets a second set of bandwidth and/or delay requirements 510 (e.g., $BW_2$ and/or $delay_2$).

In contrast to other types of virtual network requests, SFC requests may include two unique characteristics: they may be more linear in topology, and they may be flexible in terms of the order in which the service functions are executed, in some cases. Based on these characteristics of SFC requests, the distributed algorithm described herein may apply a vertex-centric distributed computing approach to solve service function chaining in multi-domain networks. In some embodiments, multiple service functions in an SFC can be mapped to a single physical node.

Figures 6A, 6B:
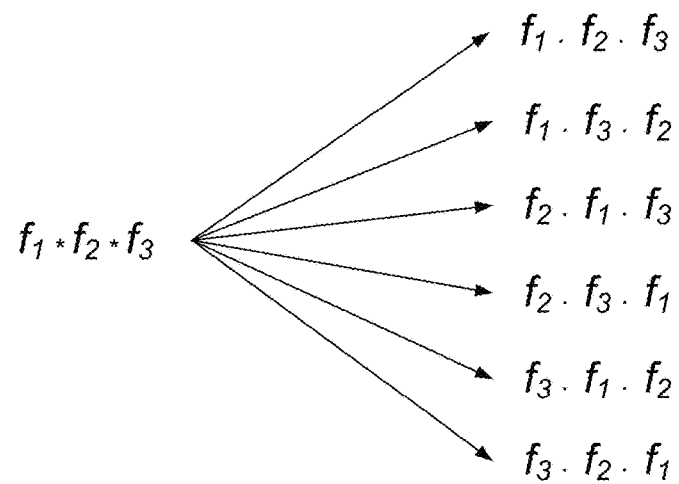
FIGS. 6A and 6B illustrate an example mapping between an SFC request specifying a flexible-ordered service function chain and six possible fixed-ordered chains, any of which, if found, would satisfy this request, according to one embodiment.

FIGS. 6A and 6B illustrate an example mapping between an SFC request specifying a flexible-ordered service function chain, $f_1*f_2*f_3$ (shown in FIG. 6A) and six possible fixed-ordered chains, any of which, if found, would satisfy this request. These six fixed-ordered chains are shown in FIG. 6B as $f_1 \cdot f_2 \cdot f_3$, $f_1 \cdot f_3 \cdot f_2$, $f_2 \cdot f_1 \cdot f_3$, $f_2 \cdot f_3 \cdot f_1$, $f_3 \cdot f_1 \cdot f_2$, and $f_3 \cdot f_2 \cdot f_1$. In these figures, the symbol "*" between functions denotes a flexible ordering and the symbol "•" between functions denotes a fixed order.

As previously noted, in various embodiments, a vertex-centric distributed processing approach may include performing iterations of supersteps that are sequentially executed. Each superstep may involve receiving controller messages or information at one or more resource orchestrators (such as various ones of the resource orchestrators 108 illustrated in FIG. 1, 3, or 4) or SDN controllers, performing local actions (in this case, executing a common compute function) at respective network domains 110, and then sending out controller messages to other resource orchestrators 108 or SDN controllers. It is noted that a vertex-centric distributed processing approach may be employed with a suitable network operating system using distributed network domains such as those illustrated in FIGS. 2, 3, and 4. In some embodiments, a resource orchestrator 108 or an SDN controller for each network domain 110 may keep track of the network topology of its respective network domain 110.

In some embodiments, the controller messages may be inter-domain messages sent with respect to a sending vertex and a target vertex that are in different domains. In some embodiments, each controller message may include: a sending vertex identifier; a target vertex identifier, and a minimum distance from source vertex S to the target vertex. It is noted that in various embodiments, different numbers of supersteps may result in the identification of all possible SFC solutions.

As previously noted, in some embodiments, each network domain may include (or be associated with) a respective resource orchestrator that manages (and coordinates the use of) the physical nodes and links within its domain. These distributed resource orchestrators may be interconnected by control channels (e.g., in-band control channels or out-of-band control channels, in different embodiments). In at least some embodiments, each orchestrator may store information about each physical node as a vertex data structure and may store information about each overlay OTN link as an edge data structure. In at least some embodiments, each vertex data structure may include a current value, a set of incoming/outgoing edges, and a common compute( ) function (an example embodiment of which is illustrated by pseudo-code shown later), which may be a user-defined function. In at least some embodiments, each edge data structure may include information about a respective OTN link, such as its bandwidth, delay information, information about the cost to use the link, and/or any other information usable in the system. In some embodiments, each vertex may be able to send and/or receive messages to and/or from other vertices. Messages may be delivered in memory (e.g., if they are exchanged between vertices that are within the same network domain or are controlled by the same orchestrator), while messages exchanged between vertices that are in different network domains or are controlled by different orchestrators may be delivered via various control channels.

Distributed Service Function Chaining Algorithm

In at least some embodiments of the distributed resource orchestration framework described herein, there may be no global network topology and no global node information available. Instead, each orchestrator may only have access to a partition of a global network topology. In such embodiments, in order to identify one or more candidate solutions for an SFC request, a vertex-centric distributed process may be adopted, in which each computation is broken down into iterations, called supersteps. In such embodiments, in each superstep, the compute( ) function of each vertex may be executed once. For example, in some embodiments, upon the arrival of an SFC request, a source orchestrator may send the SFC request to all participating orchestrators and may coordinate all orchestrators to execute the compute( ) function in each superstep. During each superstep, these compute functions may be executed substantially in parallel on vertices (nodes) in different domains, but they may synchronize with each other at the end of each superstep. For example, before moving on to the next superstep, the resource orchestrators may ensure that message exchanges for the current superstep have ceased and that all of the vertices received the controller messages that they were supposed to receive from the other vertices over the control channels.

Once a qualified solution to an SFC request is found at a vertex, it may be emitted to the source orchestrator. The distributed computing may halt when there are no further messages exchanged between orchestrators. In some embodiments, after obtaining all qualified SFC solutions from the participating orchestrators, the source orchestrator may select an optimal multi-domain SFC solution for execution based on various user preferences and/or applicable resource usage policies, and may inform the associated orchestrators (e.g., those that manage the resources selected to execute the requested SFC) that they should configure the physical nodes within their own domains accordingly (e.g., as needed to perform the various functions of the SFC). As previously noted, in some embodiments (e.g., dependent on various user preferences and/or applicable resource usage policies), the source orchestrator may select two or more of the possible SFC solutions for execution in parallel. In such embodiments, the source orchestrator may inform all of the orchestrators associated with the selected SFC solutions that they should configure the physical nodes within their own domains to perform particular ones of the functions of the SFC.

In some embodiments, providing distributed service function chaining, given a multi-domain network topology (a physical infrastructure topology) that includes vertices (nodes) and edges (links between the nodes), given a set of service functions and the number of compute and/or storage resources available at each vertex, and given the delay and bandwidth at each edge, may include identifying all possible solutions for an SFC request. As previously noted, each SFC request may specify a sequence of service functions. Each service function may use a certain number of compute and/or storage resources (e.g., virtual machines) and may require a certain amount of bandwidth (or have an upper limit on delay) for outgoing traffic. In some embodiments, after identifying all feasible mapping solutions for an SFC request, the solutions may be pruned according to various policies, requirements, or constraints imposed by a service provider or the requestor of the services. For example, they may be pruned to include only those solutions that have the lowest total cost or the lowest total delay, a subset of solutions that include multiple disjoint chains, those solutions that do (or do not) include bi-directional chains, or that meet multiple different constraints. In some embodiments, the solutions may be pruned by a load balancer that selects a mapping solution based on the current loading on the nodes that are mapped to the service functions in the chain.

In some embodiments, the computing of a solution (or set of solutions) for an SFC request may be a non-deterministic polynomial-time hard (NP-hard) problem. In some cases, more complicated SFC requests (e.g., mesh requests) may be divided into multiple sequential SFC requests, and the results may subsequently be merged back together in order to satisfy these requests.

In at least some embodiment of the present disclosure, a vertex value data structure and a controller message format may be defined for a vertex-centric distributed computing approach for solving service function chaining in multi-domain networks. Note that this vertex data structure and message format may be specific for this particular distributed computing problem. Table 1 below illustrates an example vertex value data structure for use in this context, according to at least one embodiment.

TABLE 1

Vertex Value vertexID (the current vertex ID
$\{f_i\}$: a set of service functions available at the vertex
a set of resources at the vertex (e.g., VMs, storage, etc.)

In this example, the vertex value data structure includes a vertex identifier, a set of service functions that are available at the vertex, and a set of resources available at the vertex (which may include compute and/or storage resources). In some embodiments, the set of service functions that are available at the vertex may be a subset of the service functions that are supported in the multi-domain network or may be a subset of the service functions that are implemented at the vertex (e.g., if some of the service functions are not currently available for inclusion in an SFC request solution). Table 2 below illustrates an example controller message format for use in this context, according to at least one embodiment.

TABLE 2

Controller Message Format requestID
the current chain

In this example, each message exchanged as part of a vertex-centric distributed computation for identifying solutions to an SFC request in a multi-domain network may include an identifier of the SFC request, and the current SFC chain (which may be a partially mapped chain or a completed chain, in different controller messages).

In at least some embodiments, the vertex-centric distributed SFC algorithm that is applied to identify all possible SFC solutions for a given SFC request may include three major components: the vertex value, the message format, and the compute( ) function, examples of which are shown in Table 1, in Table 2 above, and in the pseudo-code below, respectively. As shown in Table 2, which describes an example of the message format, the current chain may include a sequence of elements of the form <vertexID, nextVertexID, edge info>, each representing a vertex with a particular vertexID that may have been mapped to a corresponding function. In these elements, empty brackets (shown as < >) may indicate that the corresponding function has not yet been mapped to a vertex. In at least some embodiments, the vertices and their corresponding functions must maintain the same order in the chain. The nextVertexID indication in each element of the sequence may be used for ordering mapped vertices in the chain.

In some embodiments, the value of the vertexID for a given vertex may be assigned by its local resource orchestrator, and may be unique within its domain. In some embodiments, to distinguish between vertices in different domains, the vertexID may include an identifier of the domain or its resource orchestrator. In other embodiments, within controller messages exchanged between vertices, the vertexID may be augmented with an identifier of the domain or its resource orchestrator. In some embodiments, the value of the SFC request identifier may be assigned by the source resource orchestrator when the SFC request is received or when the source resource orchestrator sends a controller message that includes the SFC request to the other resource orchestrators in the multi-domain network.

One example embodiment of a compute( ) function to be executed at various vertices (nodes) in a vertex-centric distributed service function chaining algorithm is illustrated by the pseudo-code below. In this example, the compute function performs operations during the first superstep (superstep 0) that are not performed during one or more subsequent supersteps.

```
compute ( )
    if (superstep == 0 && vertex.isQualified( )){
        for each neighbor{
            if (edge.isQualified( )){
                generate a chain with the vertex
                mapped to the function;
                send the chain to the neighbor;}}}
    for each message received{
        if (vertex.isQualified( )) {
            if (all functions in the chain are mapped) {
                emit the completed chain to the source
                orchestrator;}
            else {
                for each neighbor{
                    if (edge.isQualified( )){
                        generate the chain with the vertex
                        mapped to the function;
                        send the chain to the neighbor;}}}
```

In the example embodiment illustrated above, the compute function may call (or otherwise invoke) a vertex.isQualified( ) method to determine whether or not the particular vertex on which the compute function executes is a qualified vertex. In this example embodiment, for each neighbor vertex of the particular vertex, the compute function may also call (or otherwise invoke) an edge.isQualified( ) method to determine whether or not the link between the particular vertex on which the compute function executes and one of its neighbor vertices is a qualified link. If, for one or more of the neighbor vertices, both of these methods return True, the current vertex may extend the chain (by mapping itself to a service in the chain and including a link to the neighbor vertex) and may send the extended chain to that neighbor vertex in a controller message. In this example, if the vertex.isQualified( ) method returns False, the vertex.isQualified( ) method may not be called for any of the neighbor vertices. In this example, if the vertex.isQualified( ) method returns True, the current chain may be extended and controller messages may be sent only to those neighbor vertices with which the current vertex has a qualified connection (where the edge.isQualified( ) method returns True). In at least some embodiments, if, during superstep 0, no qualifying vertices are found, the distributed computation may stop without returning any feasible solutions. Similarly, if, during a subsequent superstep, none of the partially mapped chains generated by qualified vertices can be completed, the distributed computation may stop without returning any feasible solutions.

In various embodiments, the method vertex.isQualified( ) may call one or more other methods to determine whether or not the particular vertex on which the compute function executes is a qualified vertex. In one example, the method vertex.isQualified( ) may call a method vertex.has Function( ) which determines whether or not the current vertex is capable of performing a given service function that can begin, extend, or complete the requested service function chain. In another example, the method vertex.isQualified( ) may call a method vertex.hasResource( ) that determines whether or not the current vertex has enough capacity available to perform the given service function (e.g., whether or not a compute and/or storage resource needed to implement the given service function is available at the current vertex). In yet another example, the method vertex.isQualified( ) may call a method vertex.hasVMs( ) which, more specifically, determines whether or not the current vertex includes enough available VMs to implement the given service function. Still other methods may be called as part of qualifying the particular vertex on which the compute function executes, in different embodiments. In some embodiments, both a vertex.hasFunction( ) method and another method that determines whether or not required resources are available at the vertex (such as a vertex.hasResource( ) method or a vertex.hasVMs( ) method) may need to return True in order for the vertex.isQualified( ) method to return True.

Similarly, in some embodiments, the method edge.isQualified( ) may call one or more other methods to determine whether or not the link between the particular vertex on which the compute function executes and one of its neighbor vertices is a qualified link. In one example, the method edge.isQualified( ) may call a method edge.has BW( ), which determines whether or not the link between the particular vertex on which the compute function executes and its neighbor vertex has sufficient bandwidth to extend the chain to the neighbor vertex. In another example, the method edge.isQualified( ) may call a method edge.delayOK( ), which determines whether or not the delay over the link between the particular vertex on which the compute function executes and its neighbor vertex meets delay requirements for extending the chain to the neighbor vertex (e.g., that the link has a delay that is within an acceptable range specified for the requested SFC). Still other methods may be called as part of qualifying the link between the particular vertex on which the compute function executes and one of its neighbors, in different embodiments. In some embodiments, the method edge.isQualified( ) may call two or more methods, all of which may need to return True in order for the edge.isQualified( ) method to return True.

Figure 7A:
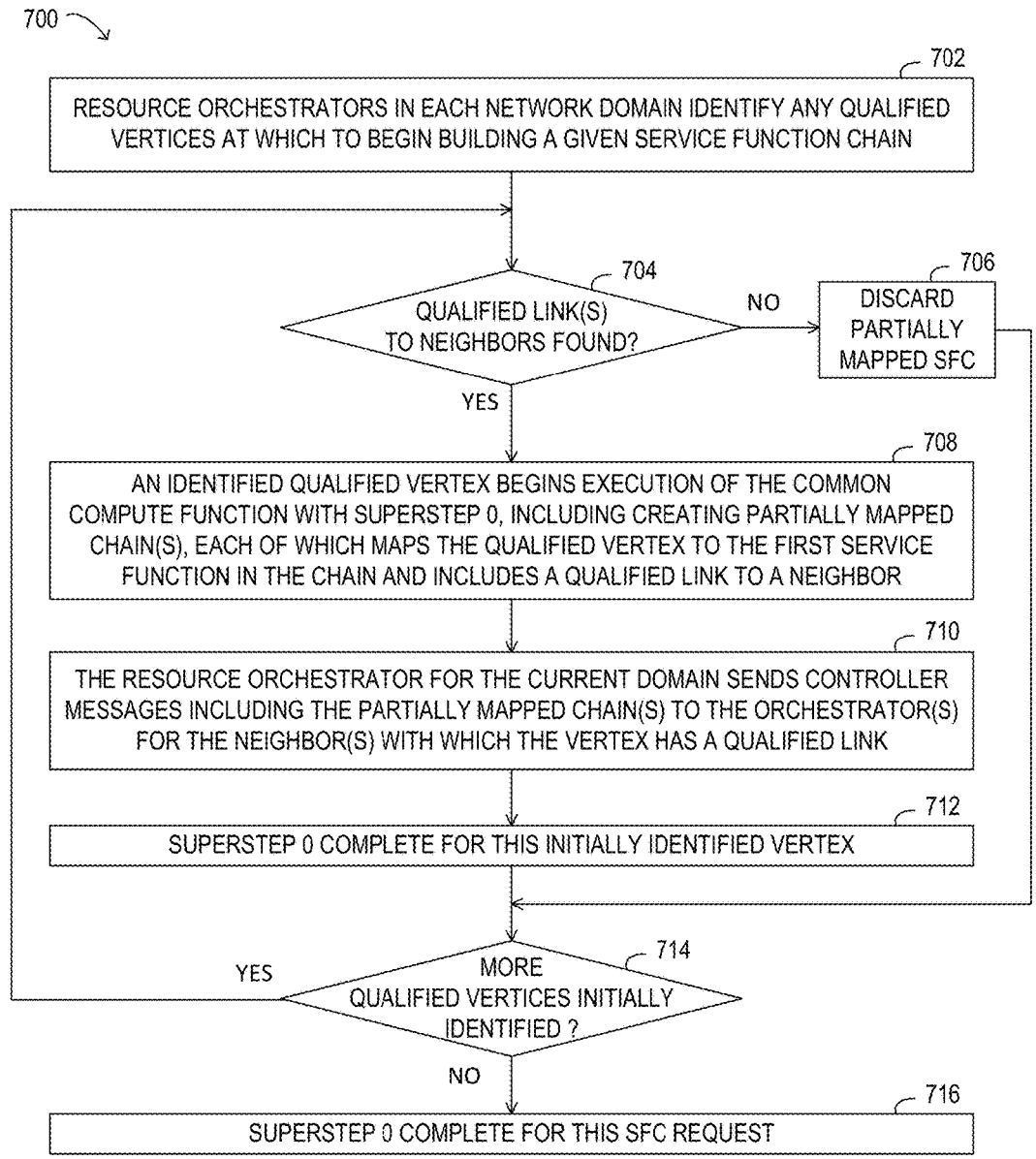
FIGS. 7A and 7B illustrate selected elements of an example method for performing a compute( ) function, according to one embodiment.
Figure 7B:
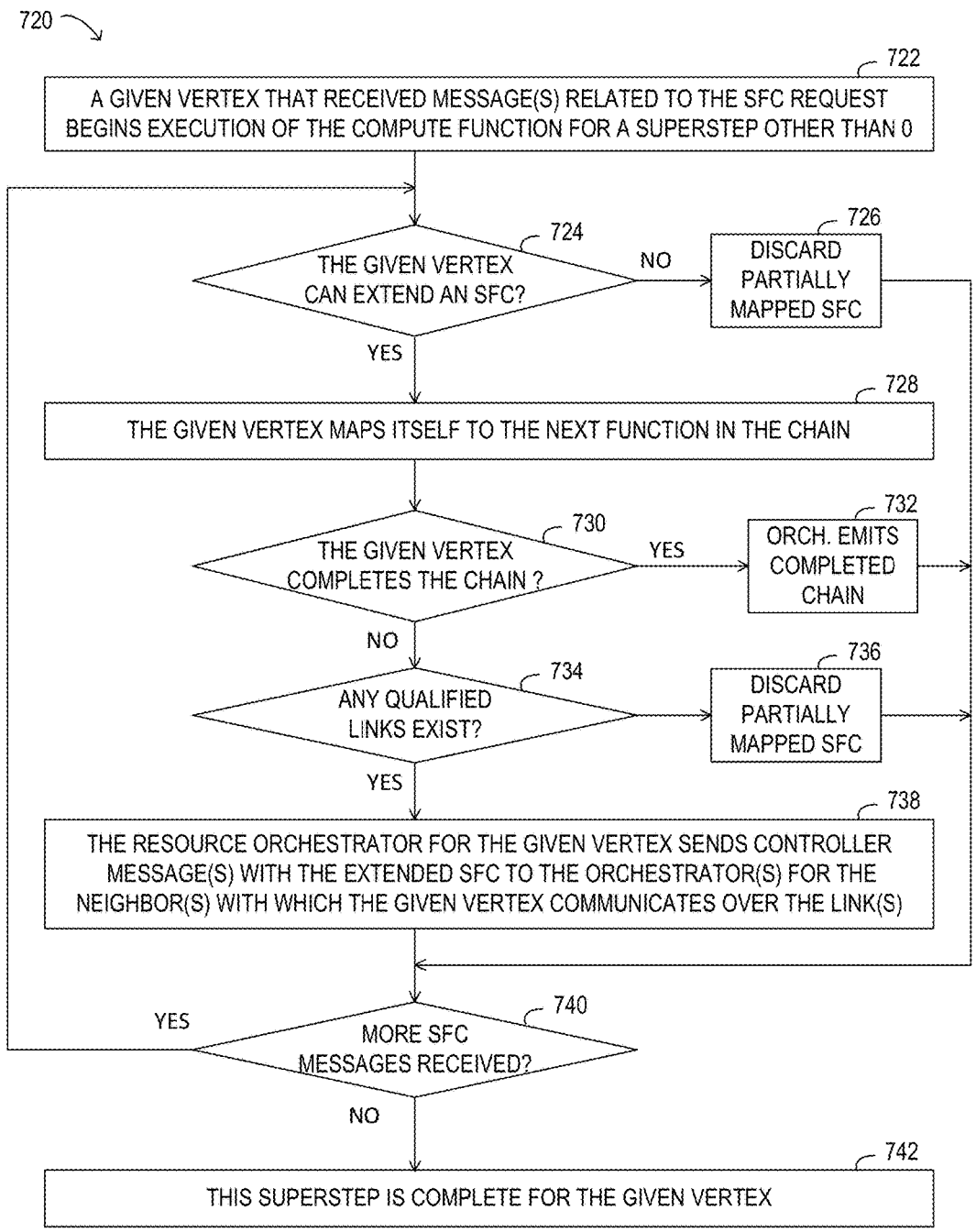

FIGS. 7A and 7B illustrate selected elements of an example method for performing a compute( ) function, such as that described above. More specifically, FIG. 7A illustrates selected elements of a method 700 for performing superstep 0 of the compute function, according to one embodiment. In this example embodiment, during superstep 0, each qualified vertex sends a message to each potentially qualified neighbor (neighbors that have qualified links to the qualified vertex and that may also include the next service function in the requested service function chain). In this example embodiment, the method includes (at 702) the resource orchestrators in each network domain identifying any qualified vertices at which to begin building a given service function chain. For example, a source resource orchestrator in one domain may send a controller message that includes an SFC request to the respective resource orchestrators for one or more other domains, each of which may identify any vertices (nodes) in its domain that include the first service function in the requested service function chain. Each vertex that is identified as a qualified vertex may be mapped to the first service function in a respective partially mapped service function chain.

In this example embodiment, the method includes (at 704), determining whether there are any qualified links between the given vertex and its neighbors (links in the physical infrastructure that meet bandwidth and/or delay requirements for the requested service function chain). If not, the method includes discarding the partially mapped service function chain that includes the identified qualified vertex (as in 706). If (at 704) one or more qualified links between the given vertex and its neighbors is found, the method includes (at 708) one of the identified qualified vertices beginning execution of the common compute function with superstep 0, including, for any qualified links from the qualified vertex to a neighbor, creating a partially mapped chain that maps the qualified vertex to the first service function in the chain and includes the qualified link to the neighbor. In some embodiments (e.g., when a neighbor with a qualified link is in a different domain than the qualified vertex), the method also includes (at 710) the resource orchestrator for the current domain sending a controller message that includes the partially mapped chain(s) to the orchestrator(s) for the neighbor(s) with which the vertex has a qualified link, after which superstep 0 is complete for this initially identified qualified vertex (as in 712). In some embodiments in which a neighbor with a qualified link is in the same domain as the qualified vertex, the domain controller may not send a controller message to any other orchestrator, but may handle the next superstep for that neighbor itself. In other embodiments in which a neighbor with a qualified link is in the same domain as the qualified vertex, messages may be exchanged between the two vertices through writes to and reads from a memory.

In this example embodiment, if (as shown in 714) there were more qualified vertices initially identified (at step 702), the operations shown in 704-712 may be repeated, as appropriate, for each additional one of the initially qualified vertices. If, or once (at 714) there are no more qualified vertices that were initially identified to process, superstep 0 may be complete for this service function chain request (as in 716). Note that while FIG. 7A illustrates an embodiment in which the operations shown in 704-712 are performed for each initially identified qualified vertex in series, in at least some embodiments of the present disclosure, these operations may be performed substantially in parallel for each of the initially identified qualified vertices.

FIG. 7B illustrates selected elements of a method 720 for performing supersteps of the compute function described above other than superstep 0, according to one embodiment. More specifically, FIG. 7B illustrates the actions taken on one vertex that receives a controller message including a partially mapped SFC for an SFC request (which may or may not be able to be extended or completed by a service function on the given vertex). In this example embodiment, the method includes (at 722) a given vertex that received one or more such controller messages beginning execution of the compute function for a superstep other than superstep 0 (e.g., for the superstep following the superstep in which the controller message was sent to the given vertex). The method includes (at 724) determining whether the received controller message includes a partially mapped service function chain that can be extended (or completed) by a service function available at the given vertex. If it is determined that the received controller message includes a partially mapped service function chain that cannot be extended (much less completed) by a service function available at the given vertex, the method includes discarding the partially mapped SFC that was included in the received message (as in 726).

If (at 724) it is determined that the received controller message includes a partially mapped service function chain that can be extended by a service function available at the given vertex, the method includes (at 728) the given vertex mapping itself to the next function in the chain. The method also includes (at 730) determining whether or not the mapping of the given vertex to the next function in the chain completes the requested service function chain. If so, the mapping is completed for this candidate SFC, and the method includes the orchestrator for the domain in which the given vertex resides emitting the completed chain to the source resource orchestrator (as in 732).

If (at 730) it is determined that the partially mapped SFC in the received controller message is not completed by mapping of the given vertex to the next function in the chain, the method may include continuing the attempt to identify a potential candidate solution for the SFC request. In the example embodiment illustrated in FIG. 7B, this includes (at 734) determining whether or not there are any qualified links between the given vertex and its neighbors (links in the physical infrastructure that meet bandwidth and/or delay requirements for the requested service function chain). If not, the method includes discarding the partially mapped service function chain that includes the identified qualified vertex (as in 736). If (at 734) one or more qualified links between the given vertex and its neighbors is found (and if any of the neighbors with qualified links are in a different domain than the given vertex), the method includes the resource orchestrator for the given vertex sending a respective controller message with the extended SFC to the orchestrator for each of the neighbor(s) in other domains with which the given vertex communicates over the qualified link(s), as in 738. In some embodiments in which a neighbor with a qualified link is in the same domain as the given vertex, the domain controller may not send a controller message to any other orchestrator, but may handle the next superstep for that neighbor itself. In other embodiments in which a neighbor with a qualified link is in the same domain as the given vertex, messages may be exchanged between the two vertices through writes to and reads from a memory.

If (as shown at 740) more controller messages related to the SFC request were received by the given vertex, the operations shown as 724-738 may be repeated, as appropriate, for each additional message that was received. If, or once (at 740), there are no additional received messages to process, this superstep is complete for the given vertex (as shown in 742).

In the example embodiment described above, during each superstep other than superstep 0, the operations shown in FIG. 7B are repeated for each vertex that received a controller message from a resource orchestrator in the previous superstep. In at least some embodiments, during each superstep, the operations shown in FIG. 7B may be performed substantially in parallel for each vertex that received a controller message from a resource orchestrator in the previous superstep. As previously noted, the total number of supersteps performed by the compute function in response to a service function chain request may be equal to number of service functions included in the requested service function chain.

In the example illustrated in FIGS. 7A and 7B, during superstep 0, the compute function is executed to identify any vertices (nodes) on which the first service function in an SFC request can be performed and to send a partially mapped chain to its neighbor vertices (nodes) with which it has qualifying links. During superstep 1, the compute function is executed to identify any of those neighbor vertices (nodes) on which the second service function in the SFC request can be performed and to send an extended partially mapped chain to their neighbors (i.e., to the neighbors of the neighbors), if there are qualifying links to those neighbor vertices (nodes). During superstep 2, the compute function is executed to determine whether the neighbors of the neighbors can complete the chain by adding a mapping for the third service function in the SFC request, and to return any completed chains to the source resource requestor. This example shows that, in at least some embodiments, the number of supersteps will be equal to the number of service functions in the SFC request, illustrating the scalability of this approach.

In some embodiments, messages exchanged between a pair of resource orchestrators at a particular superstep may be combined. However, in at least some embodiments, the physical nodes may not communicate with each other during distributed computing (e.g., when performing the functions of the SFC or of another type of distributed operation or computation).

Figure 8B:
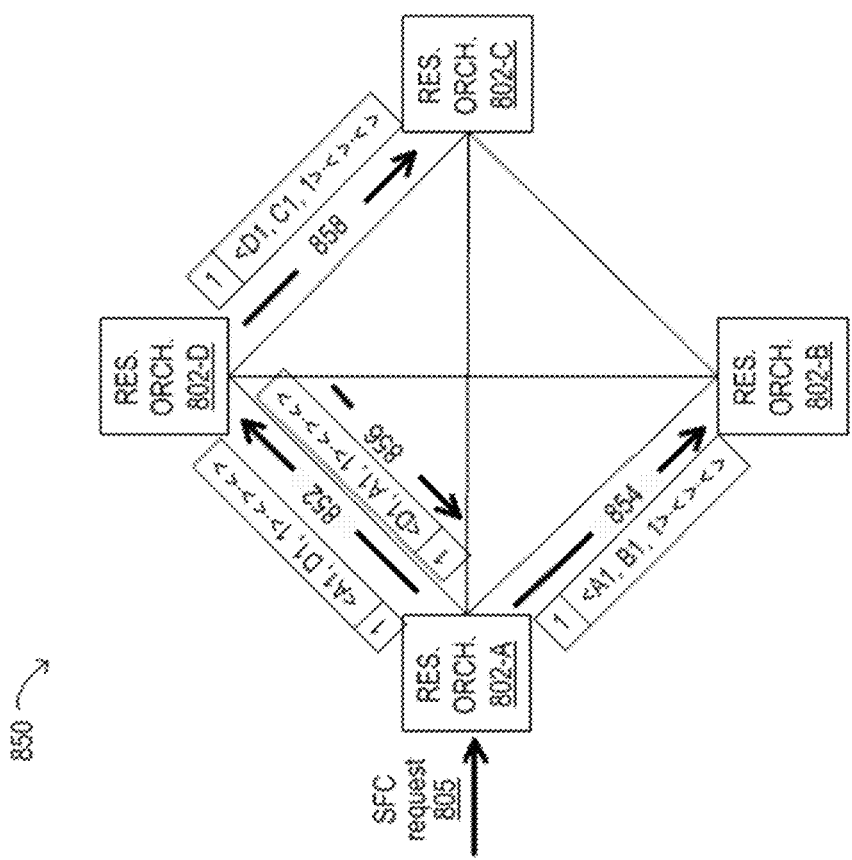
Figure 8A:
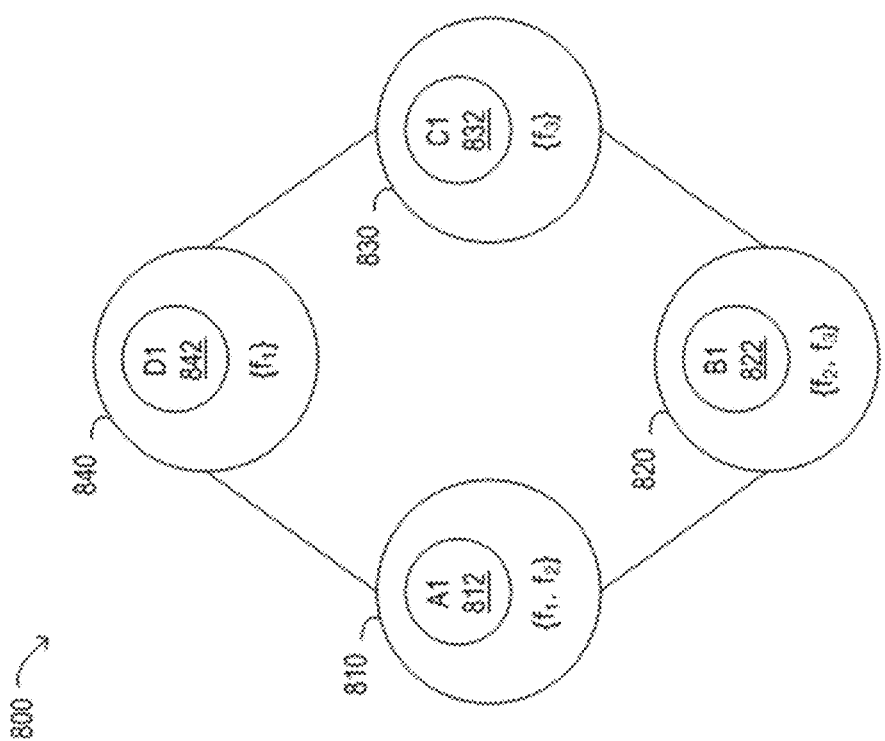

FIGS. 8A-8D illustrate an example of the use of vertex-centric distributed computing for generating one or more candidate solutions to a service function chain request, according to one embodiment. In this example, vertex-centric distributed computing is used to generate one or more mapping solutions for a fixed-ordered SFC request $f_1 \cdot f_2 \cdot f_3$ that has a request ID=1. In this example, FIG. 8A presents a multi-domain network 800 that includes four domains (A, B, C, and D), shown as domains 810, 820, 830, and 840, respectively. In this example, each domain includes a single node (A1 812, B1 822, C1 832, and D1 842, respectively), and each node has a set of service functions that is a subset of all the available service functions in the multi-domain network. In this example, node A1 (812) in domain A (810) includes service functions $f_1$ and $f_2$, node B1 (822) in domain B (820) includes service functions $f_2$ and $f_3$, node C (832) in domain C (830) includes service function $f_3$, and node D1 (842) in domain D (840) includes service function $f_1$.

In this example, the service function request is for a fixed order chain $f_1 \cdot f_2 \cdot f_3$. While not all of the nodes include all of the service functions included in the requested service function chain, in this example (for simplicity of illustration), is it assumed that all of the nodes (vertices) and edges (links) meet the other qualifying requirements for the requested service function chain. More specifically, it is assumed that the number of compute and/or storage resources required for each of the supported service functions are available on each node (vertex), and that bandwidth and/or delay requirements are met for all of the edges (links) between the neighboring nodes that include the service functions to be mapped as part of a candidate solution for the service function chain request. For example, all of the delays between neighboring nodes (and service functions) in domains A 810 and D 840, domains D 840 and C 830, domains C 830 and B 820, and domains A 810 and B 820 are assumed to be 1.

FIGS. 8B-8D illustrate the operations of the vertex-centric distributed computing on a distributed resource orchestration architecture 850 over three supersteps. The distributed resource orchestration architecture 850 includes the communication channels (or links) over which controller messages are exchanged between the respective resource orchestrators of the domains A 810, B 820, C 830, and D 840 illustrated in FIG. 8A. These resource orchestrators are shown as resource orchestrator A (802-A), resource orchestrator B (802-B), resource orchestrator C (802-C), and resource orchestrator D (802-D), respectively. In this example, an SFC request 805 is submitted to resource orchestrator A (802-A). This resource orchestrator may be (or may serve as) a source orchestrator, which may be the resource orchestrator for a master domain in the multi-domain network.

In the first superstep (superstep 0), resource orchestrator A (802-A), as the source orchestrator, forwards the SFC request 805 to the other three resource orchestrators (resource orchestrators B, C, and D) in the distributed resource orchestration architecture 850. Each of the resource orchestrators may then identify any qualified vertices with which to start building a candidate solution for SFC request 805. For example, since SFC request 805 includes a fixed-ordered chain, each resource orchestrator may identify any vertices within their respective domains that include the first function in SFC request 805 (i.e., service function $f_1$). In this example, the initially identified qualified vertices include node A1 (810) and node D1 (840). Note that, in this example, it is assumed that nodes A1 and D1 have sufficient resources for performing service function $f_1$, and so they are qualified nodes.

In this example, during superstep 0, each vertex (node) that was identified as having the first function $f_1$, in this case, nodes A1 (810) and D1 (840), executes a portion of a compute function such as that described above. In this case, for each of its neighbors, each of these vertices generates partially mapped SFC in which the vertex itself is mapped to the first function in the chain, and in which the partially mapped SFC includes a qualified link to a neighbor. The resource orchestrator for the domain in which the vertex resides then sends an appropriate controller message containing one of the partially mapped SFCs to each of those neighbors. For example, because node A1 (812) in domain A (810) includes service function $f_1$ (which is the first service function in the requested service function chain), and has qualified links to node B1 (822) in domain B (820) and node D1 (842) in domain D (840), it creates two partially mapped chains in which node A1 is mapped to the first function in the SFC and is linked to either node B1 or node D1, respectively.

In this example, resource orchestrator A (802-A) sends a controller message 854 to the resource orchestrator B (802-B) for domain B (820). Controller message 854 includes the SFC request identifier (1) and the partially mapped chain (<A1, B1, 1>•< >•< >). The values within the first bracket in the controller message indicate that node A1, which is the first item, is the vertex that maps to the first service function $f_1$, and that node B1 is the vertex to which the partially mapped chain is sent over a link with a delay value of 1. Since the other service functions in the SFC request are not yet mapped, the partially mapped service function chain included in controller message 854 includes two empty brackets. Similarly, resource orchestrator A (802-A) sends a controller message 852 to the resource orchestrator D (802-D) for domain D (840). Controller message 852 includes the SFC request identifier (1) and the partially mapped chain (<A1, D1, 1>•< >•< >). The values within the first bracket in the controller message indicate that node A1, which is the first item, is the vertex that maps to the first service function $f_1$, and that node D1 is the vertex to which the partially mapped chain is sent over a link with a delay value of 1. Since the other service functions in the SFC request are not yet mapped, the partially mapped service function chain included in controller message 852 includes two empty brackets.

In superstep 0, because node D1 (842) in domain D (840) also includes service function $f_1$ (which is the first service function in the requested service function chain), and has qualified links to node A1 (812) in domain A (810) and node C1 (832) in domain C (830), it creates two partially mapped chains in which node D1 is mapped to the first function in the SFC and is linked to either node B1 or node D1, respectively. In this example, resource orchestrator D (802-D) sends a controller message 856 to the resource orchestrator A (802-A) for domain A (810). Controller message 856 includes the SFC request identifier (1) and the partially mapped chain (<D1, A1, 1>•< >•< >). The values within the first bracket in the controller message indicate that node D1, which is the first item, is the vertex that maps to the first service function $f_1$, and that node A1 is the vertex to which the partially mapped chain is sent over a link with a delay value of 1. Since the other service functions in the SFC request are not yet mapped, the partially mapped service function chain included in controller message 856 includes two empty brackets. Similarly, resource orchestrator D (802-D) sends a controller message 858 to the resource orchestrator C (802-C) for domain C (830). Controller message 858 includes the SFC request identifier (1) and the partially mapped chain (<D1, C1, 1>•< >•< >). The values within the first bracket in the controller message indicate that node D1, which is the first item, is the vertex that maps to the first service function $f_1$, and that node C1 is the vertex to which the partially mapped chain is sent over a link with a delay value of 1. Since the other service functions in the SFC request are not yet mapped, the partially mapped service function chain included in controller message 858 includes two empty brackets.

In this example, since neither node B1 (822) nor node C1 (832) includes service function $f_1$ (which is the first service function in the requested service function chain), these nodes are not qualified nodes and no controller messages are sent from their respective resource orchestrators to the resource orchestrators of their neighbors during superstep 0. Once all of the vertices (nodes) have received the controller messages that they are supposed to receive, superstep 0 ends. FIG. 8B illustrates that, at the end of the superstep 0, four controller messages containing partially mapped service function chains have been delivered to destination vertices. More specifically, node A1 has received controller message 852, node B1 has received controller message 854, node C1 has received controller message 858, and node D1 has received controller message 858, all of which are described above.

As described above, during supersteps other than superstep 0, each vertex (node) that received a controller message related to the SFC request during the previous superstep processes those messages and determines whether or not the partially mapped service function chains in those messages can be extended or completed. For example, FIG. 8C illustrates that, during superstep 1, node A1 (which received a partial chain <D1, A1, 1>•< >•< >) is able to extend the chain to <D1, A1, 1>•<A1, B1, 1>•< >, since the function $f_2$ (the second function in the requested service function chain) is available at node A1 (812), and node A1 has a qualified link to its neighbor node B1 (822). In this example, resource orchestrator A (802-A) sends a controller message 860 that includes this extended service function chain to the resource orchestrator for node B1 (resource orchestrator B, 802-B) that includes the extended service function chain.

Similarly, FIG. 8C illustrates that, during the second superstep (superstep 1), node B1 (which received a partial chain <A1, B1, 1>•< >•< >) is able to extend the chain to <A1, B1, 1>•<B1, C1, 1>•< >, since the function $f_2$ (the second function in the requested service function chain) is available at node C1 (832), and node B1 has a qualified link to its neighbor node C1 (832). In this example, resource orchestrator B (802-B) sends a controller message 862 that includes this extended service function chain to the resource orchestrator for node C1 (resource orchestrator C, 802-C) that includes the extended service function chain.

In this example, during superstep 1, vertex (node) D1 842 discards the partially mapped chain <A1, D1, 1>•< >•< > that it received in controller message 852 since the function $f_2$ that extends the chain is not available at node D1 (which disqualifies node D1). Similarly, during superstep 1, vertex (node) C1 832 discards the partially mapped chain <D1, C1, 1>•< >•< > that it received in controller message 858 since the function $f_2$ that extends the chain is not available at node C1 (which disqualifies node C1). Once all of the vertices (nodes) have received the controller messages that they are supposed to receive during superstep 1, superstep 1 ends. FIG. 8C illustrates that, at the end of the superstep 1, two remaining controller messages containing partially mapped service function chains have been delivered to destination vertices. More specifically, node B1 has received controller message 860, and node C1 has received controller message 862, both of which are described above.

During the third superstep (superstep 2 illustrated in FIG. 8D), since both vertex B and vertex C have the last required service function for the requested service function chain (service function $f_3$), each of them may complete a respective candidate solution for the requested service function chain and may send the completed service function chain back to the source orchestrator. For example, vertex (node) C1 832 (which received a partial chain <A1, B1, 1>•<B1, C1, 1>•< >) is able to extend and complete the chain as <A1, B1, 1>•<B1, C1, 1>•<C1, > by mapping itself to the third service function in the chain. In this example, resource orchestrator C (802-C) sends a controller message 866 to the source resource orchestrator (resource orchestrator A, 802-A) that includes the completed service function chain. Similarly, vertex (node) B1 822 (which received a partial chain <D1, A1, 1>•<A1, B1, 1>•< >) is able to extend and complete the chain as <D1, A1, 1>•<A1, B1, 1>•<B1•> by mapping itself to the third service function in the chain. In this example, resource orchestrator B (802-B) sends a controller message 864 to the source resource orchestrator (resource orchestrator A, 802-A) that includes the completed service function chain. Once controller message 866 and controller message 864 have been delivered to the source resource orchestrator, superstep 2 (and the distributed computation as a whole) are complete.

In the example vertex-centric distributed computation illustrated in FIGS. 8A-8D, there were two possible service function chain solutions found and communicated back to the source orchestrator. One service function chain goes from node D1 (to perform service function $f_1$) to node A1 (to perform service function $f_2$) to node B1 (to perform service function $f_3$). The other service function chain goes from node A1 (to perform service function $f_1$) to node B1 (to perform service function $f_2$) to node C1 (to perform service function $f_3$). In this example, the source orchestrator may thus receive two possible solutions for SFC request 805: D1•A1•B1 and A1•B1•C1.

While the example illustrated in FIGS. 8A-8D and described above involves a fixed-ordered SFC request, the vertex-centric distributed computing approach described herein may also be suitable for application to flexible-ordered SFC requests or linear sub-requests in a mesh topology, in some embodiments. In cases in which an SFC request or linear sub-request includes a flexible-ordered service function chain, in at least some supersteps, the compute function executed at each superstep may perform multiple searches in parallel, each of which attempts to identify one of multiple options for extending or completing a partially mapped chain. In this case, the vertex-centric distributed computation will have the same number of supersteps as would be performed for a fixed-ordered SFC request in which the service function chain has the same number of service functions, but it will exchange more messages during each superstep than in the fixed-ordered case.

In the case of a flexible-ordered SFC request, in at least some embodiments, a vertex.hasFunction( ) method (such as one called by a vertex.isQualified( ) method) may be able to compute the function that is used to extend the chain based on the current chain. For example, for an SFC request $f_1*f_2*f_3$, a vertex B with a service function $f_1$ may receive a controller message that includes a partially mapped chain < >*<A, B, 1>*< >. This chain may carry two pieces of information: the fact that vertex A maps to service function $f_2$, and an indication that the service function that extends the chain can be either service function $f_1$ or service function f_3. In this example, since vertex B has service function $f_1$, it is able to map to $f_1$ in the chain, extending the chain to become <B, >*<A, B, 1>*< >. In this example, vertex C may then receive a controller message that includes the partially mapped chain <B, C, 1>*<A, B, 1>*< >. Based on this controller message, vertex C knows that vertex A maps to service function $f_2$, that vertex B maps to service function $f_1$, and that the ordering of service functions in this candidate solution (so far) is $f_2 \cdot f_1$. Therefore, vertex C may complete the chain if it has service function $f_3$.

In some cases, an SFC request may include a service function chain in which the ordering is flexible for some of the service functions, but not others. In at least some embodiments, the vertex-centric distributed computing approach described herein may be used to identify any potential solutions for these types of SFC requests, as well. For example, for a service function chain request $(f_1*f_2*f_3)$ •$f_4$, the first set of service functions to mapped is $\{f_1, f_2, f_3\}$. That is, any vertex associated with any service function in the set $\{f_1, f_22, f_3\}$ can map to the associated service function. For a partially mapped chain in which service function $f_1$ has already been mapped, the next set of service functions to be mapped is $\{f_2, f_33\}$, and so on. Once all of the service functions in the set $\{f_1, f_2, f_3\}$ have been mapped, service function $f_4$ is mapped. In another example, for a chain for a service function chain request $f_4$•$(f_1*f_2*f_3)$, the first service function that can be mapped is service function $f_4$, and any vertex with the service function $f_4$ should map to service function $f_4$ first. In this example, after service function $f_4$ is mapped, then the service functions in the set $\{f_1, f_2, f_3\}$ in the chain can be mapped in any order. Note that while several examples of the use of vertex-centric distributed computing included herein are directed to the generation of mapping solutions to service function chain requests, in other embodiments, they may be used to generate mapping solutions for other types of virtual network requests requiring network functions and/or other types of resources to be available on respective physical nodes.

Figure 9:
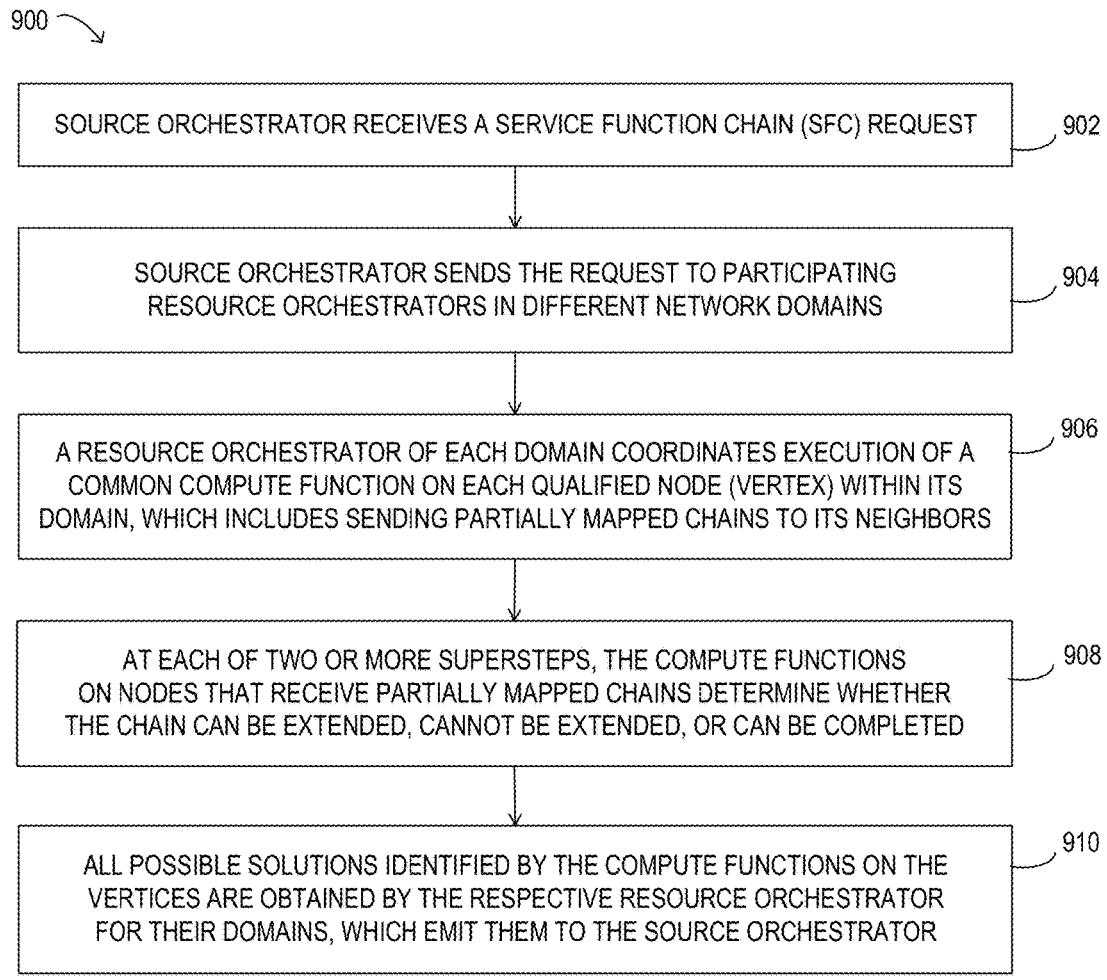
FIG. 9 is a flow diagram illustrating selected elements of a method for performing a vertex-centric distributed algorithm to identify all qualified solutions for a service function chain request in a multi-domain network, according to one embodiment.

FIG. 9 is a flow diagram illustrating selected elements of a method 900 for performing a vertex-centric distributed algorithm for identifying all qualified solutions for a service function chain request in a multi-domain network, according to one embodiment. In this example embodiment, the method includes (at 902) a source orchestrator receiving a service function chain (SFC) request. The method includes (at 904) the source orchestrator sending the request to participating resource orchestrators in different network domains.

In this example, the method includes (at 906) the resource orchestrators of each domain coordinating the execution of a common compute function on each qualified node (vertex) its domain (e.g., on each node that includes the first one of the service functions in a fixed-ordered chain or any one of the service functions in a flexible-ordered chain). This may include the qualified nodes sending partially mapped service function chains to their neighbor nodes. The method includes (at 908), at each of two or more supersteps, the compute function on these and other nodes that receive a partially mapped service function chain determining whether the chain can be extended, cannot be extended, or can be completed. The method also includes (at 910) all possible solutions identified by the compute functions on the vertices being obtained by the respective resource orchestrator for their domains, which emits them to the source orchestrator.

As previously noted, an objective of the vertex-centric distributed algorithm described herein is to identify all qualified solutions for an SFC request in a multi-domain network. In some embodiments, the results of this computation may be pruned to identify only those solutions that meet other criteria, according to policies of the service provider and/or requestor preferences. For example, in some embodiments, the potential solutions may be pruned to include only those potential solutions having a total cost that is below a specified total cost threshold or having a total delay that is below a specified total delay threshold. The total cost of a solution may be specified in terms of real costs (e.g., fiber costs or the cost of physical links) or in terms of bandwidth or delay, in different embodiments. In some embodiments, the potential solutions may be pruned to include only those potential solutions that meet multiple such constraints (e.g., constraints on two or more of: cost, delay, and/or bandwidth). In some embodiments, the selection of one or more of the potential solutions may be determined at runtime by a load balancer. In some embodiments, for protection purposes, the potential solutions may be pruned to include a set of potential solutions that include disjoint chains. For example, if the service function chains in the pruned set of potential solutions do not include any overlapping resources (e.g., no overlapping physical links or physical nodes), if one of the resources in a selected service function chain in the set becomes unavailable, it will not affect the availability of the other service function chains in the pruned set of potential solutions.

Figure 10:
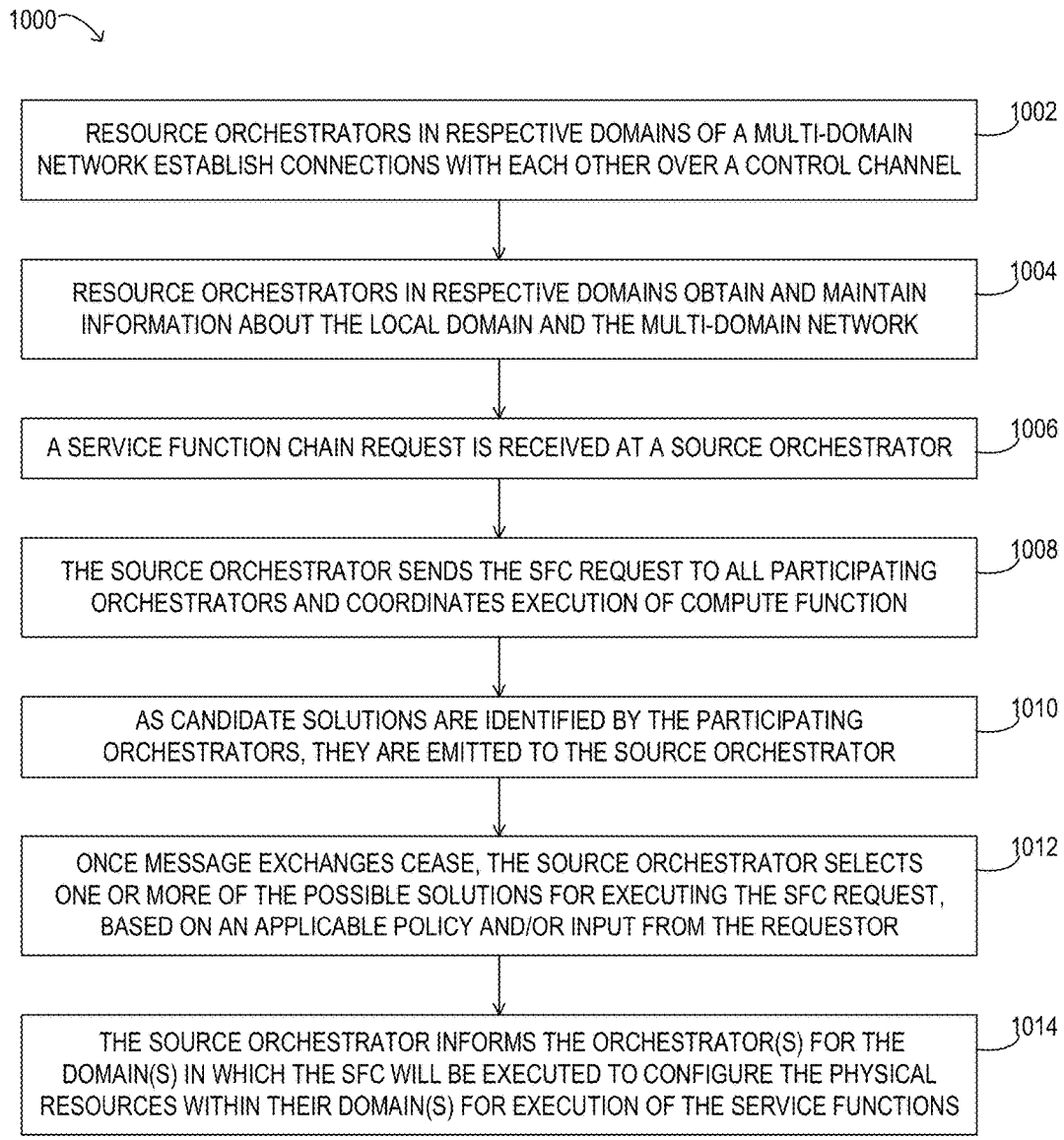
FIG. 10 is a flow diagram illustrating selected elements of a method for satisfying a service function chain request, according to one embodiment.

FIG. 10 is a flow diagram illustrating selected elements of a method 1000 for satisfying a service function chain request, according to one embodiment. In this example embodiment, the method includes (at 1002) the resource orchestrators in respective domains of a multi-domain network establishing connections with each other over a control channel. The method includes (at 1004) the resource orchestrators in the respective domains obtaining and maintaining information about their local domains and about the multi-domain network. For example, in some embodiments, the resource orchestrators may store this information in memory on the nodes on which they reside (e.g., in vertex value data structures, edge data structures, and/or other data structures). While coordinating a vertex-centric distributed computation to identify all qualified solutions for an SFC request in a multi-domain network, the local resource orchestrators may also maintain (e.g., in memory) information representing SFC requests, partially mapped service function chains, completed service function chains, or other information usable in computing solutions for the SFC request, in different embodiments.

In this example embodiment, the method includes (at 1006) receiving a service function chain (SFC) request at a source orchestrator. The method also includes (at 1008) the source orchestrator sending the SFC request to all participating orchestrators in the multi-domain network and coordinating the execution of a common compute function, as described herein. As candidate solutions are identified by the participating orchestrators (at 1010), the method includes emitting them to the source orchestrator. Once (at 1012) the message exchanges cease, the method includes the source orchestrator selecting one or more of the possible solutions for executing the SFC request, based on an applicable policy and/or input from the requestor. The method also includes (at 1014) the source orchestrator informing the orchestrator(s) for the domain(s) in which various service functions within the SFC will be executed to configure the physical resources within their domain(s) for execution of the those service functions.

As noted above, many emerging applications involve services in which each service function is executed for a specific time duration. For example, as Internet of Things (IoT) devices are turned on and off, this may trigger the use of multiple data processing service function chains with specified arrival times and departure times. In another example involving serverless computing at datacenters, service functions and service function chains may be restricted as the times at which they operate. In this example, servers may serve tasks within particular time intervals and it may be necessary to map service function chains so that they can be processed before a deadline. In yet another example, mobile objects may allow a contact duration as long as the mobile objects are within communication range. Data processing and data transfer occurs at mobile objects during contact duration meaning that this defines the available time duration at server nodes and/or virtual routers for communication with the mobile objects. In this example, it may be necessary to map service function chains so that they can be processed when the server nodes are available. These time durations can be estimated/predicted, in many cases. In some embodiments, the systems and methods described herein for "just-enough-time" mapping and provisioning of service function chains may take advantage of this information to guarantee latency for mission-critical applications, reduce queuing delays for setup, and increase resource efficiency.

Figure 11A:
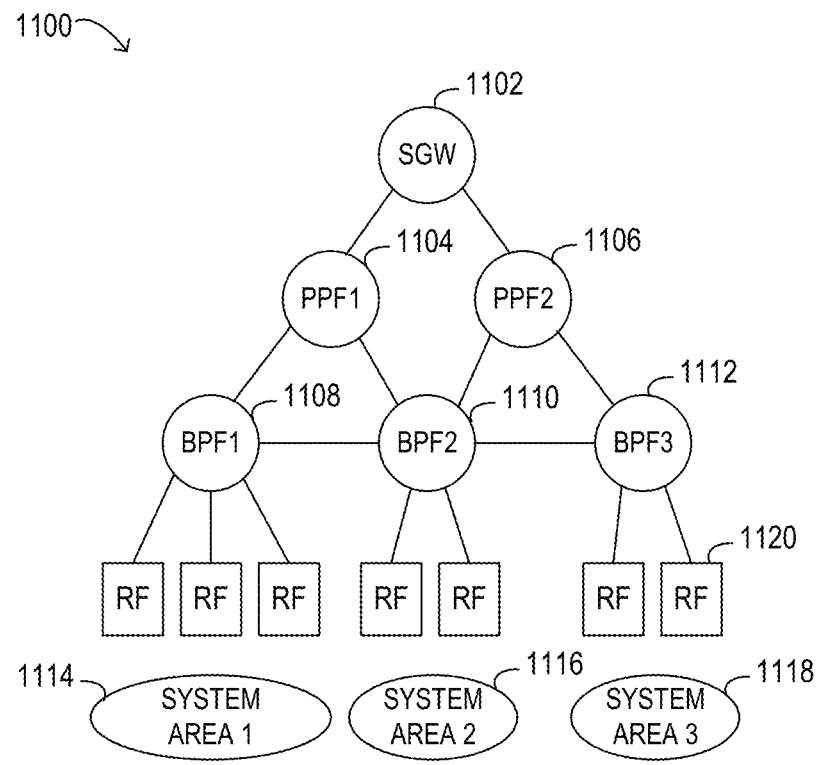
FIG. 11A illustrates an example network in which one or more instances of service functions for 5G fronthaul networks are supported on respective nodes, according to one embodiment.

FIG. 11A illustrates an example network 1100 in which one or more instances of service functions for 5G fronthaul networks are supported on respective nodes, according to one embodiment. In this example, network 1100 includes three instances of a baseband processing function (BPF), shown as BPF1 (1108), BPF2 (1110), and BPF3 (1112), two instances of a packet processing function (PPF), shown as PPF1 (1104) and PPF2 (1106), and a single instance of a Servicing Gateway (SGW), shown as SGW (1102). The service functions can be accessed through various radio frequency (RF) nodes 1120 in respective system areas (cells). In this example, there are three RF nodes 1120 in system area 1 (1114), two RF nodes 1120 in system area 2 (1116), and two RF nodes 1120 in system area 3 (1118). The number of nodes on which service functions included in various service function chains are instantiated (e.g., within virtual machines or containers) may vary over time in accordance with a variety of use cases.

Figure 11B:
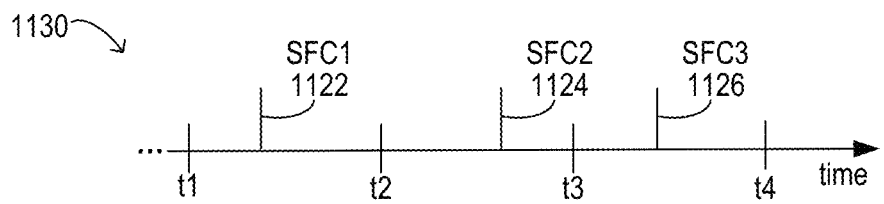
FIG. 11B illustrates a timeline over which a user moves between service areas, according to one embodiment.

In one use case, a user may move between different system areas, thus generating service function chains at different times and for different time durations. For example, each time the user moves into a new system area, a new service function chain may be launched. This is illustrated on timeline 1130 depicted in FIG. 11B. In this example, SFC1 (shown at 1122) is generated between time t1 and time t2 on timeline 1130 (shown as 1122) while the user is in system area 1 (1114), SFC2 (shown at 1124) is generated between time t2 and time t3 on timeline 1130 (shown as 1124) while the user is in system area 1 (1116), and SFC3 (shown at 1126) is generated between time t3 and time t3 on timeline 1130 (shown as 1126) while the user is in system area 3 (1118). Each of these service function chains may include a BPF instance chained to a PPF instance chained to the single SGW instance. Because the service function chains are generated at different times, the respective instances of the BPF, PPF, and SGW service functions are needed during different time durations. In this and other use cases, the mapping of the service functions in these three service function chains to the physical nodes on which respective instances of the BPF, PPF, and SGW service functions are instantiated may be performed using a vertex-centric distributed algorithm for identifying all qualified solutions for an SFC request in a multi-domain network with or without considering resource availability in the time dimension, as described herein.

Figure 11C:
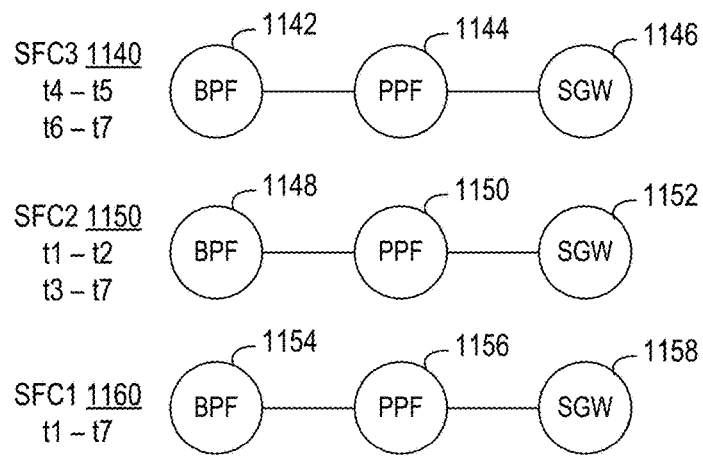
FIG. 11C illustrates example time durations for three service function chains, according to one embodiment.

In another use case, the traffic volume in a given system area in the 5G fronthaul network may vary over time, resulting in the instantiation of different service functions at different times and for different time durations. FIG. 11C illustrates example time durations for SFC1 (1160), SFC2 (1150), and SFC3 (1140), each of which includes the service function chain BPF•PPF•SGW. The cumulative effect of these service function chains on resource usage in service area 1 (1114) is illustrated on timeline 1170 in FIG. 11D. For example, SFC1 (1160), which includes BPF instance 1154, PPF instance 1156, and SGW instance 1158, is executed between time t1 and time t7. SFC2 (1150), which includes BPF instance 1148, PPF instance 1150, and SGW instance 1152, is executed between time t1 and time t2 and between time t3 and time t7. SFC3 (1140), which includes BPF instance 1142, PPF instance 1144, and SGW instance 1146, is executed between time t4 and time t5 and between time t6 and time t7.

Figure 11D:
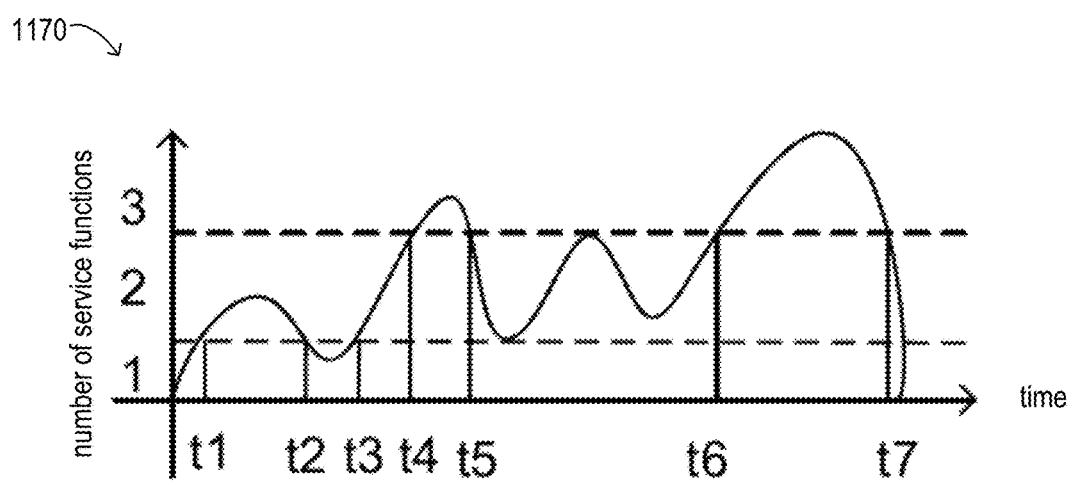
FIG. 11D illustrates a variation in the number of service functions executing over time in a given system area, according to one embodiment.

FIG. 11D illustrates that the number service functions executing between time t1 and time t7 in system area 1 (1114) varies between one and three as the three service function chains, SFC1 (1160), SFC2 (1150), and SFC3 (1140), are launched and executed. In at least some embodiments, the systems and method described herein may be used to provision resources for implementing service function chains at different times and for different durations under this and other use cases using a just-enough-time approach.

As described in more detail herein, in some embodiments, a vertex-centric distributed computation may be used to find all feasible mappings, or an optimal mapping, for a just-enough-time service function chain solution to a service function chain request that satisfies the specified computing and network resource requirements while guaranteeing that the required resources are available at the arrival time of the SFC packet flow along a selected SFC forwarding path. In addition, a just-enough-time approach may be used for configuring and provisioning resources for service function chains in which resources for implementing various service functions, such as virtual machines or containers, are instantiated just in time to be used (e.g., by reserving resources based on estimated arrival times and time durations for each of the service functions in the service function chain) and are subsequently relinquished (e.g., paused or deleted) after processing the last packet of the SFC packet flow. The use of these approaches may provide system scalability while preserving system confidentiality, and may overcome the problems caused by long and/or unpredictable setup times for service function chaining due to queuing for virtual machine or container tasks.

The technical advantages of the just-enough-time approaches described herein, in which the mapping and provisioning of resources for service function chains is based at least in part on resource availability in the time dimension, may include guaranteed latency for mission-critical applications, zero stress (e.g., zero queuing delay) for container setup, high resource efficiency due to low virtual machine and/or container idle time, and reduced waiting time for tasks (e.g., service functions) at nodes (e.g., datacenter servers), among other advantages.

Figure 12:
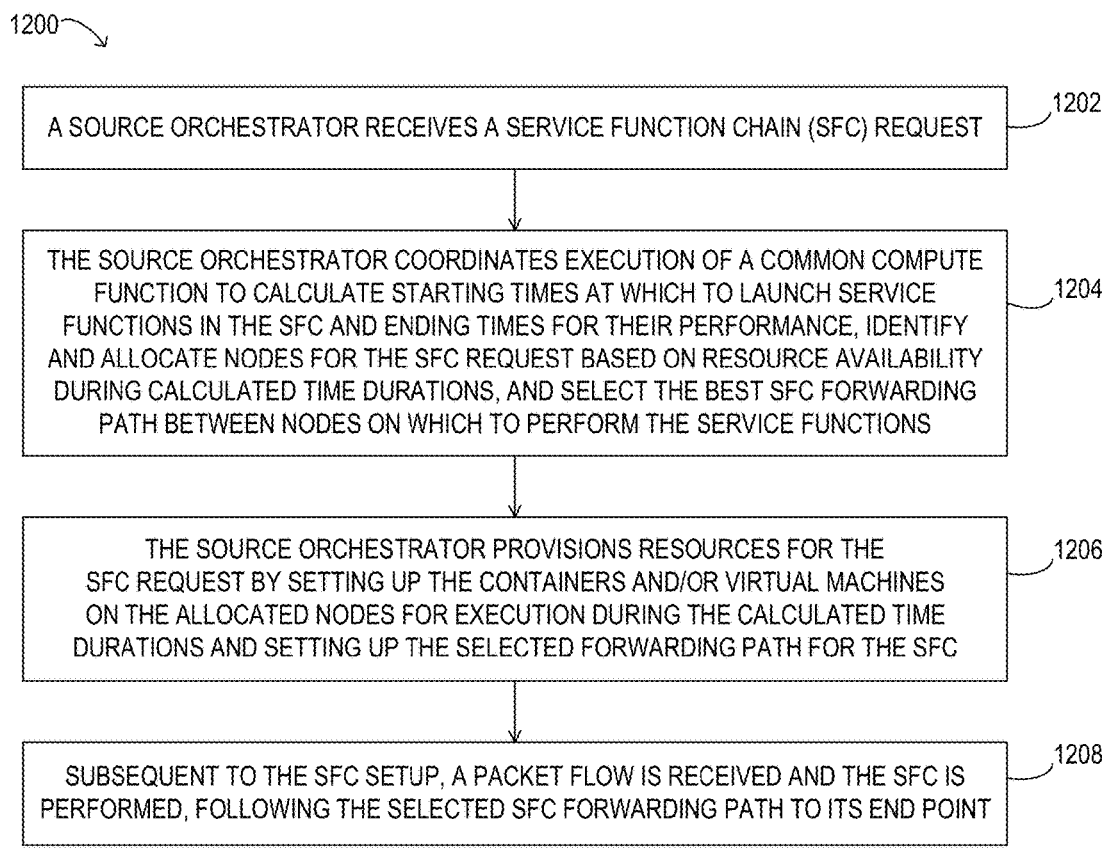
FIG. 12 is a flow diagram illustrating selected elements of a method for implementing service function chaining based on resource availability in the time dimension, according to one embodiment.

FIG. 12 is a flow diagram illustrating selected elements of a method 1200 for implementing service function chaining based on resource availability in the time dimension, according to one embodiment. In this example embodiment, method 1200 includes (at 1202), a source orchestrator receiving a service function chain (SFC) request. At 1204, the method may include the source orchestrator coordinating execution of a common compute function. The common compute function may calculate respective starting times at which to launch the service functions in the SFC and respective ending times for performance of the service functions, which taken together define respective time durations for the service functions. The common compute function may also identify and allocate nodes for the SFC request based on resources being available during the calculated time durations and select the best SFC forwarding path between the physical nodes on which the service functions are to be performed. An example embodiment of the common compute function is described in more detail below, e.g., in reference to FIGS. 13A-13B, 14A-14C, and 15A-15D.

At 1206, the method may include the source orchestrator provisioning resources for the SFC request by setting up containers and/or virtual machines on the allocated nodes for execution during the calculated time durations and setting up the selected forwarding path for the SFC. An example embodiment of a method for provisioning the resources for a SFC request based on resource availability in the time dimension is described below in more detail, e.g., in reference to FIGS. 16 and 17. At 1208, subsequent to setting up the SFC, the method may include receiving a packet flow and performing the services in the service function chain on behalf of each packet in the packet flow, following the selected SFC forwarding path from the source node at which the SFC packet was received to its end point.

As previously noted, an objective of the common compute function described in element 1204 of FIG. 12 is to find all feasible mappings for a service function chain that satisfy the computing and/or network resource requirements while guaranteeing resource availability at the arrival time of the SFC packet flow along the forwarding path. In at least some embodiments, it may be assumed that the resource orchestrators in the system know the setup times for virtual machines and/or containers at each vertex, the estimated processing time for each service function at each vertex, and the physical propagation delays of each edge between each pair of neighboring vertices. For example, it may be assumed that, in the network topology, each vertex has a known subset of service functions and computing resources, each vertex has a known estimated processing time for each service function ($c(f)$), each vertex has known virtual machine/container setup times (ts), and each edge has a known propagation delay (di). In at least some embodiments, each SFC request may include the arrival time ($t_1$) and duration (tp) of the packet flow for the SFC. Each virtual node may require particular storage/computing resources, as well as particular virtual network functions, and each virtual link from each virtual node may require a particular mount of bandwidth, in order for the virtual node to be mapped to a particular one of the service functions in the service function chain.

In at least some embodiment of the present disclosure, a modified vertex value data structure and a modified controller message format may be defined for a vertex-centric distributed computing approach for solving service function chaining in multi-domain networks that depends on resource availability in the time dimension. Note that this modified vertex data structure and modified message format may be specific for this particular distributed computing problem. Table 3 below illustrates an example vertex value data structure for use in this context, according to at least one embodiment.

TABLE 3

Modified Vertex Value vertexID (the current vertex ID
{$f_i$}: a set of service functions available at the vertex
a set of resources at the vertex (e.g., VMs, storage, etc.)
time duration(s) during which resources are available In this example, the modified vertex value data structure includes a vertex identifier, a set of service functions that are available at the vertex, a set of resources available at the vertex (which may include compute and/or storage resources), and data representing the time durations during which resources are available at the vertex (e.g., time durations at which resources are not allocated to or reserved for particular tasks). In some embodiments, the set of service functions that are available at the vertex may be a subset of the service functions that are supported in the multi-domain network or may be a subset of the service functions that are implemented at the vertex (e.g., if some of the service functions are not currently available for inclusion in an SFC request solution). Table 4 below illustrates an example controller message format for use in this context, according to at least one embodiment.

TABLE 4

Modified Controller Message Format requestID
the current chain, in which each vertex is represented by:
<vertexID, t1, t2, edge information>

In this example, each message exchanged as part of a vertex-centric distributed computation for identifying solutions to an SFC request in a multi-domain network may include an identifier of the SFC request and the current SFC chain (which may be a partially mapped chain or a completed chain, in different controller messages). In this modified controller message format, the current chain includes time-based information. Specifically, a partially mapped chain is a sequence of mapped vertices, each of which is represented by: <vertexID, t1=the starting time at which to launch the mapped function, t2=the starting time at which to launch the next mapped function, vertex/edgeInfo>. In some embodiments, the mapped vertices must maintain the same sequential order of the services functions that were included in a corresponding SFC request. Service functions that are currently not mapped are represented by an empty bracket, such as < >.

In some embodiments, the compute( ) function above may be modified to create a compute2( ) function that considers resource availability in the time dimension when mapping service functions to physical nodes. The compute2( ) function includes an additional function vertex.hasAvailableTime that uses time-based resource availability information in making mapping decisions, as shown in the pseudo code below. Other functions included in the compute2( ) function are similar to functions with the same names in the compute( ) function described above. In this example pseudo code, the element $c(f)$ represents the estimated processing time of a mapped function $f$ at the vertex:

```
t1' = t1 + ts + c(f) + tp;
if (superstep == 0 && vertex.hasFunction(f)
    && vertex.hasVMs( )
    && vertex.hasAvailableTime(t1, t1')){
    For each neighbor{
        if (edge.hasBW( )){
            Generate a chain with the vertex
            mapped to the function, as well as
            t1 and t2 = t1 + d1 + c(f);
            Send the chain to the neighbor;}}}
for each message received{
    t1 = t2; t1' = t1 + ts + c(f) + tp;
    if (vertex.hasFunction(f) && vertex.hasVMs( )
    && vertex.hasAvailableTime(t1,t1') {
        if (all functions in the chain are mapped) {
            Emit the completed chain to the source
            orchestrator;}
        else {
            For each neighbor{
                if (edge.hasBW( )){
                Generate the chain with the vertex
                mapped to the function, as well as
                t1 and t2 = t1 + d1 + c(f);
                Send the chain to the neighbor;}}}
```

Figure 13A:
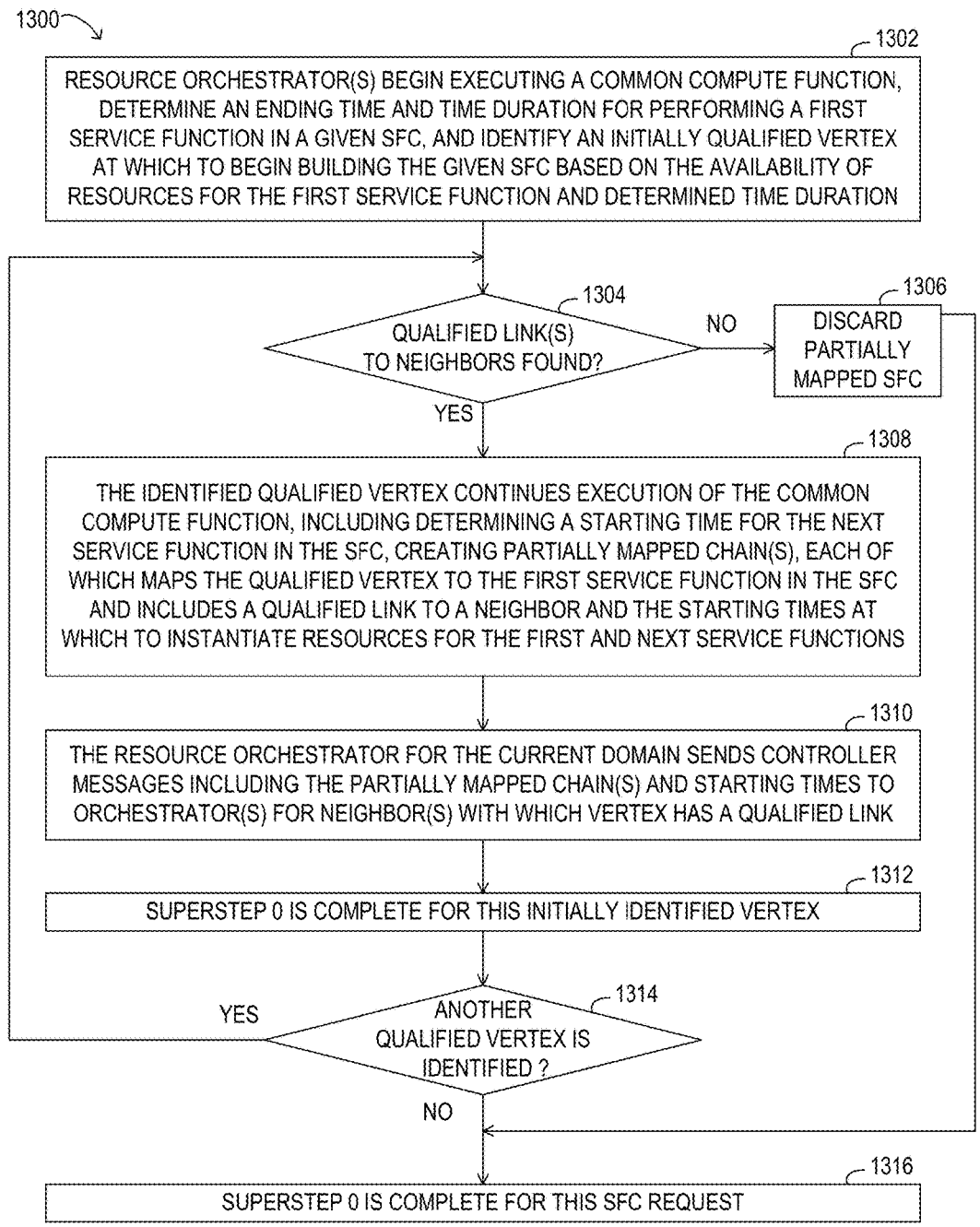
FIGS. 13A and 13B illustrate selected elements of an example method for performing a common compute function that is dependent on resource availability in the time dimension, according to one embodiment.
Figure 13B:
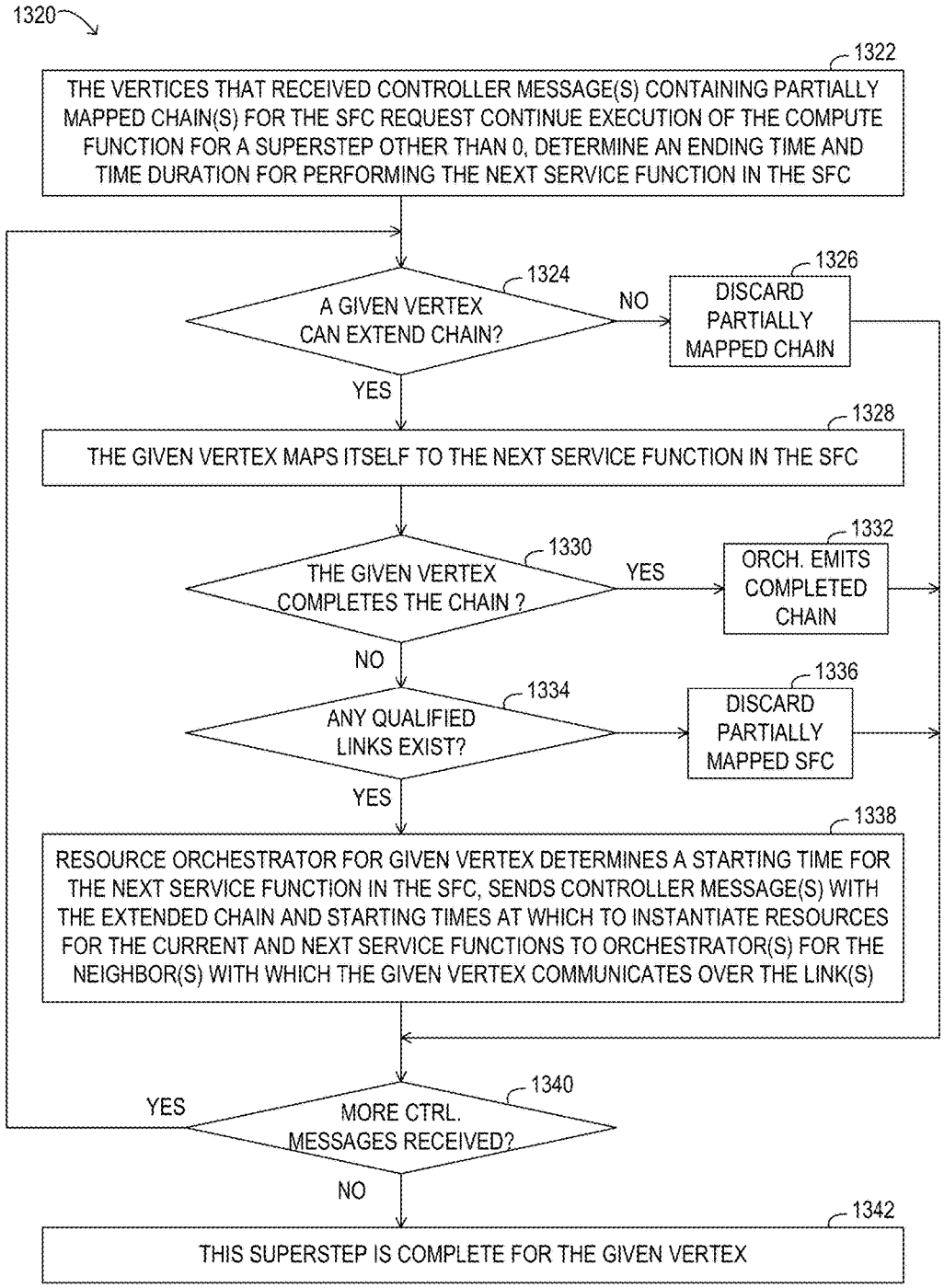

FIGS. 13A and 13B illustrate selected elements of an example method for performing, in response to receiving a service function chain request, a compute2 function that is dependent on resource availability in the time dimension, according to one embodiment. The service function chain request may specify two or more service functions to be performed on respective ones of the physical nodes in a network and may specifying a starting time at which to launch a first one of the service functions specified in the service function chain request, e.g., the time at which a container and/or other resources for implementing the service function should be instantiated. More specifically, FIG. 13A illustrates selected elements of a method 1300 for performing superstep 0 of the compute2 function, according to one embodiment. In this example embodiment, during superstep 0, each qualified vertex sends a message to each potentially qualified neighbor (neighbors that have qualified links to the qualified vertex and that may also include the next service function in the requested service function chain). In this example embodiment, the method includes (at 1302) resource orchestrators (e.g., a resource orchestrator in each network domain in a multi-domain network) beginning to execute a common compute function, which includes determining an ending time and a time duration for performing a first service function in a given service function chain. Determining the ending time may include calculating the ending time based on the starting time for the first service function, the setup time for provisioning resources to perform the first service function, the estimated processing time for performing the first service function, and the time duration for a packet flow including a plurality of packets on whose behalf the service functions in the service function chain are to be performed. The time duration for performing the first service function may be defined as the time between the starting time for the first service function and the ending time for the first service function.

Executing the common compute function may also include identifying an initially qualified vertex at which to begin building the given service function chain based on the availability of resources for implementing the first service function and the determined time duration for the first service function. In some embodiments, the determination of whether or not the first service function is available during the determined time duration for the first service function may be dependent on the resource allocation approach applied by the resource orchestrator. For example, in some embodiments a void filling resource allocation approach may be applied to determine resource availability for the first service function. In other embodiments, a non-void filling resource allocation approach may be applied to determine resource availability for the first service function. In one example, a source resource orchestrator in one domain may send a controller message that includes an SFC request to the respective resource orchestrators for one or more other domains, each of which may identify any vertices (nodes) in its domain that include the first service function in the requested service function chain and at which the first service function is available during the determined time duration for the first service function (e.g., between the starting and ending times calculated as illustrated at 1204 in FIG. 12 and described herein). Any vertex that is initially identified as a qualified vertex may potentially be mapped to the first service function in a respective partially mapped service function chain at this point.

In this example embodiment, the method includes (at 1304), determining whether there are any qualified links between an identified qualified vertex and its neighbors (e.g., links in the physical infrastructure that meet bandwidth and/or delay requirements for the requested service function chain). If not, the method includes discarding the partially mapped service function chain that includes the identified qualified vertex (as in 1306). If (at 1304) one or more qualified links between the identified qualified vertex and its neighbors is found, the method includes (at 1308) the identified qualified vertices continuing execution of the common compute2 function within superstep 0, including determining a starting time at which to launch the next service function in the service function chain, and creating, for each qualified link, a partially mapped chain that maps the identified qualified vertex to the first service function in the chain and includes the qualified link to the neighbor and the starting times at which to launch the first and next service functions by, e.g., instantiating respective containers to implement the first service function in the service function chain and the next service function in the service function chain. Determining the starting time at which to launch the next service function may be dependent on the starting time for the first service function, the estimated processing time for performing the first service function, and a propagation delay between the first one of the identified vertices and the first neighbor vertex.

In some embodiments (e.g., when a neighbor with a qualified link is in a different domain than the qualified vertex), the method also includes (at 1310) the resource orchestrator for the current domain sending a controller message that includes the partially mapped chain(s) and the starting times for the first and second service functions to the orchestrator(s) for the neighbor(s) with which the vertex has a qualified link, after which superstep 0 is complete for this initially identified qualified vertex (as in 1312). In some embodiments in which a neighbor with a qualified link is in the same domain as the qualified vertex, the domain controller might not send a controller message to any other orchestrator, but may handle the next superstep for that neighbor itself. In other embodiments in which a neighbor with a qualified link is in the same domain as the qualified vertex, messages may be exchanged between the two vertices through writes to and reads from a memory.

In this example embodiment, if (as shown in 1314) there were more qualified vertices initially identified (at step 1302), the operations shown in 1304-1312 may be repeated, as appropriate, for each additional one of the initially qualified vertices. If, or once (at 1314) there are no more qualified vertices that were initially identified to process, superstep 0 may be complete for this service function chain request (as in 1316). Note that while FIG. 13A illustrates an embodiment in which the operations shown in 1304-1312 are performed for each initially identified qualified vertex in series, in at least some embodiments of the present disclosure, these operations may be performed substantially in parallel for each of the initially identified qualified vertices.

FIG. 13B illustrates selected elements of a method 1320 for performing supersteps of the compute2 function described above other than superstep 0, according to one embodiment. More specifically, FIG. 13B illustrates the actions taken on vertices that receive a controller message including a partially mapped service function chain for an SFC request (which might or might not be able extend or complete the service function chain). In this example embodiment, the method includes (at 1322) the vertices that received one or more such controller messages continuing execution of the compute2 function for a superstep other than superstep 0 (e.g., for the superstep following the superstep in which the controller message was sent to the given vertex). Executing the common compute function may include determining an ending time and a time duration for performing the next service function in the service function chain. Determining the ending time for the next service function may include calculating the ending time based on the starting time for the next service function, the setup time for provisioning resources to perform the next service function, the estimated processing time for performing the next service function, and the time duration for a packet flow including a plurality of packets on whose behalf the service functions in the service function chain are to be performed. The time duration for performing the next service function may be defined as the time between the starting time for the next service function and the ending time for the next service function.

The method includes (at 1324) determining whether the received controller message includes a partially mapped service function chain that can be extended (or completed) by a service function available at a given one of the vertices that received the controller message. For example, the partially mapped service function chain may be extended (or completed) at the given vertex if the next service function in the given service function chain is available during the determined time duration for the next service function. In some embodiments, the determination of whether or not the next service function in the given service function chain is available during the determined time duration for the next service function may be dependent on the resource allocation approach applied by the resource orchestrator. For example, in some embodiments a void filling resource allocation approach may be applied to determine resource availability for the next service function. In other embodiments, a non-void filling resource allocation approach may be applied to determine resource availability for the next service function. If it is determined that the received controller message includes a partially mapped service function chain that cannot be extended (much less completed) at the given vertex, the method includes discarding the partially mapped SFC that was included in the received message (as in 1326).

If (at 1324) it is determined that the received controller message includes a partially mapped service function chain that can be extended by a service function at the given vertex, the method includes (at 1328) the given vertex mapping itself to the next function in the chain. The method also includes (at 1330) determining whether or not the mapping of the given vertex to the next function in the chain completes the requested service function chain. If so, the mapping is completed for this candidate SFC, and the method includes the orchestrator for the domain in which the given vertex resides emitting the completed chain to the source resource orchestrator (as in 1332).

If (at 1330) it is determined that the partially mapped SFC in the received controller message is not completed by the mapping of the given vertex to the next function in the chain, the method may include continuing the attempt to identify a potential candidate solution for the SFC request. In the example embodiment illustrated in FIG. 13B, this includes (at 1334) determining whether or not there are any qualified links between the given vertex and its neighbors (links in the physical infrastructure that meet bandwidth and/or delay requirements for the requested service function chain). If not, the method includes discarding the partially mapped service function chain that includes the identified qualified vertex (as in 1336). If (at 1334) one or more qualified links between the given vertex and its neighbors is found (and if any of the neighbors with qualified links are in a different domain than the given vertex), the method includes the resource orchestrator for the given vertex determining a starting time for launching yet another service function in the service function chain. In this case, the method may also include sending a respective controller message including the extended SFC and the starting times at which to instantiate resources for the current and next service function containers to the orchestrator for each of the neighbor(s) in other domains with which the given vertex communicates over the qualified link(s), as in 1338. As shown above in the example pseudocode for the compute2 function, the starting time for instantiating a container for the next service function may be dependent on the starting time for the current service function, the estimated processing time for performing the current service function, and the propagation delay between the given vertex and its neighbor. In some embodiments in which a neighbor with a qualified link is in the same domain as the given vertex, the domain controller might not send a controller message to any other orchestrator, but may handle the next superstep for that neighbor itself. In other embodiments in which a neighbor with a qualified link is in the same domain as the given vertex, messages may be exchanged between the two vertices through writes to and reads from a memory.

If (as shown at 1340) more controller messages containing partially mapped chains for the SFC request were received by the given vertex, the operations shown as 1324-1338 may be repeated, as appropriate, for each additional message that was received. If, or once (at 1340), there are no additional received messages to process, this superstep is complete for the given vertex (as shown in 1342). In addition, the operations shown as 1324-1340 may be performed, as appropriate, on each of the vertices that received controller messages containing partially mapped chains for the SFC request. For example, during each superstep other than superstep 0, the operations shown as 1324-1340 in FIG. 13B may be repeated for each vertex that received a controller message from a resource orchestrator in the previous superstep. In at least some embodiments, during each superstep, the operations shown as 1324-1340 in FIG. 13B may be performed substantially in parallel for each vertex that received a controller message from a resource orchestrator in the previous superstep. As in the compute function described earlier, the total number of supersteps performed by the compute2 function in response to a service function chain request may be equal to number of service functions included in the requested service function chain.

In the example illustrated in FIGS. 13A and 13B, during superstep 0, the compute2 function is executed to identify any vertices (nodes) on which the first service function in an SFC request can be performed at the requested time and to send a partially mapped chain and computed instantiation times to its neighbor vertices (nodes) with which it has qualifying links. During superstep 1, the compute2 function is executed to identify any of those neighbor vertices (nodes) on which the second service function in the SFC request can be performed at the requested time and to send an extended partially mapped chain and computed instantiation times to their neighbors (i.e., to the neighbors of the neighbors), if there are qualifying links to those neighbor vertices (nodes). During superstep 2, the compute2 function is executed to determine whether the neighbors of the neighbors can complete the chain by adding a mapping for the third service function in the SFC request (assuming the third service function can be performed at the requested time), and to return any completed chains to the source resource requestor. This example shows that, in at least some embodiments, the number of supersteps will be equal to the number of service functions in the SFC request, illustrating the scalability of this approach.

In some embodiments, messages exchanged between a pair of resource orchestrators at a particular superstep of the compute2 function may be combined. However, in at least some embodiments, the physical nodes might not communicate with each other during distributed computing (e.g., when performing the functions of the SFC or of another type of distributed operation or computation).

In various embodiments, the function vertex.hasAvailableTime($t_1$, $t_1'$) may determine resource availability in the time dimension based on any of a variety of resource allocation approaches including, but not limited to, a void filling resource allocation or a non-void filling resource allocation approach. A resource allocation approach may be selected based on any suitable criteria. For example, a resource allocation approach may be selected for execution that best reflects user preferences for resource usage or other policy decisions.

Figure 14A:
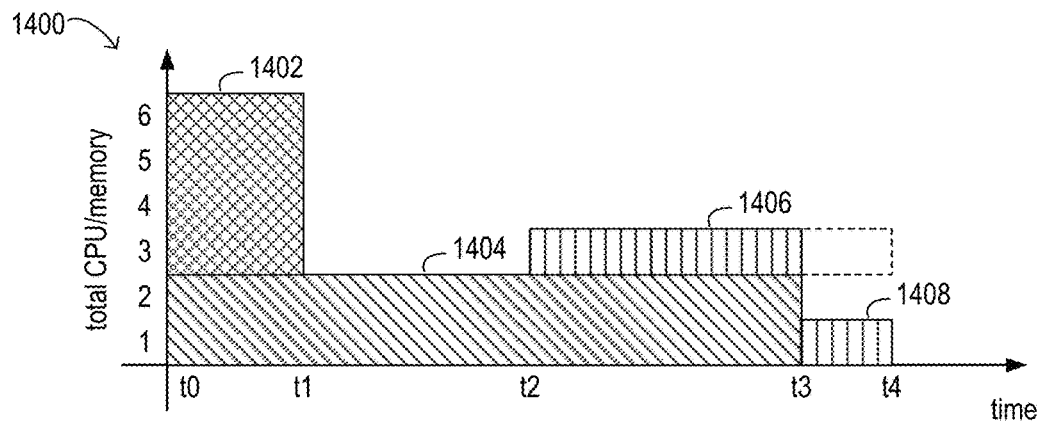
FIGS. 14A-14C illustrate examples of time-based resource allocation using different resource allocation approaches.
Figure 14B:
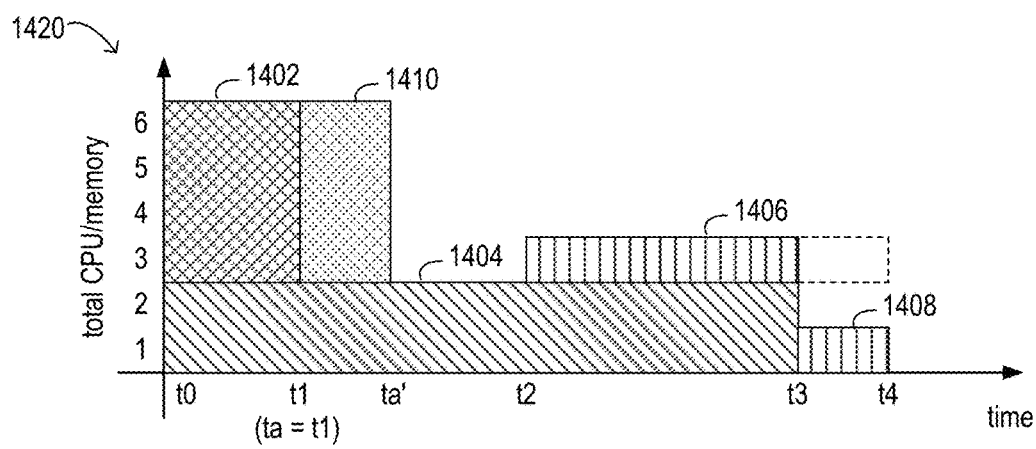
Figure 14C:
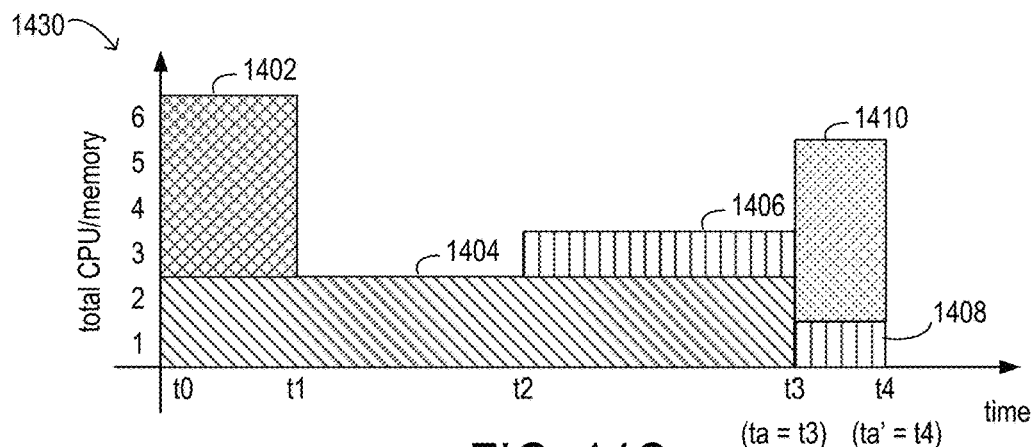

FIGS. 14A-14C illustrate examples of time-based resource allocation using different resource allocation approaches. For example, FIG. 14A depicts a resource allocation plot 1400 illustrating a scenario in which CPU and/or memory resources on a physical node represented by a given vertex have been allocated to or reserved for the benefit of three tasks (e.g., three service functions) at particular times. The three tasks illustrated in FIG. 14A include task 1402, which is to be executed from time $t_0$ to time $t_1$ and which requires four total CPU/memory resources. Resource allocation plot 1400 also includes task 1404, which is to be executed from time $t_0$ to time $t_3$ and requires two total CPU/memory resources, and tasks 1406, which is to be executed from time $t_2$ to time $t_4$ and requires only one CPU/memory resource. In various embodiments, different resource allocation approaches may be applied to identify resources that are available to be allocated to or reserved for an additional task (e.g., a new service function) that is to be executed for a time duration represented as the time duration between time $t_a$ and time $t_a'$.

When using a void filling resource allocation approach, each vertex maintains a record of the available resources on the corresponding physical node in the time dimension and voids in the resource allocation plot can be filled by allocating resources to, or reserving resources for, new tasks. In the example illustrated in FIG. 14A, the resources available for void filling at the given vertex are as follows:

from time $t_0$ to time $t_1$: 0
from time $t_1$ to time $t_2$: 4
from time $t_2$ to time $t_3$: 3
from time $t_3$ to time $t_4$: 5
at time $t_4$: 6

FIG. 14B illustrates a resource allocation solution for the new service function described above using a void filling resource allocation approach, according to one embodiment. In FIG. 14B, a resource allocation plot 1420 is illustrated that includes the tasks shown in FIG. 14A and a new service function, shown as task 1410. In this example, because four resources are available between time $t_1$ and time $t_2$, and the duration of task 1410 (from $t_a$ to $t_a'$) is no longer than the time between time $t_1$ and time $t_2$, task 1410 can be scheduled on the given vertex at time $t_1$, after which the vertex updates its recorded information to reflect that four resources are allocated to, or reserved for, task 1410 from time $t_1$ to time $t_2$ and are not available for any other tasks during this time duration.

When using a non-void filling resource allocation approach, each vertex maintains a record of its latest available time, and new tasks can only be scheduled after the latest available time. This approach may typically use a simpler data structure to record resource allocation/reservation information than the data structures used with a void filling approach. In the example illustrated in FIG. 14A, the latest available resources for non-void filling are as follows:

after time $t_1$: 3
after time $t_3$: 5
after time $t_4$: 6

FIG. 14C illustrates a resource allocation solution for the new service function described above using a non-void filling resource allocation approach, according to one embodiment. In FIG. 14C, a resource allocation plot 1430 is illustrated that includes the tasks shown in FIG. 14A and the new service function, shown as task 1410. Using this resource allocation approach, the new task 1410 is scheduled at time $t_3$, since this is the latest available time at which at least four resources can be allocated to, or reserved for, the new task.

Figure 15A:
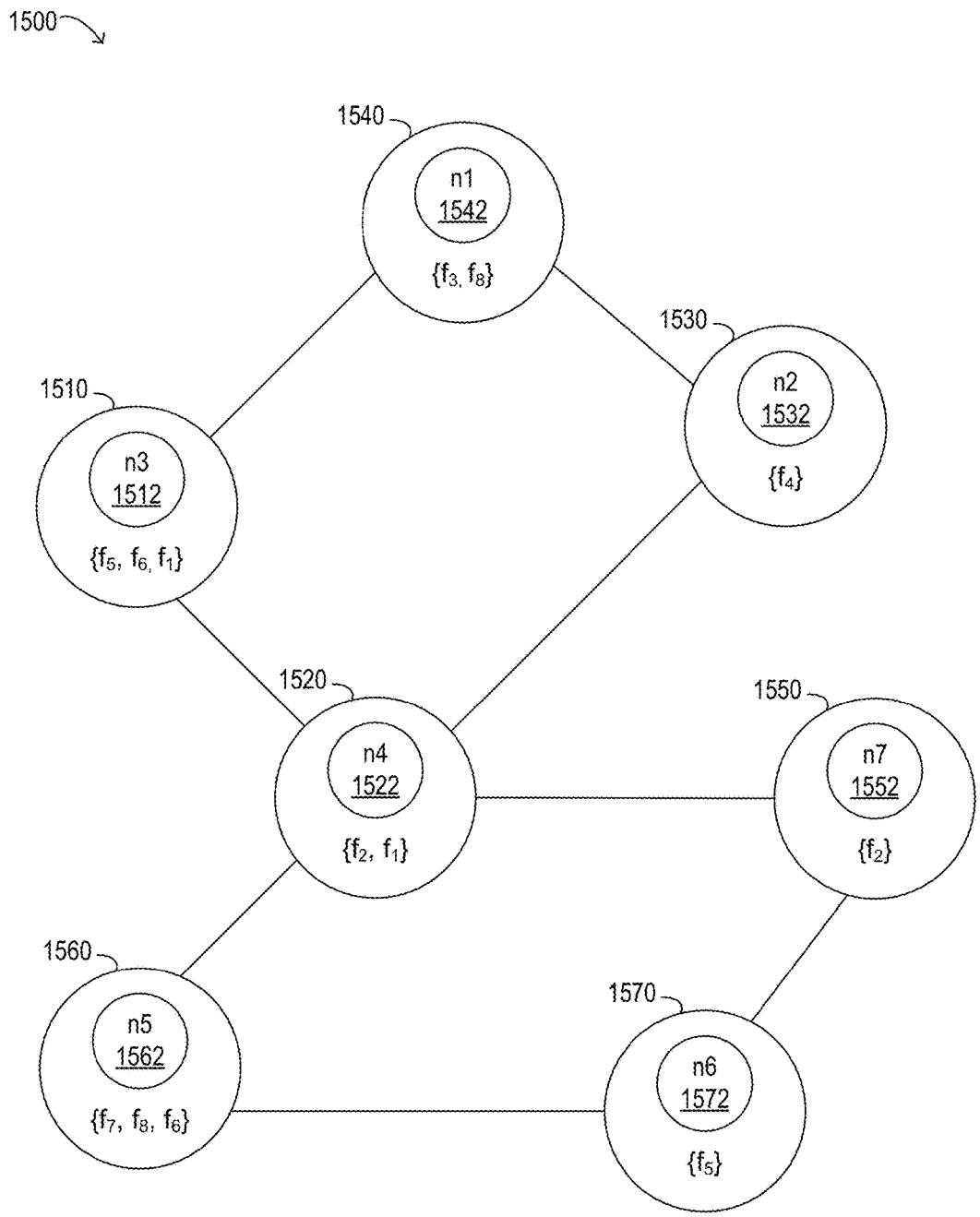
FIGS. 15A-15D illustrate an example of the use of vertex-centric distributed computing for generating one or more candidate solutions to a service function chain request based on resource availability in the time dimension, according to one embodiment.

FIGS. 15A-15D illustrate an example of the use of vertex-centric distributed computing for generating one or more candidate solutions to a service function chain request based on resource availability in the time dimension, according to one embodiment. In this example, vertex-centric distributed computing is used to generate one or more mapping solutions for a fixed-ordered SFC request $f_8 \cdot f_5 \cdot f_2$ that has a request ID=1 and specifies that service function $f_8$ should be available from time $t_1$ to time $t_1'$, service function $f_5$ should be available from time $t_2$ to time $t_2'$, and service function $f_2$ should be available from time $t_3$ to time $t_3'$. In this example, FIG. 15A presents a multi-domain network 1500 that includes seven domains, shown as domains 1510, 1520, 1530, 1540, 1550, 1560, and 1570, respectively. In this example, each domain includes a single node, and each node has a set of service functions that is a subset of all the available service functions in the multi-domain network. In this example, node n1 (1542) in domain 1540 includes service functions $f_3$ and $f_8$, node n2 (1532) in domain 1530 includes service function $f_4$, node n3 (1512) in domain 1510 includes service functions $f_5$, $f_6$, and $f_1$, node n4 (1522) in domain 1520 includes service functions $f_2$ and $f_1$, node n5 (1562) in domain 1560 includes service functions $f_7$, $f_8$, and $f_6$, node n6 (1572) in domain 1570 includes service function $f_5$, and node n7 (1552) in domain 1550 includes service function $f_2$.

In this example, the service function request is for a fixed order chain $f_1 \cdot f_2 \cdot f_3$. While not all of the nodes include all of the service functions included in the requested service function chain, in this example (for simplicity of illustration), is it assumed that all of the nodes (vertices) and edges (links) meet the other qualifying requirements for the requested service function chain. More specifically, it is assumed that the number of compute and/or storage resources required for each of the supported service functions exist on each node (vertex), although they may not always be available, and that bandwidth and/or delay requirements are met for all of the edges (links) between the neighboring nodes that include the service functions to be mapped as part of a candidate solution for the service function chain request. For example, all of the delays between neighboring nodes (and service functions) in domains 1510 and 1540, domains 1540 and 1530, domains 1530 and 1520, domains 1520 and 1510, domains 1520 and 1550, domains 1550 and 1570, domains 1570 and 1560, and 1560 and 1520 are assumed to be 1. In this example, service function $f_8$ is available from time $t_1$ to time $t_1'$, as requested, on node n1 (1542) in domain 1540 and on node n5 (1562) in domain 1560. Service function $f_5$ is available from time $t_2$ to time $t_2'$, as requested, on node n3 (1512) in domain 1510 and on node n6 (1572) in domain 1570. Service function $f_2$ is available from time $t_3$ to time $t_3'$, as requested, on node n4 (1522) in domain 1520, but is not available from time $t_3$ to time $t_3'$ on node n7 (1552) in domain 1550.

Figure 15B:
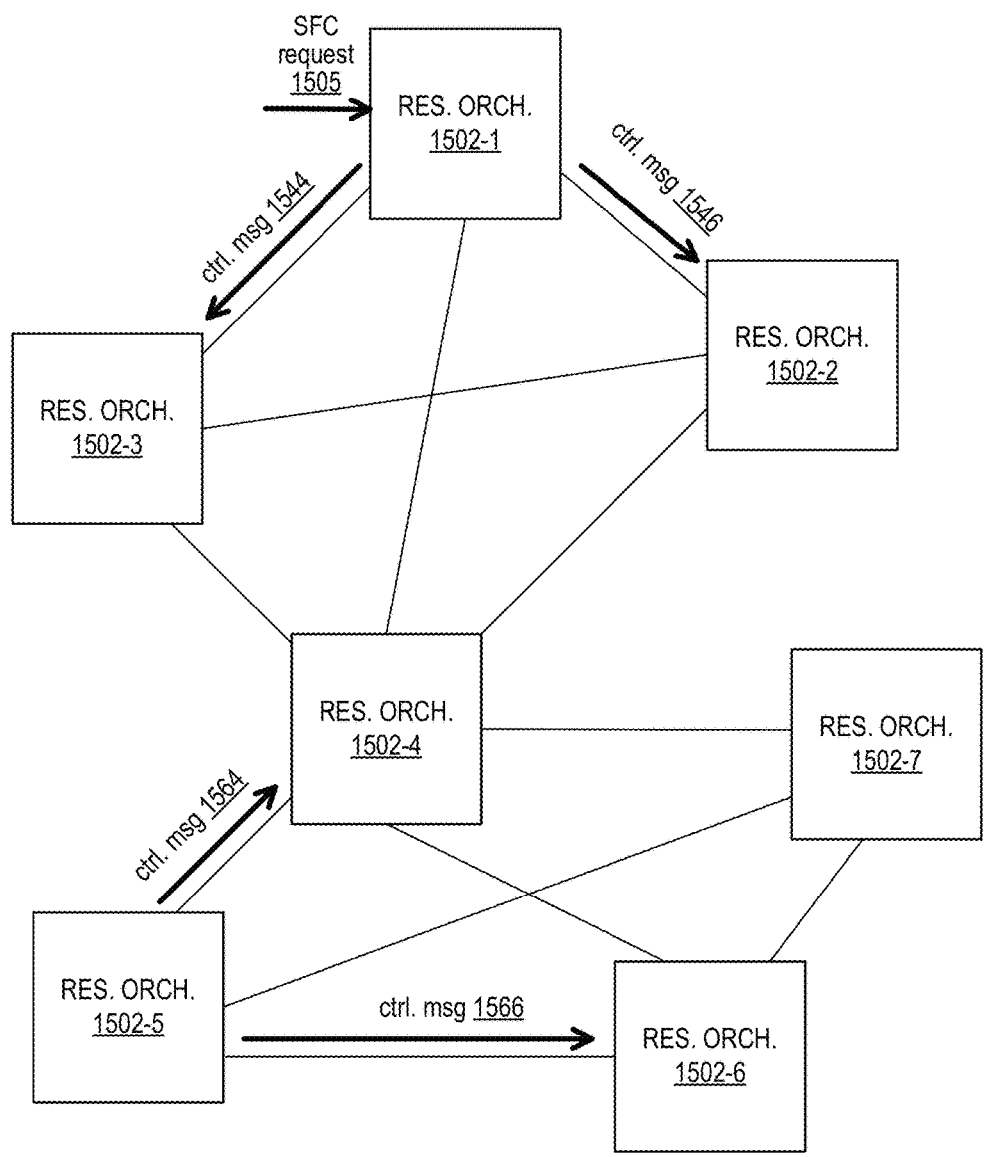
Figure 15C:
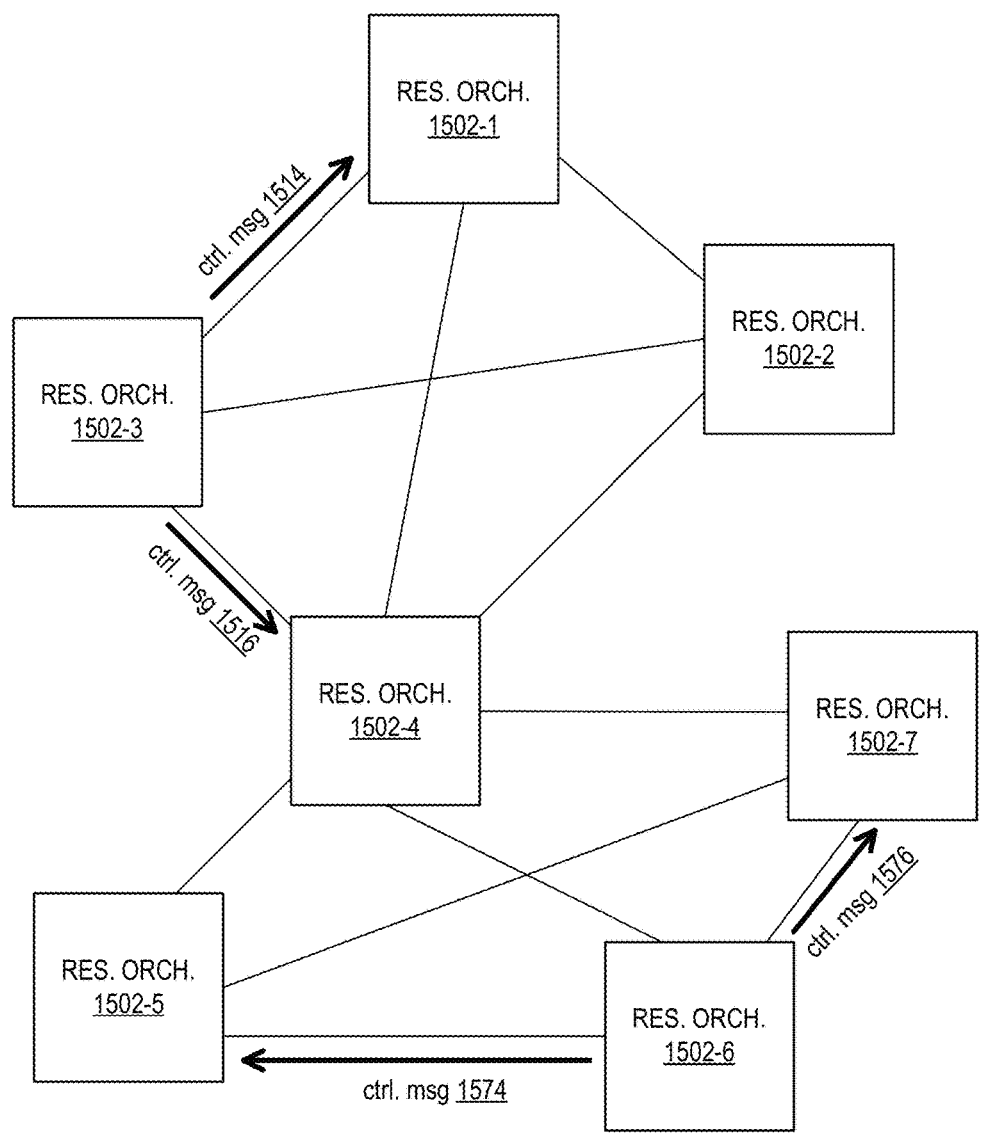
Figure 15D:
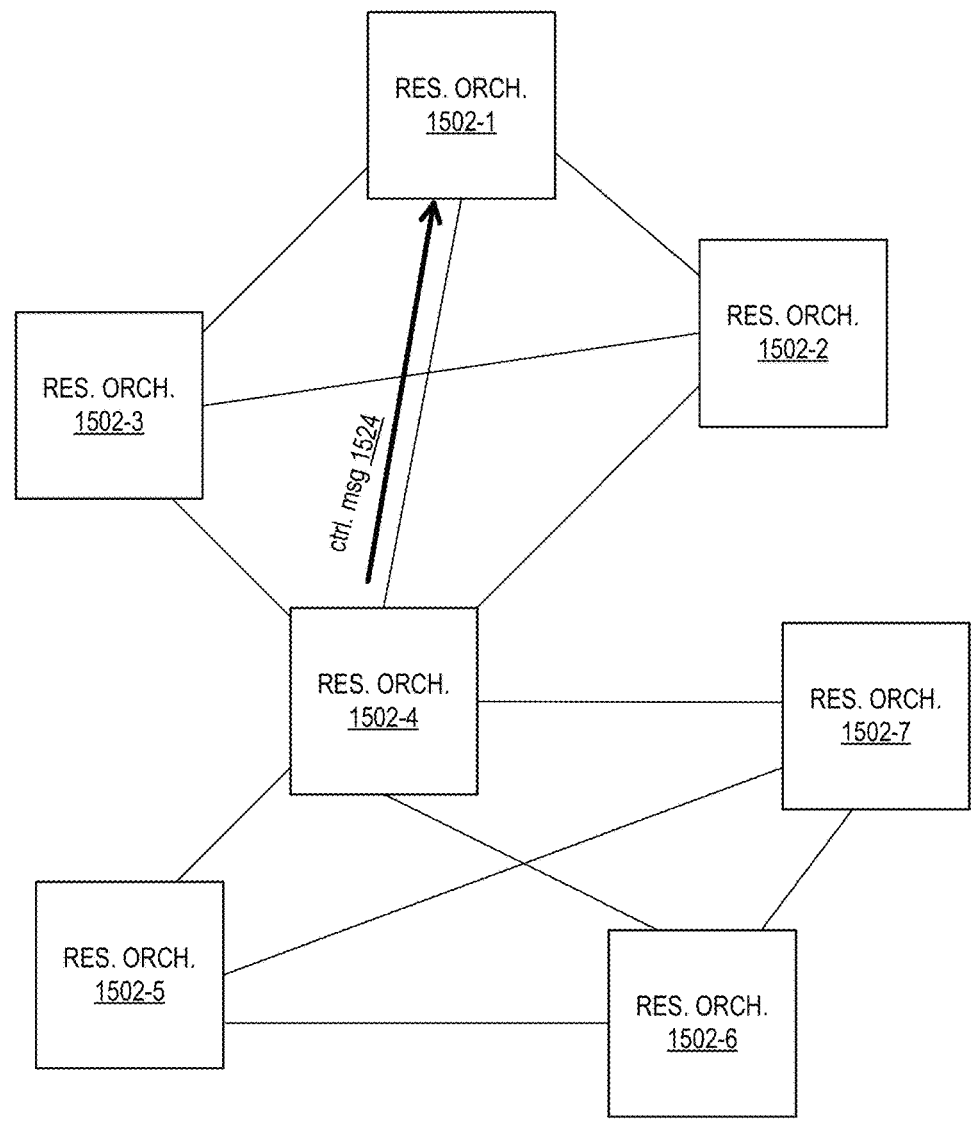

FIGS. 15B-15D illustrate the operations of the vertex-centric distributed computing on a distributed resource orchestration architecture 1580 over three supersteps. The distributed resource orchestration architecture 1580 includes communication channels (or links) over which controller messages are exchanged between the respective resource orchestrators of the domains 1510, 1520, 1530, 1540, 1550, 1560, and 1570. For clarity, not all of these communication channels are illustrated in FIGS. 15B-15D. Each domain includes a respective resource orchestrator 1502. For example, domain 1540 includes resource orchestrator 1502-1, domain 1530 includes resource orchestrator 1502-2, domain 1510 includes resource orchestrator 1502-3, domain 1520 includes resource orchestrator 1502-4, domain 1560 includes resource orchestrator 1502-5, domain 1570 includes resource orchestrator 1502-6, and domain 1550 includes resource orchestrator 1502-7. In this example, an SFC request 1505 is submitted to resource orchestrator 1502-1 in domain 1540. This resource orchestrator may be (or may serve as) a source orchestrator, which may be the resource orchestrator for a master domain in the multi-domain network.

In the first superstep (superstep 0), resource orchestrator 1502-1 in domain 1540, as the source orchestrator, forwards the SFC request 1505 to the other six resource orchestrators in the distributed resource orchestration architecture 1580. Each of the resource orchestrators may then identify any qualified vertices with which to start building a candidate solution for SFC request 1505. For example, since SFC request 1505 includes a fixed-ordered chain, each resource orchestrator may identify any vertices within their respective domains that include the first function in SFC request 1505 (i.e., service function $f_8$) and at which sufficient resources for performing service function $f_8$ are available for the requested time duration (i.e., from time $t_1$ to time $t_1'$). In this example, the initially identified qualified vertices include node n1 (1542) in domain 1540 and on node n5 (1562) in domain 1560.

In this example, during superstep 0, each vertex (node) that was identified as having the first service function $f_8$, in this case, nodes n1 (1542) in domain 1540 and n5 (1562) in domain 1560, executes a portion of a compute function that is dependent on resource availability in the time dimension, such as the compute2( ) function described above. In this case, for each of its neighbors, each of these vertices generates partially mapped SFC in which the vertex itself is mapped to the first function in the chain, and in which the partially mapped SFC includes instantiation times for service function $f_8$ and for the next service function, $f_5$. The resource orchestrator for the domain in which the vertex resides then sends an appropriate controller message containing one of the partially mapped SFCs to each of those neighbors. For example, because service function $f_8$ is available on node n1 (1542) in domain 1540 during the requested time dimension, resource orchestrator 1502-1 creates a partially mapped chain in which node n1 (1542) in domain 1540 is mapped to service function $f_8$.

In this example, resource orchestrator 1502-1 sends a controller message 1544 to resource orchestrator 1502-3 for domain 1510. Controller message 1544 includes the SFC request identifier (1) and the partially mapped chain (<n1, t1, t2, >*< >*< >). The values within the first bracket in the controller message indicate that node n1, which is the first item, is the vertex that maps to the first service function, $f_8$, that the instantiation time of service function $f_8$ is $t_1$, and that the instantiation time of the next service function, $f_5$, is $t_2$, as calculated by the compute(2) function above for this vertex. Since the other service functions in the SFC request are not yet mapped, the partially mapped service function chain included in controller message 1544 includes two empty brackets. Similarly, resource orchestrator 1502-1 sends a controller message 1546 to resource orchestrator 1502-2 for domain 1530. Controller message 1546 also includes the SFC request identifier (1) and the partially mapped chain (<n1, t1, t2, >*< >*< >). < >).

In superstep 0, because service function $f_8$ is also available on node n5 (1562) in domain 1560 during the requested time dimension, resource orchestrator 1502-5 creates a partially mapped chain in which node n5 (1562) in domain 1560 is mapped to service function $f_5$. In this example, resource orchestrator 1502-5 sends a controller message 1564 to resource orchestrator 1502-4 for domain 1520. Controller message 1564 includes the SFC request identifier (1) and the partially mapped chain (<n5, t1, t2, >*< >*< >). The values within the first bracket in the controller message indicate that node n5, which is the first item, is the vertex that maps to the first service function, $f_5$, that the instantiation time of service function $f_5$ is $t_1$, and that the instantiation time of the next service function, $f_2$, is $t_2$, as calculated by the compute (2) function above for this vertex. Since the other service functions in the SFC request are not yet mapped, the partially mapped service function chain included in controller message 1564 includes two empty brackets. Similarly, resource orchestrator 1502-5 sends a controller message 1566 to resource orchestrator 1502-6 for domain 15730. Controller message 1566 also includes the SFC request identifier (1) and the partially mapped chain (<n5, t1, t2, >*< >*< >). < >).

In this example, since the remaining nodes do not include service function $f_8$ (which is the first service function in the requested service function chain), these nodes are not qualified nodes and no controller messages are sent from their respective resource orchestrators to the resource orchestrators of their neighbors during superstep 0. Once all of the vertices (nodes) have received the controller messages that they are supposed to receive, superstep 0 ends. FIG. 15B illustrates that, at the end of the superstep 0, four controller messages containing partially mapped service function chains have been delivered to destination vertices. More specifically, node n3 (1512) in domain 1510 has received controller message 1544, node n2 (1532) in domain 1530 has received controller message 1546, node n4 (1522) in domain 1520 has received controller message 1564, and node n6 (1572) in domain 1570 has received controller message 1566, all of which are described above.

As described above, during supersteps other than superstep 0, each vertex (node) that received a controller message related to the SFC request during the previous superstep processes those messages and determines whether or not the partially mapped service function chains in those messages can be extended or completed. For example, FIG. 15C illustrates that, during superstep 1, node n3 (1512) in domain 1510, which received controller message 1544 including a partial chain (<n1, t1, t2, >*< >*< >) is able to extend the chain, since service function $f_5$ (the second function in the requested service function chain) is available on node n3 (1512) from time $t_2$ to time $t_2'$, as requested. The partially mapped chain is extended to (<n1, t1, t2, >*<n3, t2, t3>*< >). In this example, resource orchestrator 1502-3 sends a controller message 1514 that includes this extended service function chain to resource orchestrator 1502-1. Resource orchestrator 1502-3 also sends a controller message 1516 that includes this extended service function chain to resource orchestrator 1502-4.

Similarly, FIG. 15C illustrates that, during the second superstep (superstep 1), node n6 (1572) in domain 1570, which received controller message 1566 including a partial chain (<n5, t1, t2, >*< >*< >) is able to extend the chain, since service function $f_5$ (the second function in the requested service function chain) is available on node n6 (1572) from time $t_2$ to time $t_2'$, as requested. The partially mapped chain is extended to (<n5, t1, t2, >*<n6, t2, t3>*<

>). In this example, resource orchestrator 1502-6 sends a controller message 1574 that includes this extended service function chain to resource orchestrator 1502-5. Resource orchestrator 1502-6 also sends a controller message 1576 that includes this extended service function chain to resource orchestrator 1502-7.

In this example, during superstep 1, node n2 (1532) discards the partially mapped chain that it received in controller message 1546 since the function $f_5$ that extends the chain is not available at node n2. Similarly, during superstep 1, node n4 (1522) discards the partially mapped chain that it received in controller message 1564 since the function $f_8$ that extends the chain is not available at n4. Once all of the vertices (nodes) have received the controller messages that they are supposed to receive during superstep 1, superstep 1 ends. FIG. 15C illustrates that, at the end of the superstep 1, four remaining controller messages containing partially mapped service function chains have been delivered to destination vertices. More specifically, node n1 (1542) has received controller message 1514, node n4 (1522) has received controller message 1516, node n5 has received controller message 1574, and node n7 has received controller message 1576, all of which are described above.

During the third superstep (superstep 2 illustrated in FIG. 15D), node n1 (1542) discards the partially mapped chain that it received in controller message 1514 since the function $f_2$ that completes the chain is not available at node n1. Similarly, during superstep 1, node n5 (1562) discards the partially mapped chain that it received in controller message 1574 since the function $f_2$ that extends the chain is not available at n5. In this example, function $f_2$, which completes the chain is available on node n7 (1552). However, because function $f_2$ is not available from time $t_3$ to time $t_3'$, as requested, on node n7 (1552), the service function chain request cannot be completed at node n7 (1522). In this example, node n4 (1522) in domain 1520, which received controller message 1516 including a partial chain (<n1, t1, t2, >*<n3, t2, t3>*< >) is able to extend the chain, since service function $f_2$ (the last function in the requested service function chain) is available on node n4 (1522) from time $t_3$ to time $t_3'$, as requested. The partially mapped chain is extended to (<n1, t1, t2, >*<n3, t2, t3>*<n4, t3, t4>). In this example, resource orchestrator 1502-4 sends a controller message 1524 that includes the completed service function chain to resource orchestrator 1502-1, which serves as the source or master resource orchestrator.

In the example vertex-centric distributed computation illustrated in FIGS. 15A-15D, only one possible service function chain solution was found and communicated back to the source orchestrator. The service function chain goes from n1 (1542) in domain 1540 (to perform service function $f_8$) to node n3 (1512) in domain 1510 (to perform service function $f_5$) to node n4 (1522) in domain 1520 (to perform service function $f_2$). In this example, the source orchestrator receives the following solution for SFC request 1505: n1•n4•n5. However, if multiple candidate service function chains had been completed, additional controller messages containing the completed chains would be sent to resource orchestrator 1502-1. In this case, resource orchestrator 1502-1 may select one of the candidate service function chains to be provisioned based on any suitable criteria. For example, a candidate service function chain may be selected for execution that best reflects user preferences for resource usage or other policy decisions. In another example, the lowest-cost disjoint candidate service function chain may be selected (e.g., to address protection concerns). In yet another example, multiple candidate service function chains may be selected for parallel execution, according to a user preference or an applicable service function chain selection policy.

While the example illustrated in FIGS. 15A-15D and described above involves a fixed-ordered SFC request, the vertex-centric distributed computing approach described herein may also be suitable for application to flexible-ordered SFC requests or linear sub-requests in a mesh topology, in some embodiments. In cases in which an SFC request or linear sub-request includes a flexible-ordered service function chain, in at least some supersteps, the compute function executed at each superstep may perform multiple searches in parallel, each of which attempts to identify one of multiple options for extending or completing a partially mapped chain. In this case, the vertex-centric distributed computation will have the same number of supersteps as would be performed for a fixed-ordered SFC request in which the service function chain has the same number of service functions, but it will exchange more messages during each superstep than in the fixed-ordered case.

Again note that while several examples of the use of vertex-centric distributed computing included herein are directed to the generation of mapping solutions to service function chain requests, in other embodiments, they may be used to generate mapping solutions for other types of virtual network requests requiring network functions and/or other types of resources to be available on respective physical nodes.

After all feasible mappings and corresponding SFC forwarding paths for a service function chain have been identified, and an optical or otherwise preferred mapping is selected, the source or master orchestrator may forward the selected mapping, along with information indicating scheduled times at which the service functions should be reserved, to associated orchestrators for provisioning. In some embodiments, each associated orchestrator may update the state information of its vertices along the selected SFC forwarding path. For example, each associated orchestrator may update the list of available resources at the vertices associated with the selected mapping. Subsequently, each associated orchestrator may instantiate the appropriate service functions at their respective scheduled times.

In typical existing systems that process service function chains, only after all containers and/or virtual machines in which the service functions will execute are set up and ready, are users notified that they can begin sending SFC packets for processing. Typical SFC orchestration approaches do not consider resource availability in the time dimension when provisioning these resources, resulting in idle server time due to queuing delays at some chained nodes and resource allocations based incorrect assumptions of heterogeneous computation times for different service functions. For example, in one existing system, a service may be configured in such a way that no node currently in a "swarm" can execute its tasks. In this case, the service remains in a pending state. In another example system, when containers are created, they go into a queue and wait to be scheduled. The scheduler may attempt to preempt (evict) lower priority containers to make scheduling of pending containers possible. These and other types of queuing delays for service function instantiation may not be suitable for mission-critical applications.

In at least some embodiments of the systems described herein, a just-enough-time approach to provisioning may include orchestrators initiating and then turning off (e.g., pausing or deleting) instances of virtual machines and/or containers of service functions at scheduled times that are determined based on resource availability in the time dimension. In some embodiments, the following information may be known to the orchestrators and used to schedule the instantiation and subsequent pausing or deletion of respective containers for the service functions in a service function chain:

$t_1$: the time to instantiate the packet flow at the first node
tp: the time duration of the traffic flow
di: the propagation delay between two nodes
$f_i$: the processing time of a service function i at a node
ts: the time duration to setup a VM/container Given the information above, the orchestrators may calculate, at each node, the respective times at which to instantiate the virtual machines or containers at succeeding nodes (e.g., $t_2$, $t_3$, and so one) and the respective times at which to pause or delete the virtual machines or containers (e.g., $t_1'$, $t_2'$, $t_3'$, and so on). This additional time-based information may be used to implement just-enough-time provisioning for the service function chain.

Figure 16:
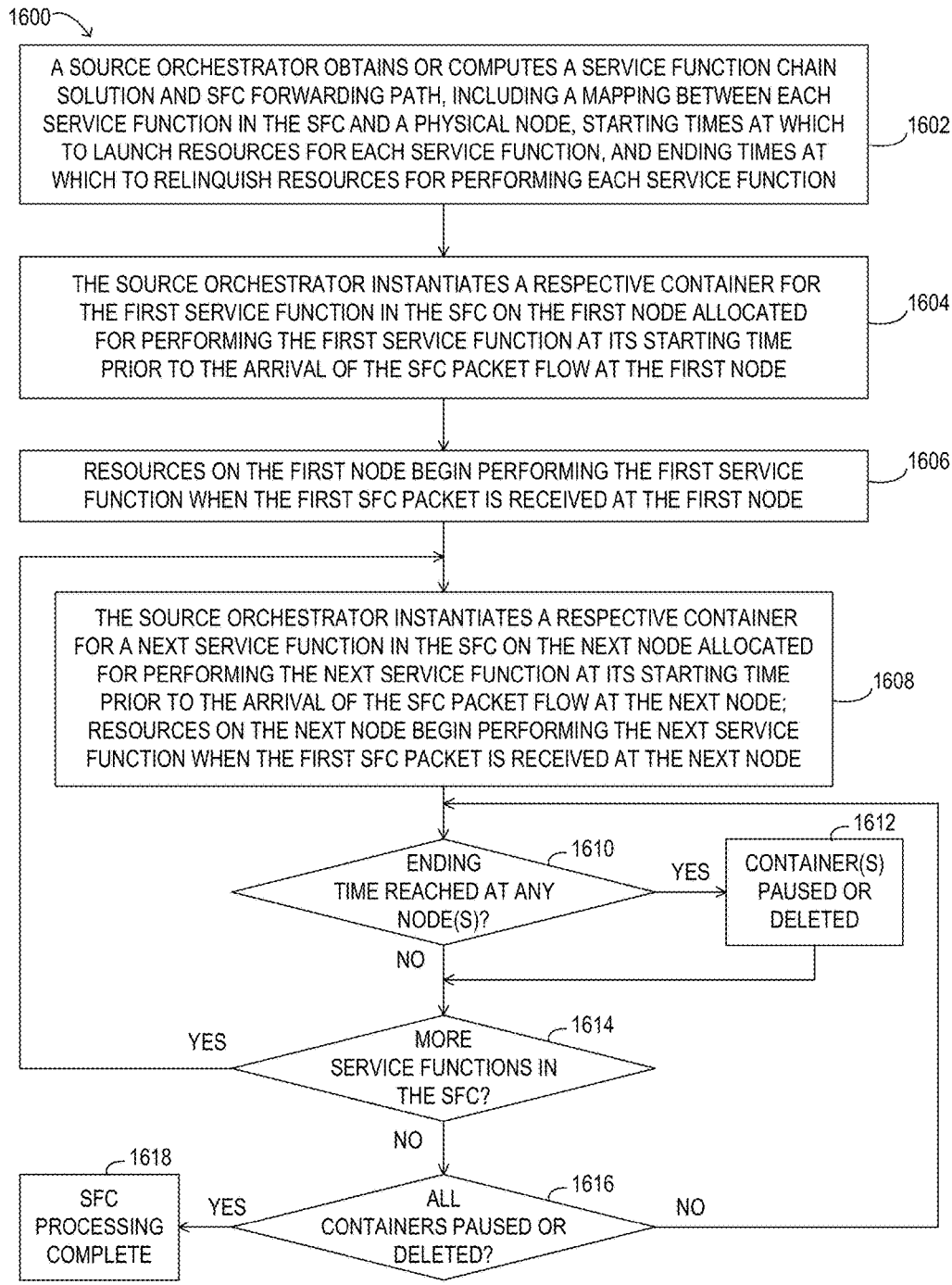
FIG. 16 is a flow diagram illustrating selected elements of a method for just-enough-time provisioning of resources along a selected SFC forwarding path, according to one embodiment.

FIG. 16 is a flow diagram illustrating selected elements of a method 1600 for just-enough-time provisioning of resources along a selected SFC forwarding path, according to one embodiment. Method 1600 may include, at 1602, a source orchestrator obtaining or computing a service function chain solution and an SFC forwarding path, including a mapping between each service function in the SFC and a physical node, starting times at which to launch resources for each service function, and ending times at which to relinquish resources for performing each service function. In some embodiments, the starting times at which to launch resources for each service function and the ending times at which to relinquish resources for performing each service function may be calculated by a vertex-centric distributed computation, such as the compute2 function described above. At 1604, the method may include the source orchestrator instantiating a respective container for the first service function in the SFC on the first physical node allocated for performing the first service function at its starting time prior to arrival of the SFC packet flow at the first physical node. At 1606, method 1600 may include resources on the first physical node beginning to perform the first service function when the first SFC packet is received at the first node.

At 1608, the method may include, subsequent to the instantiation of the container for the first service function, the source orchestrator instantiating a respective container for a next service function in the SFC on the next physical node allocated for performing the next service function at its starting time prior to arrival of the SFC packet flow at the next physical node. The resources on the next physical node may begin performing the next service function when the first SFC packet is received at the next physical node. If, at 1610, it is determined that the ending time for a service function has been reached at any of the physical nodes (which may correspond to a time at which the last packet has been processed at one of the physical nodes), method 1600 may proceed to 1612 before continuing to 1614. Otherwise, method 1600 may continue directly to 1614. At 1612, method 1600 may include pausing or deleing the container(s) on the physical node(s) for which the ending time(s) for the corresponding service function(s) have been reached. For example, in some embodiments, the respective containers on each of the nodes allocated for the given SFC may be paused or deleted at times have been calculated by the source orchestrator to correspond to a point in time closely following the completion of the processing of the last packet in the packet flow on the node, as described above.

If, at 1614, it is determined that there are more service functions in the given SFC, method 1600 may return to 1608, after which the operations shown as 1608 to 1612 may be repeated, as appropriate, while there are additional service functions in the SFC for which a container needs to be instantiated. If, or once, there are no additional service functions in the SFC for which a container needs to be instantiated, method 1300 may continue to 1616. If, at 1616, it is determined that all of the containers instantiated on behalf of the service functions in the SFC have been paused or deleted, the SFC processing is complete, as in 1618. Otherwise, method 1600 may return to 1610, after which the operations shown as 1610 to 1616 may be repeated until the last packet has been processed at all nodes allocated for all service functions in the given SFC and all of the containers instantiated on behalf of the service functions in the SFC have been paused or deleted.

Figure 17:
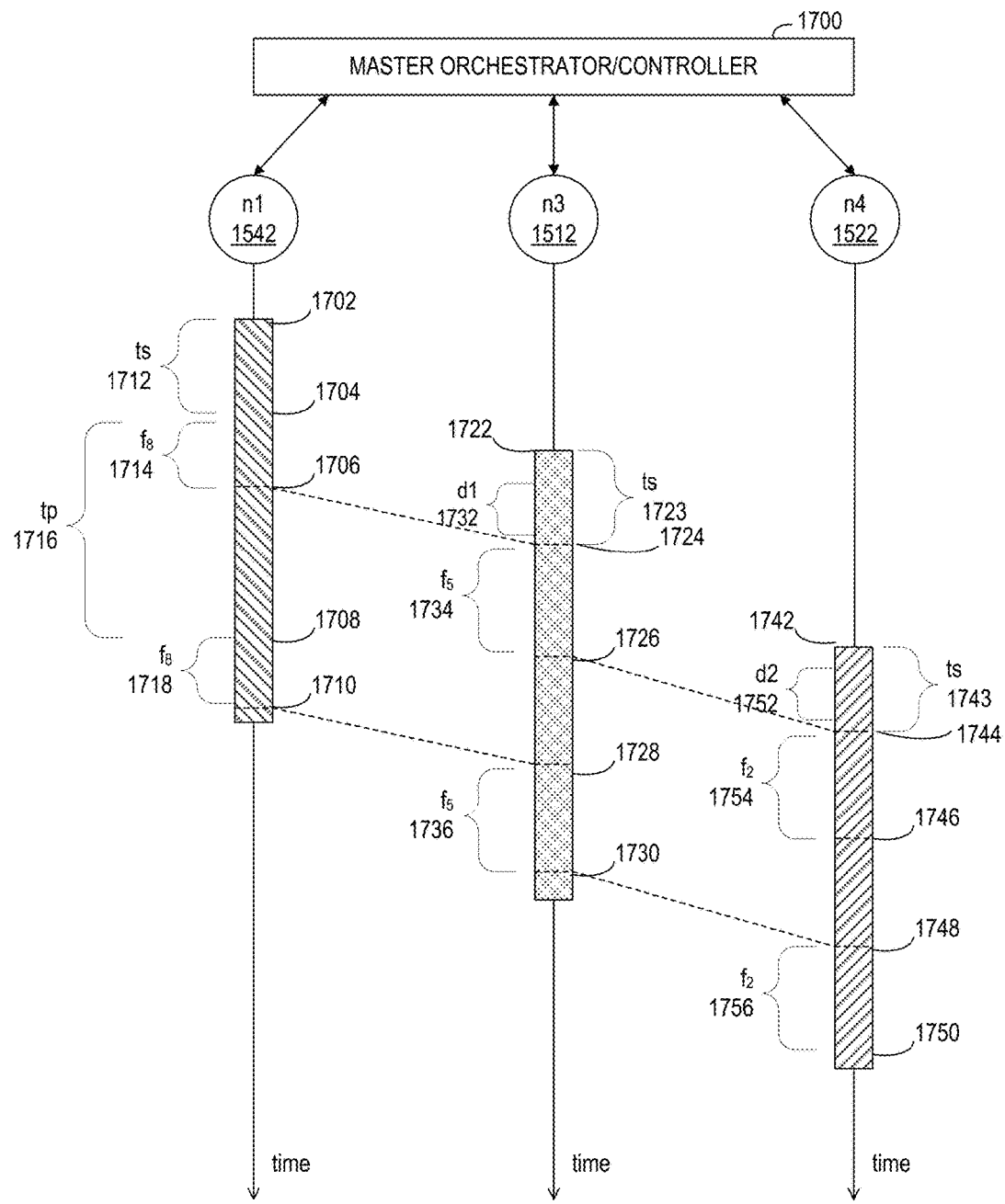
FIG. 17 illustrates an example of the provisioning of resources for a service function chain based on resource availability in the time dimension, according to one embodiment.

FIG. 17 illustrates an example of the provisioning of resources for a service function chain based on resource availability in the time dimension, according to one embodiment. In this example, a master orchestrator/controller 1700 performs just-enough-time provisioning of resources for the selected service function chain solution described above in reference to FIGS. 15A-15D. As described above, the SFC request $f_8 \cdot f_5 \cdot f_2$ specified that service function $f_8$ should be available from time $t_1$ to time $t_1'$, service function $f_5$ should be available from time $t_2$ to time $t_2'$, and service function $f_2$ should be available from time $t_3$ to time $t_3'$. The service function chaining solution included node n1 (1542) in domain 1540, for performing service function $f_8$, chained to node n3 (1512) in domain 1510, for performing service function $f_5$, chained to node n4 (1522) in domain 1520, for performing service function $f_2$. Note that the timelines depicted in FIG. 17 are shown as a schematic illustration and are not drawn to scale.

In the illustrated example, master orchestrator/controller 1700 instantiates and subsequently pauses, or deletes, containers in which each service function in the service function chain are to be executed according to the time durations specified in the SFC request. For example, time 1702 represents SFC setup request arrival time at node n1 (1542), e.g., the arrival of a control signal or command to instantiate a virtual machine or container for service function $f_8$ at specified time $t_1$. Label 1712 indicates the setup time (ts) for the VM/container to be instantiated on node n1 (1542). Time 1704 represents the time at which the first packet in the packet flow for the SFC arrives at node n1 (1542). Label $f_8$ 1714 indicates the estimated processing time for service function $f_8$ (for the first packet) on node n1 (1542). Time 1706 represents the end of the processing time for service function $f_8$ (for the first packet) on node n1 (1542), and time at which the first packet is forwarded to node n3 (1512) for performing service function $f_5$. Label 1716 indicates the time duration of the packet flow (tp). Time 1708 represents the time at which the last packet in the packet flow arrives at node n1 (1542). Note that, although note shown in FIG. 17, one or more additional packets may arrive at node n1 (1542) between the arrival of the first packet and the arrival of the last packet. Label F8 1718 indicates the estimated processing time for service function $f_8$ (for the last packet) on node n1 (1542). Time 1710 represents the end of the processing time for service function $f_8$ (for the last packet) on node n1 (1542), corresponding to specified time $t_1'$, and time at which the last SFC packet is forwarded to node n3 (1512) for performing service function $f_5$. Here, $t_1'$ is calculated as $t_1'=t_1+ts+tp+f_8$. In some embodiments, time 1710 may also represent the time at which master orchestrator/controller 1700 pauses or deletes the virtual machine or container that was instantiated on node n1 (1542) beginning at time 1702.

In the illustrated example, time 1722 represents SFC setup request arrival time at node n3 (1512), e.g., the arrival of a control signal or command to instantiate a virtual machine or container for service function $f_5$ at specified time $t_2$. Label 1723 indicates the setup time (ts) for the VM/container to be instantiated on node n3 (1512). Label d1 1732 represents the propagation delay between node n1 (1542) and node n3 (1512). Here, $t_2$ is calculated as $t_2=t_1+f_8+d1$. Time 1724 represents the time at which the first packet in the packet flow for the SFC arrives at node n3 (1512). Label F5 1734 indicates the estimated processing time for service function $f_5$ (for the first packet) on node n1 (1542). Time 1726 represents the end of the processing time for service function $f_5$ (for the first packet) on node n3 (1512), and time at which the first packet is forwarded to node n4 (1522) for performing service function $f_2$. Time 1728 represents the time at which the last packet in the packet flow arrives at node n3 (1512). Note that, although note shown in FIG. 17, one or more additional packets may arrive at node n3 (1512) between the arrival of the first packet and the arrival of the last packet. Label F5 1736 indicates the estimated processing time for service function $f_5$ (for the last packet) on node n3 (1512). Time 1730 represents the end of the processing time for service function $f_5$ (for the last packet) on node n3 (1512), corresponding to specified time $t_2'$, and time at which the last SFC packet is forwarded to node n4 (1522) for performing service function $f_2$. Here, $t_2'$ is calculated as $t_2'=t_2+ts+tp+f_5$. In some embodiments, time 1730 may also represent the time at which master orchestrator/controller 1700 pauses or deletes the virtual machine or container that was instantiated on node n3 (1512) beginning at time 1722.

In the illustrated example, time 1742 represents SFC setup request arrival time at node n4 (1522), e.g., the arrival of a control signal or command to instantiate a virtual machine or container for service function $f_2$ at specified time $t_3$. Label 1743 indicates the setup time (ts) for the VM/container to be instantiated on node n4 (1522). Label d2 1752 represents the propagation delay between node n3 (1512) and node n4 (1522). Here, $t_3$ is calculated as $t_3=t_2+f_5+d2$. Time 1744 represents the time at which the first packet in the packet flow for the SFC arrives at node n4 (1522). Label F2 1754 indicates the estimated processing time for service function $f_2$ (for the first packet) on node n4 (1522). Time 1746 represents the end of the processing time for service function $f_2$ (for the first packet) on node n4 (1522). Time 1748 represents the time at which the last packet in the packet flow arrives at node n4 (1522). Note that, although note shown in FIG. 17, one or more additional packets may arrive at node n4 (1522) between the arrival of the first packet and the arrival of the last packet. Label F2 1756 indicates the estimated processing time for service function $f_2$ (for the last packet) on node n4 (1522). Time 1750 represents the end of the processing time for service function $f_2$ (for the last packet) on node n4 (1522), corresponding to specified time $t_3'$, Here, $t_3'$ is calculated as $t_3'=t_3+ts+tp+f_2$. In some embodiments, time 1750 may also represent the time at which master orchestrator/controller 1700 pauses or deletes the virtual machine or container that was instantiated on node n4 (1522) beginning at time 1742.

In some embodiments, just-enough-time provisioning for service function chains may be supported by standard or custom resource management technologies for recording information about reserved resources in the time dimension and/or for performing virtual machine or container task scheduling with preemption in order to guarantee the immediate instantiation of virtual machine or container tasks at scheduled times.

While many of the example embodiments described herein are directed to the application of a vertex-centric algorithm for identifying all qualified solutions for an SFC request in a distributed multi-domain network, in other embodiments, this approach may be applied in a centralized system. For example, in a centralized system, a single resource orchestrator may include all of the node and link information for the whole multi-domain network, and the network may not be partitioned. In this example, the single resource orchestrator may coordinate the execution of a common compute function on appropriate ones of the vertices (nodes) in a series of supersteps to build up any potential solutions to an SFC request. In other words, in a centralized system, a single resource orchestrator may implement the functionality of all of the respective resource orchestrators in the distributed systems described above. In some embodiments of such a centralized system, rather than exchanging controller messages between vertices (nodes) over control channels, messages that include partially mapped chains may be exchanged between vertices (nodes) by writing then to and reading them from memory. As in the case of the distributed systems described above, once the single resource orchestrator has identified all feasible service function chains for satisfying an SFC request, the single resource orchestrator may present them to another process that decides, based on one or more policies or constraints, which one or more of the identified service function chains to implement.

Figure 18:
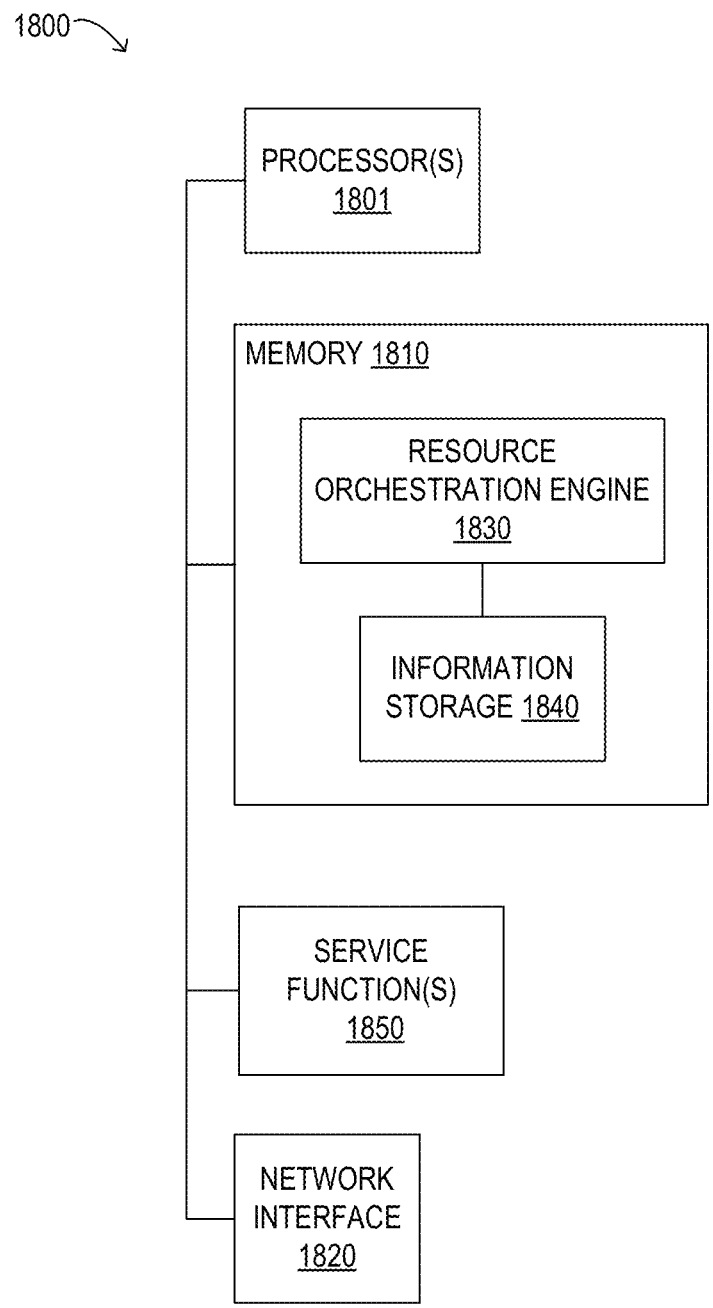
FIG. 18 is a block diagram illustrating selected elements of an example network element, according to at least some embodiments.

Referring now to FIG. 18, a block diagram of selected elements of an example network element 1800 is illustrated, according to at least some embodiments. In FIG. 18, network element 1800 is represented as a computer system including physical and logical components for implementing any of the network elements in a multi-domain network. In various embodiments, a network element similar to network element 1800 may implement any of the network elements 112 illustrated in FIG. 1, any of the network elements illustrated in FIG. 2, any of the domain-specific resource orchestrators described herein (such as any of the resource orchestrators 108 illustrated in FIGS. 1, 3 and 4, any of the resource orchestrators 802 or 1502 illustrated in FIGS. 8B-8D and 15B-15D, or master orchestrator/controller 1700 illustrated in FIG. 17), any of the vertices (nodes) described herein, or a network controller (such as an SDN controller for a particular domain in a multi-domain network), as described herein. However, some of these network elements may not include all of the components illustrated in FIG. 18, in some embodiments. In other embodiments, any of the network elements described herein may include more, fewer, or different components than those included in the example embodiment illustrated in FIG. 18.

As illustrated in this example, network element 1800 may, accordingly, include one or more processors 1801, memory 1810, one or more service functions 1850, and a network interface 1820. Processor 1801 may represent one or more individual processing units and may execute program instructions, interpret data, and process data stored by memory 1810 or another component within network element 1800 to implement the functionality of any of the network elements described herein, in different embodiments. In this example embodiment, each service function 1850 may represent circuitry, logic, and/or program instructions for implementing any of a variety of service functions that may be included in a service function chain including, but not limited to, those described herein.

In FIG. 18, memory 1810 may be communicatively coupled to processor 1801 and may comprise a system, device, or apparatus suitable to retain program instructions and data for a period of time (e.g., non-transitory computer-readable media). Memory 1810 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory. Non-volatile memory refers to a memory that retains data after power is turned off. It is noted that memory 1810 may include different numbers of physical storage devices, in various embodiments.

As shown in FIG. 18, memory 1810 may include instructions to implement functionality of resource orchestration engine 1830. Resource orchestration engine 1830, in collaboration with other instances of resource orchestration engine 1830 on other instances of network element 1800, may implement a vertex-centric distributed algorithm for identifying all qualified solutions for an SFC request in a multi-domain network with or without considering resource availability in the time dimension, may implement just-enough-time provisioning of resources along a selected SFC forwarding path, and/or may implement any of the elements of method 700 illustrated in FIG. 7A, method 720 illustrated in FIG. 7B, method 900 illustrated in FIG. 9, method 1000 illustrated in FIG. 10, method 1200 illustrated in FIG. 12, method 1300 illustrated in FIG. 13A, method 1320 illustrated in FIG. 13B, or method 1600 illustrated in FIG. 16, in different embodiments, among other functionality described in the present disclosure. Memory 1810 may also include information storage 1840, which may store information usable by resource orchestration engine 1830 including, but not limited to, data representing an SFC request, node information (including data indicating the available compute and/or storage resources and/or service functions and the times at which they are allocated or available for allocation to satisfy an SFC request), edge information (e.g., in one or more edge data structures), vertex information (e.g., in one or more vertex value data structures), data representing one or more partially mapped service function chains, data representing one or more candidate solutions for a service function chain request (e.g., completed service function chains), data representing user resource usage preferences and policies, data representing inputs or outputs of a service function 1850, or values of any default or configurable parameters used to implement the functionality described herein or any other functionality of network element 1800.

In at least some embodiments of the systems described herein, a vertex-centric approach to computing all feasible solutions to an SFC request in a multi-domain network may have advantages over earlier approaches. In different embodiments, the vertex-centric framework and resource orchestration approach described herein may be suitable for both centralized and distributed settings. It may avoid the issues associated with the replication of global state information in traditional architectures, and has been shown to be more efficient than earlier approaches in terms of signaling delay and the number of messages exchanged. In at least some embodiments, this approach may be highly scalable for computing all feasible mapping solutions for SFC requests in multi-domain networks. For example, the systems and methods described herein may, in some embodiments, be used to coordinate and control resources implemented on the 1Finity™ platform from Fujitsu Network Communications Inc. that cover access, metro, core, and datacenter networks.

In general, in at least some embodiments of the present disclosure, the vertex-centric distributed computing framework described herein may be used to solve large-scale, multi-domain, multi-layer network problems spanning service functions, virtual machines, data centers, switching systems, and the Internet of Things.

In some embodiments, the use of resource availability information in the time dimension through just-enough-time mapping and provisioning of service function chains may provide additional technical benefits. For example, future 5G networks must support mission-critical, delay-sensitive services for applications such as Internet of Things (IoT) platforms, auto-driving cars, and service-oriented slicing. Existing approaches to the mapping and provisioning of service function chains do not consider resource availability in the time dimension, which may result in unpredictable and costly delays, poor resource utilization, and high rates of reservation failures. In at least some embodiments, these issues may be mitigated or overcome through just-enough-time mapping and provisioning, as described herein.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for identifying a qualified service function chaining solution in a network, comprising:
   receiving, at a resource orchestrator, a service function chain request specifying two or more service functions to be performed on respective physical nodes in the network and a first starting time at which to launch a first one of the two or more service functions specified in the service function chain request, each physical node in the network being represented as a vertex in a resource orchestration framework;
   determining a first ending time for performance of the first service function that together with the first starting time defines a first time duration for performance of the first service function;
   identifying one or more vertices in the resource orchestration framework at which the first service function is available during the first time duration;
   mapping a first one of the identified vertices to the first service function in a candidate service function chain;
   determining a second starting time at which to launch a second one of the two or more service functions dependent on the first starting time; and
   providing the candidate service function chain, the first starting time, and the second starting time to a first neighbor vertex of the first one of the identified vertices.

2. The method of claim 1, further comprising:
   determining a second ending time for performance of the second service function that together with the second starting time defines a second time duration for performance of the second service function;

determining whether or not the second service function is available at the first neighbor vertex during the second time duration; and in response to determining that the second service function is available at the first neighbor vertex during the second time duration, mapping the first neighbor vertex to the second service function in the candidate service function chain to extend the candidate service function chain.

3. The method of claim 2, further comprising:
determining a third starting time at which to launch a third one of the two or more service functions dependent on the second time duration; and
providing the extended candidate service function chain, the second starting time, and the third starting time to a second neighbor vertex of the first neighbor vertex.

4. The method of claim 2, further comprising:
determining that the mapping of the first neighbor vertex to the second service function in the candidate service function chain completes the candidate service function chain; and
providing the completed candidate service function chain, the first starting time, and the second starting time to the resource orchestrator.

5. The method of claim 1, wherein determining the first ending time for performance of the first service function comprises calculating the first ending time dependent on the first starting time, a setup time for provisioning resources to perform the first service function, a processing time for performing the first service function, and a time duration for a packet flow comprising a plurality of packets on whose behalf the first service function is to be performed.

6. The method of claim 1, wherein determining the second starting time at which to launch the second service function is further dependent on a processing time for performing the first service function and a propagation delay between the first one of the identified vertices and the first neighbor vertex.

7. The method of claim 1, wherein identifying the one or more vertices in the resource orchestration framework at which the first service function is available during the first time duration comprises, at each of a plurality of vertices including the one or more vertices, applying a void filling resource allocation policy or a non-void filling resource allocation to determine whether or not resources for performing the first service function are available at the vertex during the first time duration.

8. The method of claim 1, further comprising:
determining whether or not a physical link between the first one of the identified vertices and the first neighbor vertex meets qualifications specified for the service function chain request; and
providing the candidate service function chain, the first starting time, and the second starting time to the first neighbor vertex of the first one of the identified vertices in response to determining that the physical link between the first one of the identified vertices and the first neighbor vertex meets the qualifications specified for the service function chain request.

9. A resource orchestration framework in a network, the network comprising a plurality of physical nodes, each physical node comprising circuitry or logic to perform a subset of a plurality of service functions supported in the network;
wherein the resource orchestration framework comprises:
a plurality of vertices, each representing a respective one of the physical nodes in the network; and
a resource orchestrator;
wherein each of the plurality of vertices comprises:
a vertex processor; and
a vertex memory that stores program instructions that when executed by the vertex processor cause the vertex processor to perform a compute function that is common among the vertices in the resource orchestration framework;
wherein the resource orchestrator comprises:
an orchestrator processor; and
an orchestrator memory that stores program instructions that when executed by the orchestrator processor cause the orchestrator processor to perform:
receiving a service function chain request specifying two or more service functions to be performed on respective ones of the physical nodes in the network and specifying a first starting time at which to launch a first one of the two or more service functions specified in the service function chain request;
coordinating execution of two more supersteps of the common compute function on multiple ones of the plurality of vertices, wherein, during a first superstep of the common compute function, execution of the common compute function on a first one of the identified vertices comprises:
determining a first ending time for performance of the first service function that together with the first starting time defines a first time duration for performance of the first service function;
identifying one or more vertices in the resource orchestration framework at which the first service function is available during the first time duration;
mapping a first one of the identified vertices to the first service function in a candidate service function chain;
determining a second starting time at which to launch a second one of the two or more service functions dependent on the first starting time; and
providing the candidate service function chain, the first starting time, and the second starting time to a first neighbor vertex of the first one of the identified vertices.

10. The resource orchestration framework of claim 9, wherein during a second superstep of the common compute function, execution of the common compute function on the first neighbor vertex comprises, in response to obtaining the candidate service function chain, the first starting time, and the second starting time:
determining a second ending time for performance of the second service function that together with the second starting time defines a second time duration for performance of the second service function;
determining whether or not the second service function is available at the first neighbor vertex during the second time duration; and
in response to determining that the second service function is available at the first neighbor vertex during the second time duration, mapping the first neighbor vertex to the second service function in the candidate service function chain to extend the candidate service function chain.

11. The resource orchestration framework of claim 10, wherein during the second superstep of the common compute function, the execution of the common compute function on the first neighbor vertex further comprises:
- determining a third starting time at which to launch a third one of the two or more service functions dependent on the second time duration; and
- providing the extended candidate service function chain, the second starting time, and the third starting time to a second neighbor vertex of the first neighbor vertex.

12. The resource orchestration framework of claim 10, wherein, during the second superstep of the common compute function, the execution of the common compute function on the first neighbor vertex further comprises:
- determining that the mapping of the first neighbor vertex to the second service function in the candidate service function chain completes the candidate service function chain; and
- providing the completed candidate service function chain, the first starting time, and the second starting time to the resource orchestrator.

13. The resource orchestration framework of claim 10, wherein when executed by the orchestrator processor, the program instructions stored on the orchestrator memory further cause the orchestrator processor to perform:
- provisioning resources on the physical nodes represented by the vertices in the extended candidate service function chain, wherein the provisioning includes, at each physical node represented by a vertex in the extended candidate service function chain, instantiating, at the respective starting time for launching the service function mapped to the vertex, a virtual machine or container in which the service function mapped to the vertex is to be executed; and
- relinquishing the provisioned resources on the physical nodes represented by the vertices in the extended candidate service function chain, wherein the relinquishing includes, at each physical node represented by a vertex in the extended candidate service function chain, pausing or deleting the virtual machine or container in which the service function mapped to the vertex was executed at the respective ending time for performance of the service function.

14. The resource orchestration framework of claim 9, wherein determining the first ending time for performance of the first service function comprises calculating the first ending time dependent on the first starting time, a setup time for provisioning resources to perform the first service function, a processing time for performing the first service function, and a time duration for a packet flow comprising a plurality of packets on whose behalf the first service function is to be performed.

15. The resource orchestration framework of claim 9, wherein determining the second starting time at which to launch the second service function is further dependent on a processing time for performing the first service function and a propagation delay between the first one of the identified vertices and the first neighbor vertex.

16. The resource orchestration framework of claim 9, wherein each of the plurality of vertices maintains data representing, for each service function supported on the physical node represented by the vertex, a time duration for which resources for performing the service function are currently allocated or a time duration during which resources for performing the service function are available for provisioning on behalf of a service function chain request.

17. The resource orchestration framework of claim 9, wherein:
- the network is a multi-domain network comprising a plurality of network domains, each comprising one or more of the plurality of physical nodes;
- the resource orchestration framework comprises a plurality of resource orchestrators, including the resource orchestrator, each of which is associated with a respective domain in the multi-domain network, and each of which coordinates the execution of the two more supersteps of the common compute function on vertices in its respective domain; and
- the first neighbor vertex resides in a different domain of the multi-domain network than the domain in which the first identified vertex resides.

18. The resource orchestration framework of claim 9, wherein identifying the one or more vertices in the resource orchestration framework at which the first service function is available during the first time duration comprises, at each of a plurality of vertices including the one or more vertices, applying a void filling resource allocation policy or a non-void filling resource allocation to determine whether or not resources for performing the first service function are available at the vertex during the first time duration.

19. The resource orchestration framework of claim 9, wherein when executed by the orchestrator processor, the program instructions stored on the orchestrator memory further cause the orchestrator processor to perform:
- determining whether or not a physical link between the first one of the identified vertices and the first neighbor vertex meets qualifications specified for the service function chain request; and
- providing the candidate service function chain, the first starting time, and the second starting time to the first neighbor vertex of the first one of the identified vertices in response to determining that the physical link between the first one of the identified vertices and the first neighbor vertex meets the qualifications specified for the service function chain request.

20. The resource orchestration framework of claim 9, wherein when executed by the orchestrator processor, the program instructions stored on the orchestrator memory further cause the orchestrator processor to perform:
- selecting, from among the completed candidate service function chain and one or more other completed candidate service function chains, one or more service function chain solutions for execution, wherein the selection is dependent on a service provider policy, a service provider constraint, or a requestor on whose behalf the service function chain request was received.

* * * * *